(12) United States Patent
Bansal et al.

(10) Patent No.: US 12,382,179 B1
(45) Date of Patent: Aug. 5, 2025

(54) DETECTING EVENTS BY STREAMING POOLED LOCATION FEATURES FROM CAMERAS

(71) Applicant: Amazon Technologies, Inc., Seattle, WA (US)

(72) Inventors: Mayank Bansal, Sunnyvale, CA (US); Gerard Guy Medioni, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 348 days.

(21) Appl. No.: 17/709,015

(22) Filed: Mar. 30, 2022

(51) Int. Cl.
*H04N 23/695* (2023.01)
*G06N 20/00* (2019.01)
*G06V 20/52* (2022.01)
*G06V 40/20* (2022.01)
*H04N 23/951* (2023.01)

(52) U.S. Cl.
CPC .......... *H04N 23/695* (2023.01); *G06N 20/00* (2019.01); *G06V 20/52* (2022.01); *G06V 40/28* (2022.01); *H04N 23/951* (2023.01)

(58) Field of Classification Search
None
See application file for complete search history.

(56) References Cited

U.S. PATENT DOCUMENTS

| | | | |
|---|---|---|---|
| 6,154,559 A | 11/2000 | Beardsley | |
| 7,050,624 B2 | 5/2006 | Dialameh et al. | |
| 7,225,980 B2 | 6/2007 | Ku et al. | |
| 7,949,568 B2 | 5/2011 | Fano et al. | |
| 8,009,863 B1 | 8/2011 | Sharma et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |

(Continued)

FOREIGN PATENT DOCUMENTS

| CN | 104778690 B | 6/2017 |
|---|---|---|
| EP | 1574986 B1 | 7/2008 |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Chikaodili E Anyikire
(74) *Attorney, Agent, or Firm* — Athorus, PLLC

(57) ABSTRACT

Cameras having storage fixtures within their fields of view are programmed to capture images and process the images to determine whether such images depict an interaction by an actor with one of the storage fixtures. If a camera determines that an actor is present within imaging data captured thereby, the camera generates feature tensors from images captured over a predetermined period of time and pools the feature tensors into features corresponding to locations of the respective storage units of the actor within such images. Cameras provide pooled features to a multi-camera system that processes the pooled features to determine whether an interaction occurred at a storage unit, and to update a record of items associated with the actor accordingly.

20 Claims, 29 Drawing Sheets

(56) References Cited

U.S. PATENT DOCUMENTS

| | | | |
|---|---|---|---|
| 8,285,060 B2 | 10/2012 | Cobb et al. | |
| 8,369,622 B1 | 2/2013 | Hsu et al. | |
| 8,423,431 B1 | 4/2013 | Rouaix et al. | |
| RE44,225 E | 5/2013 | Aviv | |
| 8,577,705 B1 | 11/2013 | Baboo et al. | |
| 8,630,924 B2 | 1/2014 | Groenevelt et al. | |
| 8,688,598 B1 | 4/2014 | Shakes et al. | |
| 8,943,441 B1 | 1/2015 | Patrick et al. | |
| 9,158,974 B1 | 10/2015 | Laska et al. | |
| 9,160,979 B1 | 10/2015 | Ulmer | |
| 9,208,675 B2 | 12/2015 | Xu et al. | |
| 9,336,456 B2 | 5/2016 | Delean | |
| 9,449,233 B2 | 9/2016 | Taylor | |
| 9,473,747 B2 | 10/2016 | Kobres et al. | |
| 9,536,177 B2 | 1/2017 | Chalasani et al. | |
| 9,582,891 B2 | 2/2017 | Geiger et al. | |
| 9,727,838 B2 | 8/2017 | Campbell | |
| 9,846,840 B1 | 12/2017 | Lin et al. | |
| 9,881,221 B2 | 1/2018 | Bala et al. | |
| 9,898,677 B1 | 2/2018 | Andjelković et al. | |
| 9,911,290 B1 * | 3/2018 | Zalewski | G06Q 20/12 |
| 10,055,853 B1 | 8/2018 | Fisher et al. | |
| 10,133,933 B1 | 11/2018 | Fisher et al. | |
| 10,147,210 B1 | 12/2018 | Desai et al. | |
| 10,192,415 B2 | 1/2019 | Heitz et al. | |
| 10,318,917 B1 * | 6/2019 | Goldstein | G06Q 20/203 |
| 10,354,262 B1 | 7/2019 | Hershey et al. | |
| 10,438,277 B1 | 10/2019 | Jiang et al. | |
| 10,474,992 B2 | 11/2019 | Fisher et al. | |
| 10,510,219 B1 | 12/2019 | Zalewski et al. | |
| 10,535,146 B1 | 1/2020 | Buibas et al. | |
| 10,635,844 B1 | 4/2020 | Roose et al. | |
| 10,699,421 B1 * | 6/2020 | Cherevatsky | G06V 20/52 |
| 10,839,203 B1 | 11/2020 | Guigues et al. | |
| 11,030,442 B1 | 6/2021 | Bergamo et al. | |
| 11,195,146 B2 | 12/2021 | Fisher et al. | |
| 11,232,294 B1 | 1/2022 | Banerjee et al. | |
| 11,270,260 B2 | 3/2022 | Fisher et al. | |
| 11,284,041 B1 | 3/2022 | Bergamo et al. | |
| 11,367,083 B1 | 6/2022 | Saurabh et al. | |
| 11,468,698 B1 | 10/2022 | Kim et al. | |
| 11,482,045 B1 * | 10/2022 | Kim | G06V 20/52 |
| 11,538,186 B2 | 12/2022 | Fisher et al. | |
| 2003/0002712 A1 | 1/2003 | Steenburgh et al. | |
| 2003/0002717 A1 | 1/2003 | Hamid | |
| 2003/0107649 A1 | 6/2003 | Flickner et al. | |
| 2003/0128337 A1 | 7/2003 | Jaynes et al. | |
| 2004/0181467 A1 | 9/2004 | Raiyani et al. | |
| 2005/0251347 A1 | 11/2005 | Perona et al. | |
| 2006/0018516 A1 | 1/2006 | Masoud et al. | |
| 2006/0061583 A1 | 3/2006 | Spooner et al. | |
| 2006/0222206 A1 | 10/2006 | Garoutte | |
| 2007/0092133 A1 | 4/2007 | Luo | |
| 2007/0156625 A1 | 7/2007 | Visel | |
| 2007/0182818 A1 | 8/2007 | Buehler | |
| 2007/0242066 A1 | 10/2007 | Rosenthal | |
| 2007/0276776 A1 | 11/2007 | Sagher et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0137989 A1 | 6/2008 | Ng et al. | |
| 2008/0159634 A1 | 7/2008 | Sharma et al. | |
| 2008/0166019 A1 | 7/2008 | Lee | |
| 2008/0193010 A1 | 8/2008 | Eaton et al. | |
| 2008/0195315 A1 | 8/2008 | Hu et al. | |
| 2009/0060352 A1 | 3/2009 | Distante et al. | |
| 2009/0083815 A1 | 3/2009 | McMaster et al. | |
| 2009/0121017 A1 | 5/2009 | Cato et al. | |
| 2009/0132371 A1 | 5/2009 | Strietzel et al. | |
| 2009/0210367 A1 | 8/2009 | Armstrong et al. | |
| 2009/0245573 A1 | 10/2009 | Saptharishi et al. | |
| 2009/0276705 A1 | 11/2009 | Ozdemir et al. | |
| 2010/0002082 A1 | 1/2010 | Buehler et al. | |
| 2010/0033574 A1 | 2/2010 | Ran et al. | |
| 2011/0011936 A1 | 1/2011 | Morandi et al. | |
| 2011/0205022 A1 | 8/2011 | Cavallaro et al. | |
| 2012/0148103 A1 | 6/2012 | Hampel et al. | |
| 2012/0159290 A1 | 6/2012 | Pulsipher et al. | |
| 2012/0257789 A1 | 10/2012 | Lee et al. | |
| 2012/0284132 A1 | 11/2012 | Kim et al. | |
| 2012/0327220 A1 | 12/2012 | Ma | |
| 2013/0076898 A1 | 3/2013 | Philippe et al. | |
| 2013/0095961 A1 | 4/2013 | Marty et al. | |
| 2013/0156260 A1 | 6/2013 | Craig | |
| 2013/0253700 A1 | 9/2013 | Carson et al. | |
| 2013/0322767 A1 | 12/2013 | Chao et al. | |
| 2014/0139633 A1 | 5/2014 | Wang et al. | |
| 2014/0139655 A1 | 5/2014 | Mimar | |
| 2014/0259056 A1 | 9/2014 | Grusd | |
| 2014/0279294 A1 | 9/2014 | Field-Darragh et al. | |
| 2014/0282162 A1 | 9/2014 | Fein et al. | |
| 2014/0334675 A1 | 11/2014 | Chu et al. | |
| 2014/0362195 A1 | 12/2014 | Ng-Thow-Hing et al. | |
| 2014/0362223 A1 | 12/2014 | LaCroix et al. | |
| 2014/0379296 A1 | 12/2014 | Nathan et al. | |
| 2015/0019391 A1 | 1/2015 | Kumar et al. | |
| 2015/0039458 A1 | 2/2015 | Reid | |
| 2015/0073907 A1 | 3/2015 | Purves et al. | |
| 2015/0131851 A1 | 5/2015 | Bernal et al. | |
| 2015/0199824 A1 | 7/2015 | Kim et al. | |
| 2015/0206188 A1 | 7/2015 | Tanigawa et al. | |
| 2015/0262116 A1 | 9/2015 | Katircioglu et al. | |
| 2015/0269143 A1 | 9/2015 | Park et al. | |
| 2015/0294483 A1 | 10/2015 | Wells et al. | |
| 2016/0003636 A1 | 1/2016 | Ng-Thow-Hing et al. | |
| 2016/0125245 A1 | 5/2016 | Saitwal et al. | |
| 2016/0127641 A1 | 5/2016 | Gove | |
| 2016/0292881 A1 | 10/2016 | Bose et al. | |
| 2016/0307335 A1 | 10/2016 | Perry et al. | |
| 2017/0116473 A1 | 4/2017 | Sashida et al. | |
| 2017/0206669 A1 | 7/2017 | Saleemi et al. | |
| 2017/0262994 A1 | 9/2017 | Kudriashov et al. | |
| 2017/0278255 A1 | 9/2017 | Shingu et al. | |
| 2017/0309136 A1 | 10/2017 | Schoner | |
| 2017/0323376 A1 | 11/2017 | Glaser et al. | |
| 2017/0345165 A1 | 11/2017 | Stanhill et al. | |
| 2017/0353661 A1 | 12/2017 | Kawamura | |
| 2018/0025175 A1 | 1/2018 | Kato | |
| 2018/0070056 A1 | 3/2018 | DeAngelis et al. | |
| 2018/0084242 A1 | 3/2018 | Rublee et al. | |
| 2018/0164103 A1 | 6/2018 | Hill | |
| 2018/0165728 A1 | 6/2018 | McDonald et al. | |
| 2018/0218515 A1 | 8/2018 | Terekhov et al. | |
| 2018/0315329 A1 | 11/2018 | D'Amato et al. | |
| 2018/0343442 A1 | 11/2018 | Yoshikawa et al. | |
| 2019/0043003 A1 | 2/2019 | Fisher et al. | |
| 2019/0073627 A1 | 3/2019 | Nakdimon et al. | |
| 2019/0102044 A1 | 4/2019 | Wang et al. | |
| 2019/0156274 A1 | 5/2019 | Fisher et al. | |
| 2019/0156277 A1 | 5/2019 | Fisher et al. | |
| 2019/0158801 A1 | 5/2019 | Matsubayashi | |
| 2019/0236531 A1 | 8/2019 | Adato et al. | |
| 2019/0315329 A1 | 10/2019 | Adamski et al. | |
| 2020/0005490 A1 | 1/2020 | Paik et al. | |
| 2020/0043086 A1 | 2/2020 | Sorensen | |
| 2020/0090484 A1 | 3/2020 | Chen et al. | |
| 2020/0279382 A1 | 9/2020 | Zhang et al. | |
| 2020/0320287 A1 | 10/2020 | Porikli et al. | |
| 2020/0381111 A1 | 12/2020 | Huang et al. | |
| 2021/0019914 A1 | 1/2021 | Lipchin et al. | |
| 2021/0027485 A1 | 1/2021 | Zhang | |
| 2021/0124936 A1 | 4/2021 | Mirza et al. | |
| 2021/0125341 A1 | 4/2021 | Mirza et al. | |
| 2021/0182922 A1 | 6/2021 | Zheng et al. | |

FOREIGN PATENT DOCUMENTS

| | | |
|---|---|---|
| JP | 2013196199 A | 9/2013 |
| JP | 201489626 A | 5/2014 |
| JP | 2018207336 A | 12/2018 |
| JP | 2019018743 A | 2/2019 |
| JP | 2019096996 A | 6/2019 |
| KR | 20170006097 A | 1/2017 |

(56) References Cited

FOREIGN PATENT DOCUMENTS

| WO | 0021021 | A1 | 4/2000 |
|----|---------|----|--------|
| WO | 02059836 | A2 | 8/2002 |
| WO | 2017151241 | A2 | 9/2017 |

OTHER PUBLICATIONS

Black, J. et al., "Multi View Image Surveillance and Tracking," IEEE Proceedings of the Workshop on Motion and Video Computing, 2002, https://www.researchgate.net/publication/4004539_Multi_view_image_surveillance_and_tracking/link/0c96051ac521f09b5b000000/download, pp. 1-6.

Ciplak G, Telceken S., "Moving Object Tracking Within Surveillance Video Sequences Based on EDContours," 2015 9th International Conference on Electrical and Electronics Engineering (ELECO), Nov. 26, 2015 (pp. 720-723). IEEE.

Cristian Pop, "Introduction to the BodyCom Technology", Microchip AN1391, May 2, 2011, pp. 1-24, vol. AN1391, No. DS01391A, Publisher: 2011 Microchip Technology Inc.

Fuentes et al., "People tracking in surveillance applications," Proceedings 2nd IEEE Int. Workshop on PETS, Kauai, Hawaii, USA, Dec. 9, 2001, 6 pages.

Grinciunaite, A., et al., "Human Pose Estimation in Space and Time Using 3D CNN," ECCV Workshop on Brave New Ideas for Motion Representations in Videos, Oct. 19, 2016, URL: https://arxiv.org/pdf/1609.00036.pdf, 7 pages.

Harville, M.,"Stereo Person Tracking with Adaptive Plan-View Templates of Height and Occupancy Statistics," Image and Vision Computing, vol. 22, Issue 2, Feb. 1, 2004, https://www.researchgate.net/publication/223214495_Stereo_person_tracking_with_adaptive_plan-view_templates_of_height_and_occupancy_statistics/link/5e294888a6fdcc70a1437262/download, pp. 127-142.

He, K., et al., "Identity Mappings in Deep Residual Networks," ECCV 2016 Camera-Ready, URL: https://arxiv.org/pdf/1603.05027.pdf, Jul. 25, 2016, 15 pages.

Huang, K. S. et al. "Driver's View and Vehicle Surround Estimation Using Omnidirectional Video Stream," IEEE V2003 Intelligent Vehicles Symposium. Proceedings (Cal. No.03TH8683), Jun. 9-11, 2003, http://cvrr.ucsd.edu/VOW2/papers/IV03DrView_Final_Header.pdf, pp. 444-449.

Lee, K. and Kacorri, H., (May 2019), "Hands Holding Clues for Object Recognition in Teachable Machines", In Proceedings of the 2019 CHI Conference on Human Factors in Computing Systems (pp. 1-12).

Liu, C., et al. "Accelerating Vanishing Point-Based Line Sampling Scheme for Real-Time People Localization", IEEE Transactions on Circuits and Systems for Video Technology. vol. 27. No. 3 Mar. 2017 (Year: 2017).

Longuet-Higgins, H.C., "A Computer Algorithm for Reconstructing a Scene from Two Projections," Nature 293, Sep. 10, 1981, https://cseweb.ucsd.edu/classes/fa01/cse291/hclh/SceneReconstruction.pdf, pp. 133-135.

Manocha et al., "Object Tracking Techniques for Video Tracking: A Survey," The International Journal of Engineering and Science (IJES), vol. 3, Issue 6, pp. 25-29, 2014.

Phalke K, Hegadi R., "Pixel Based Object Tracking," 2015 2nd International Conference on Signal Processing and Integrated Networks (SPIN), Feb. 19, 2015 (pp. 575-578). IEEE.

Redmon, J., et al., "You Only Look Once: Unified, Real-Time Object Detection," University of Washington, Allen Institute for AI, Facebook AI Research, URL: https://arxiv.org/pdf/1506.02640.pdf, May 9, 2016, 10 pages.

Redmon, Joseph and Ali Farhadi, "YOLO9000: Better, Faster, Stronger," URL: https://arxiv.org/pdf/1612.08242.pdf, Dec. 25, 2016, 9 pages.

Rossi, M. and Bozzoli, E. A., "Tracking and Counting Moving People," IEEE Int'l Conf. on Image Processing, ICIP-94, Nov. 13-16, 1994, http://citeseerx.ist.psu.edu/viewdoc/download;sessionid=463D09F419FA5595DBF9DEF30D7EC663?doi=10.1.1.331.6672&rep=rep1&type=pdf, 5 pages.

Sikdar A, Zheng YF, Xuan D., "Robust Object Tracking in the X-Z Domain," 2016 IEEE International Conference on Multisensor Fusion and Integration for Intelligent Systems (MFI), Sep. 19, 2016 (pp. 499-504). IEEE.

Toshev, Alexander and Christian Szegedy, "DeepPose: Human Pose Estimation via Deep Neural Networks," IEEE Conference on Computer Vision and Pattern Recognition, Aug. 20, 2014, URL: https://arxiv.org/pdf/1312.4659.pdf, 9 pages.

Vincze, M., "Robust Tracking of Ellipses at Frame Rate," Pattern Recognition, vol. 34, Issue 2, Feb. 2001, pp. 487-498.

Zhang, Z., "A Flexible New Technique for Camera Calibration," IEEE Transactions on Pattern Analysis and Machine Intelligence, vol. 22, No. 11, Nov. 2000, 5 pages.

Zhang, Z., "A Flexible New Technique for Camera Calibration," Technical Report MSR-TR-98-71, Microsoft Research, Microsoft Corporation, microsoft.com/en-us/research/wp-content/uploads/2016/02/tr98-71.pdf, 22 pages.

Zhang, Z., "A Flexible New Technique for Camera Calibration," Technical Report MSR-TR-98-71, Dec. 2, 1998, Microsoft Research, Microsoft Corporation, URL: https://www.microsoft.com/en-us/research/wp-content/uploads/2016/02/tr98-71.pdf, 22 pages.

\* cited by examiner

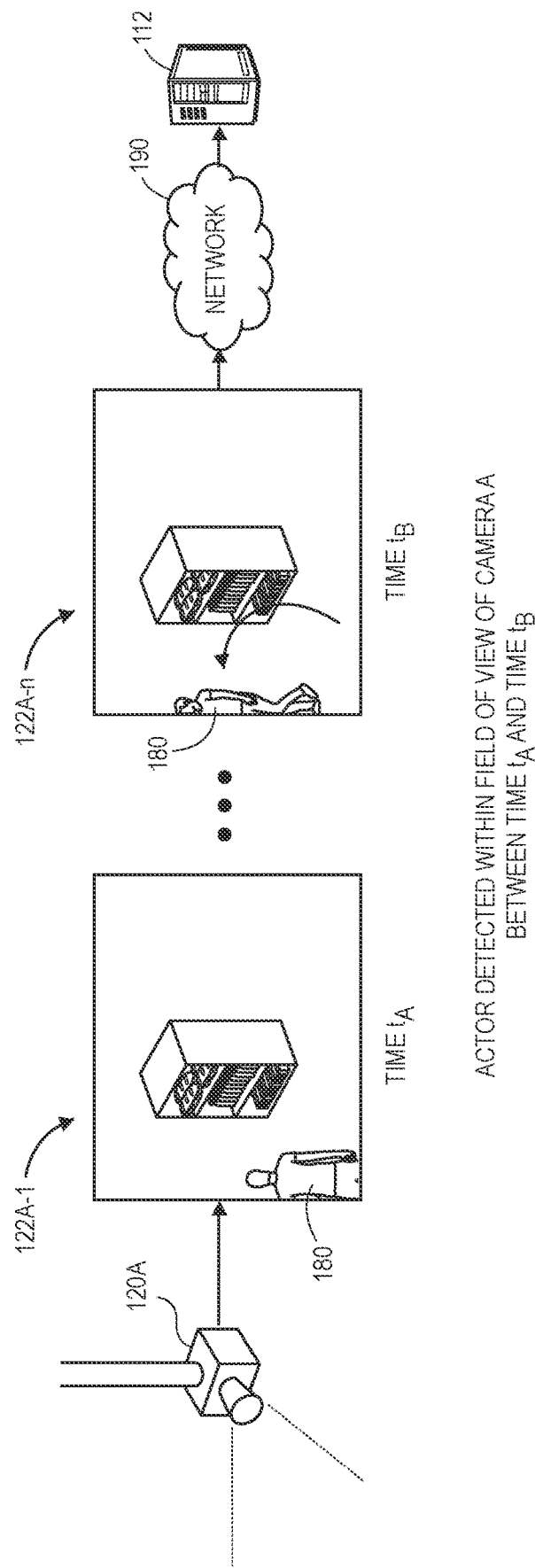

CAMERA B DETERMINES MAP OF BODY PARTS AND POSITIONS FROM IMAGE AND CROPS PORTIONS OF IMAGE DEPICTING HANDS

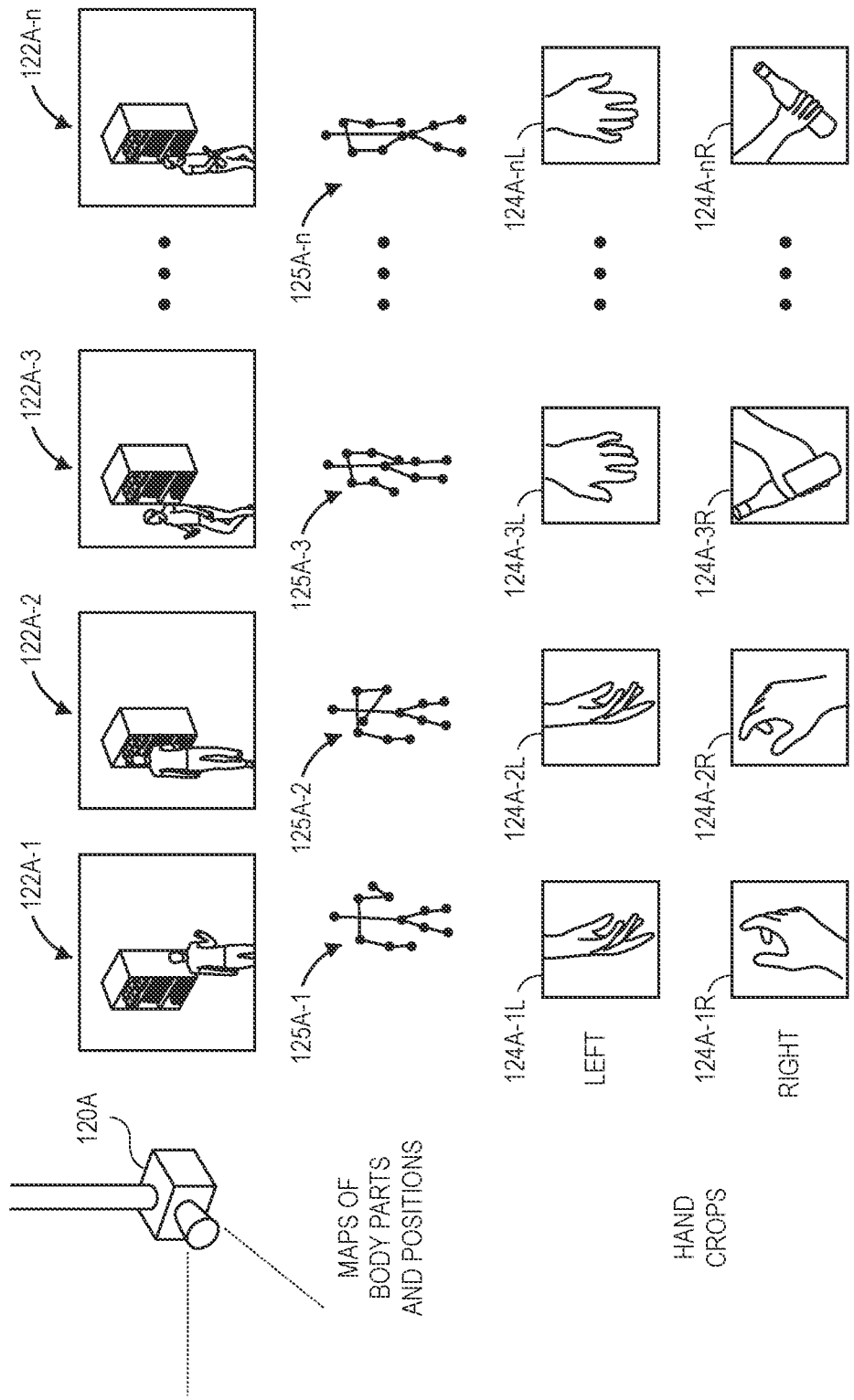

CAMERA A POOLS FEATURE TENSORS CALCULATED OVER INTERVALS $\Delta_t$

CAMERA B POOLS FEATURE TENSORS CALCULATED OVER INTERVALS $\Delta_t$

HYPOTHESIS DETERMINED FROM POOLED FEATURES
STREAMED AT INTERVALS Δt WHEN ACTOR
PRESENT WITHIN FIELDS OF VIEW

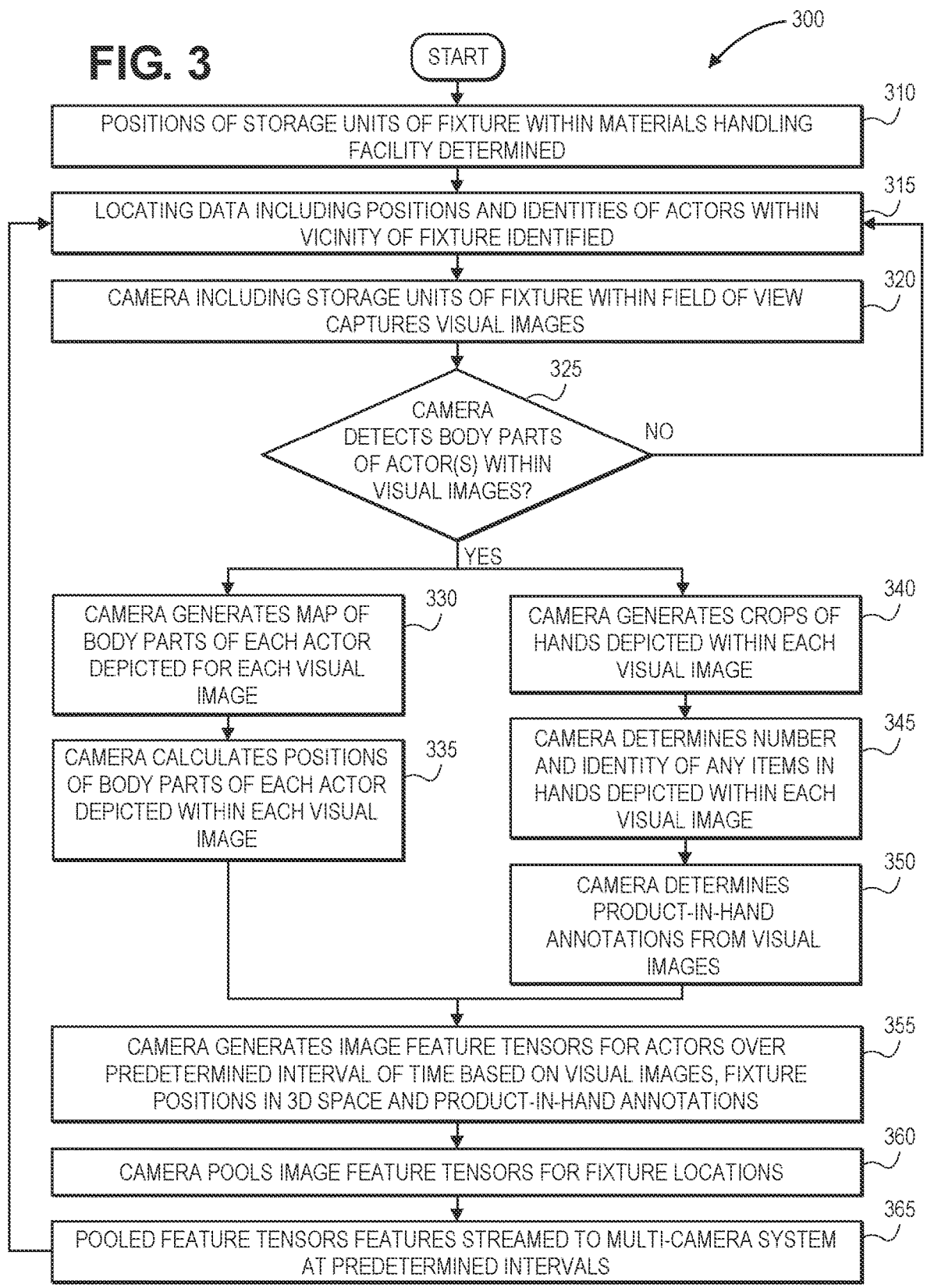

CAMERA 1 AND CAMERA 2 GENERATE AND POOL FEATURES
FOR CUSTOMER AND STORAGE UNIT
OVER INTERVALS Δt WHILE CUSTOMER WITHIN
FIELDS OF VIEW

CAMERA 3 AND CAMERA 4 GENERATE AND POOL FEATURES
FOR CUSTOMER AND STORAGE UNIT
OVER INTERVALS Δt WHILE CUSTOMER WITHIN
FIELDS OF VIEW

CAMERA POOLS FEATURES FOR STORAGE UNITS BASED ON ALL FEATURES CALCULATED FOR PORTIONS OF IMAGES DEPICTING STORAGE UNITS

CAMERA POOLS FEATURES FOR STORAGE UNITS BASED ON ONE OR MORE INDIVIDUALLY SELECTED FEATURES WITHIN PORTIONS OF IMAGES DEPICTING STORAGE UNITS

DETECTING EVENTS BY STREAMING POOLED LOCATION FEATURES FROM CAMERAS

BACKGROUND

Today, imaging devices are used in a wide number of applications for detecting and locating objects, such as actors, that are depicted within imaging data. For example, cameras are often used to monitor arrivals or departures of goods or performances of services in materials handling facilities such as warehouses, fulfillment centers, retail establishments or other like facilities, or to monitor travels of persons or objects in locations such as airports, stadiums or other dense environments, or on one or more sidewalks, roadways or highways. Cameras are also frequently installed and used in financial settings such as banks or casinos, where money changes hands in large amounts, at high rates of speed, or between large numbers of people.

In dynamic environments such as materials handling facilities, transportation centers, financial institutions or like facilities, it is frequently difficult to detect and locate large numbers of objects or actors using cameras. Many systems for detecting and locating objects or actors in three-dimensional (or "3D") space rely on large numbers of individual cameras to capture imaging data (e.g., visual images of an object, or depth images or other samples of depths or ranges to the object), and to provide the captured imaging data to servers or other centralized systems.

Determining whether an actor has executed a given event, e.g., a shopping event such as a taking of an object from a storage unit, a return of an object to the storage unit, or an event that involves neither a taking nor a return of an object, based on imaging data captured from large numbers of digital cameras may be a computationally expensive process that tends to consume or occupy substantial amounts of available data storage, processing and transmission capacities, and may require comparatively lengthy processing times.

BRIEF DESCRIPTION OF THE DRAWINGS

FIG. 3 is a flow chart of one process for detecting events in accordance with implementations of the present disclosure.

DETAILED DESCRIPTION

Figure 1A:
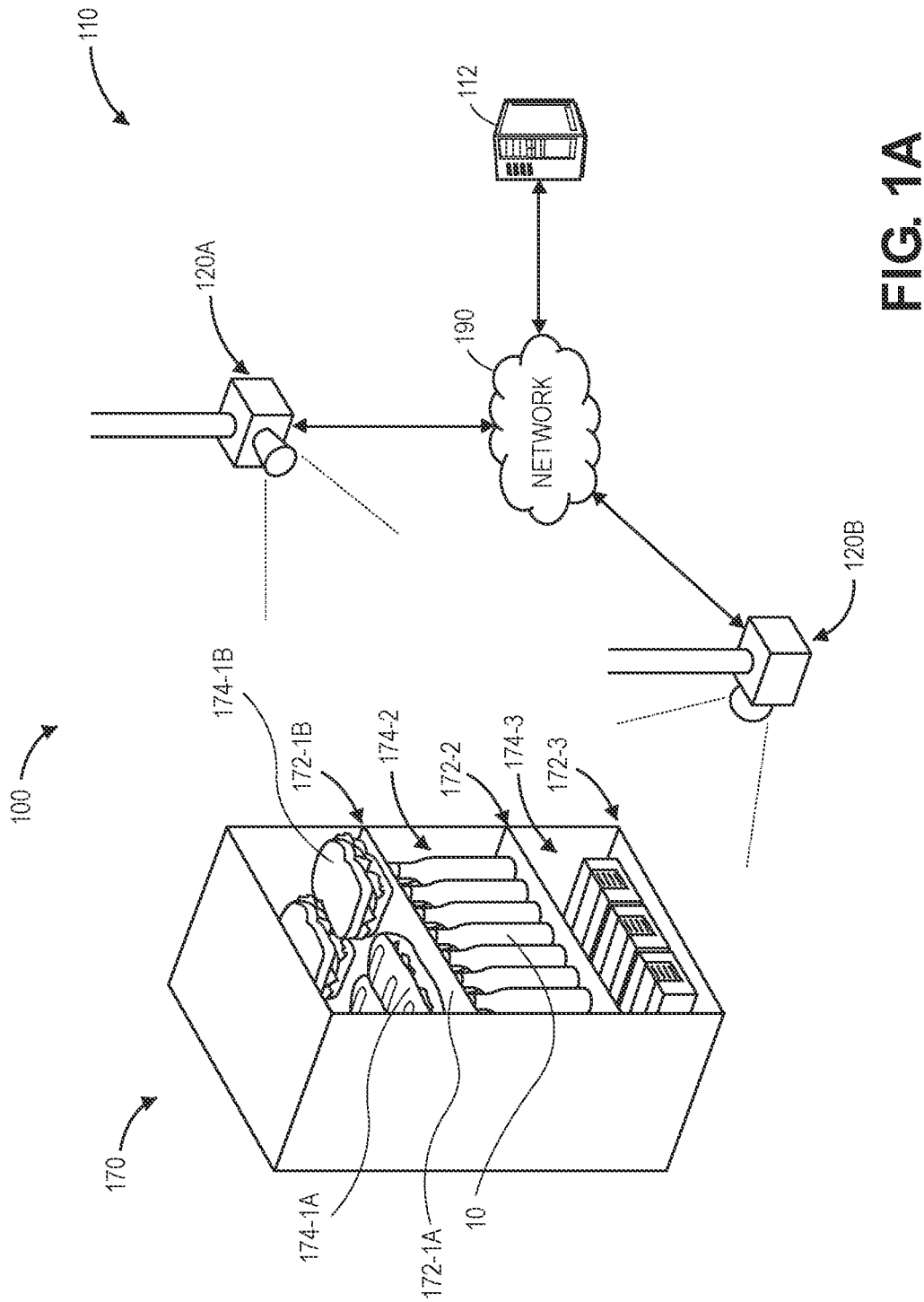
FIGS. 1A through 1N are views of aspects of one system for detecting events in accordance with implementations of the present disclosure.

As is set forth in greater detail below, the present disclosure is directed to systems and methods for detecting events by streaming location features from multiple cameras or other imaging devices. More specifically, one or more implementations of the present disclosure are directed to networks of cameras or other imaging devices that are programmed or configured to capture images from scenes that include one or more fixtures having storage units or other locations for accommodating items, and to process such images to determine features regarding the locations.

A camera is programmed with data regarding the locations (or positions) of a fixture having storage units within a materials handling facility. Images captured by the camera are processed by processor units provided on the camera to detect any body parts of actors (e.g., customers, workers or other persons) depicted therein. Where an actor is determined to be present within a field of view of a camera, images captured by the camera are processed by the processor units to determine features representative of locations depicted within the image, and to pool such features that are determined for the locations of each of the storage units of the fixture that are depicted within the image. The pooled features are streamed by the camera to a system that is configured to receive such pooled features from any number of cameras. A hypothesis of activity of an actor at the materials handling facility, including a number of items retrieved or deposited by the actor, may be determined from the pooled features and stored in association with the actor.

A set of data including features of locations of images may be generated for each actor that is known or determined to be present on a scene, and with respect to any storage unit provided on the scene that is depicted within the images. The set of data may include any number of features that are representative of activity occurring at a location of a storage unit depicted within the images and generated by any number of cameras over an interval (or period) of time having any duration. Such features may be pooled over the interval of time on any basis and transmitted to one or more systems to determine whether an interaction resulted in an event of interest, or to determine any information or data regarding the event of interest.

Where a system receives pooled features for one or more storage units that are streamed at intervals from a single camera, or from multiple cameras, the system may process the pooled features to determine whether an interaction with one or more items occurred at any of the storage units. For example, the system may generate a hypothesis representing numbers of predetermined shopping events (or interaction events) that are believed to have occurred over a period of time during which an actor was within a field of view of a camera based on any number of pooled features received from a camera or multiple cameras over intervals, and update the hypothesis based on pooled features subsequently received, until a hypothesis with a sufficiently high level of confidence has been determined from the pooled features. The predetermined shopping events may include, but need not be limited to, a picking or taking event (or a retrieval) by an actor, a return or deposit event (or a placement) by the actor, no events (e.g., neither pickings or takings nor returns or deposits, or any retrievals or placements) by the actor, or a multiple event (e.g., one or more pickings or takings and also one or more returns or deposits, or one or more retrievals and one or more placements) by the actor.

Moreover, where a hypothesis indicates that an actor has executed one or more shopping events or other interactions at storage units, information or data (e.g., planogram data) associating the storage units with one or more inventory items, as well as a number of items determined to be within such hands prior to or after the shopping events or interactions, and identities of any of such items, may be used to update a record associated with the actor.

In some implementations, cameras may be configured to capture visual imaging data at relatively high levels of resolution, or with any number of pixels per image or pixel densities, and at relatively high frame rates, e.g., fifteen or more frames per second (fps). In some implementations, a camera may be programmed with position data regarding a fixture or any storage units thereon, and may process images captured over an interval of time to generate features for each of such storage units at any frequency or interval, e.g., once per second, for the images captured over the preceding interval of time. Moreover, in some implementations, features may be calculated for locations of the images at a lower level of resolution than the images themselves, e.g., in a downsampled manner with respect to the images. Furthermore, in some implementations, where hands are detected within one or more images, the cameras may be programmed or otherwise configured to crop portions of the images depicting hands and process the images to determine a number of items within such hands, or to identify any such items.

Figure 1B:
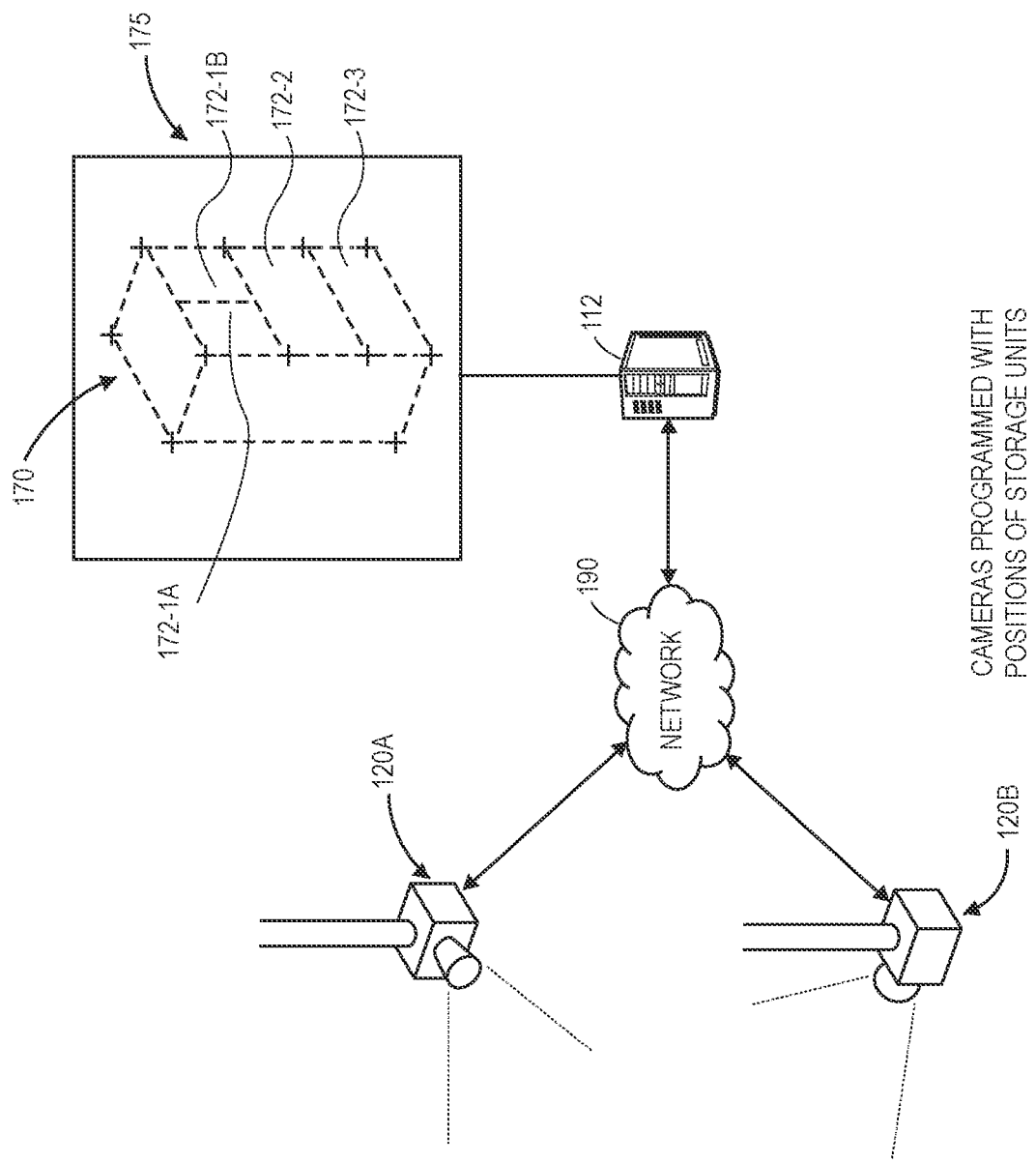
Figure 1C:
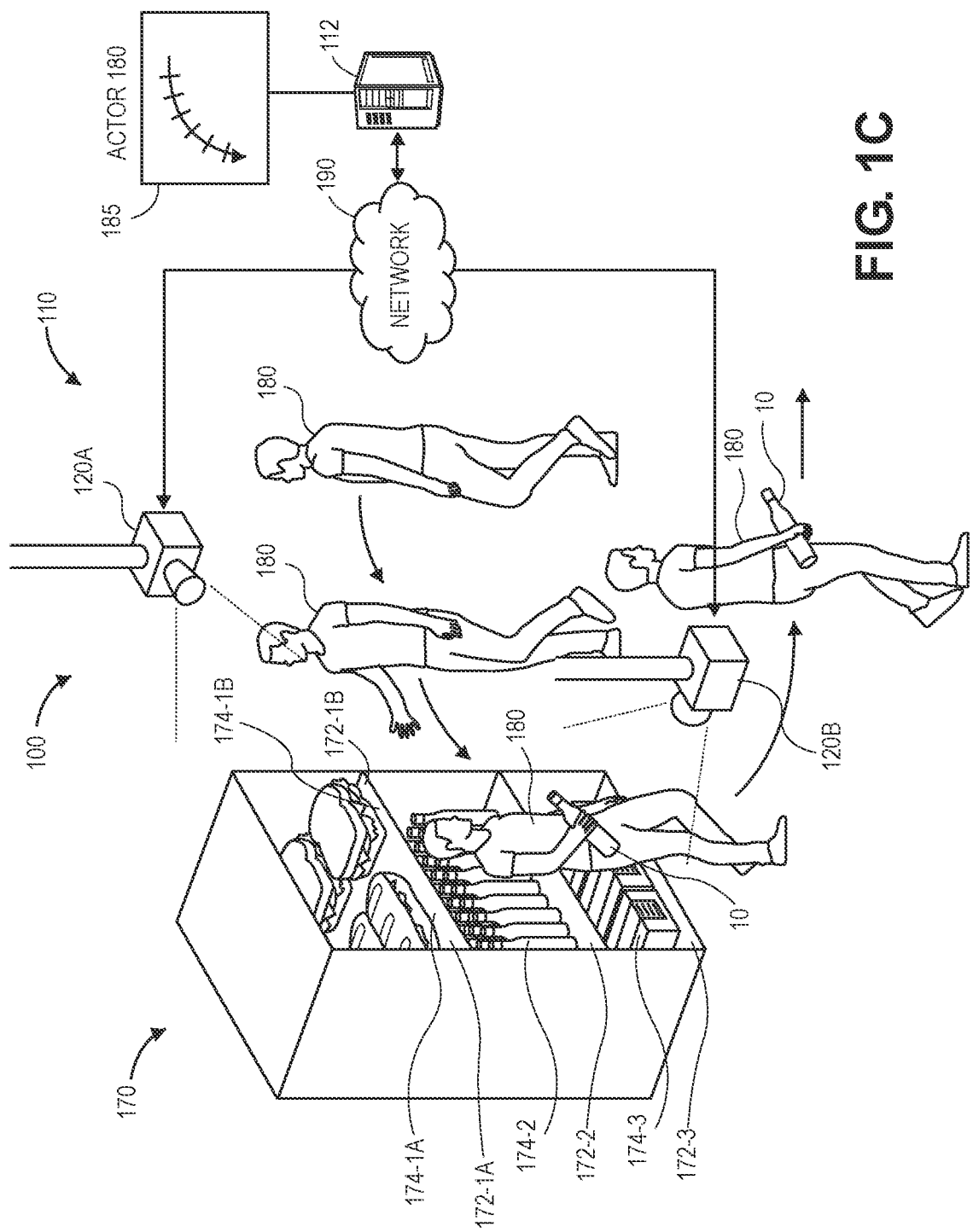
Figure 1E:
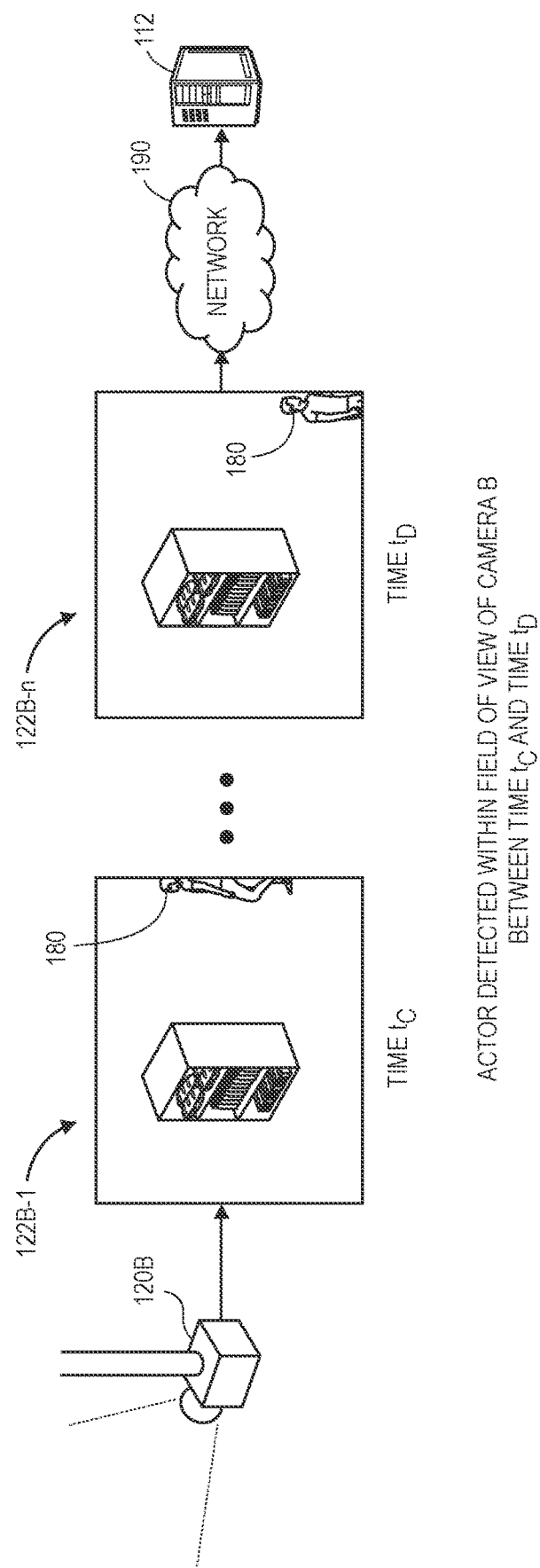
Figure 1F:
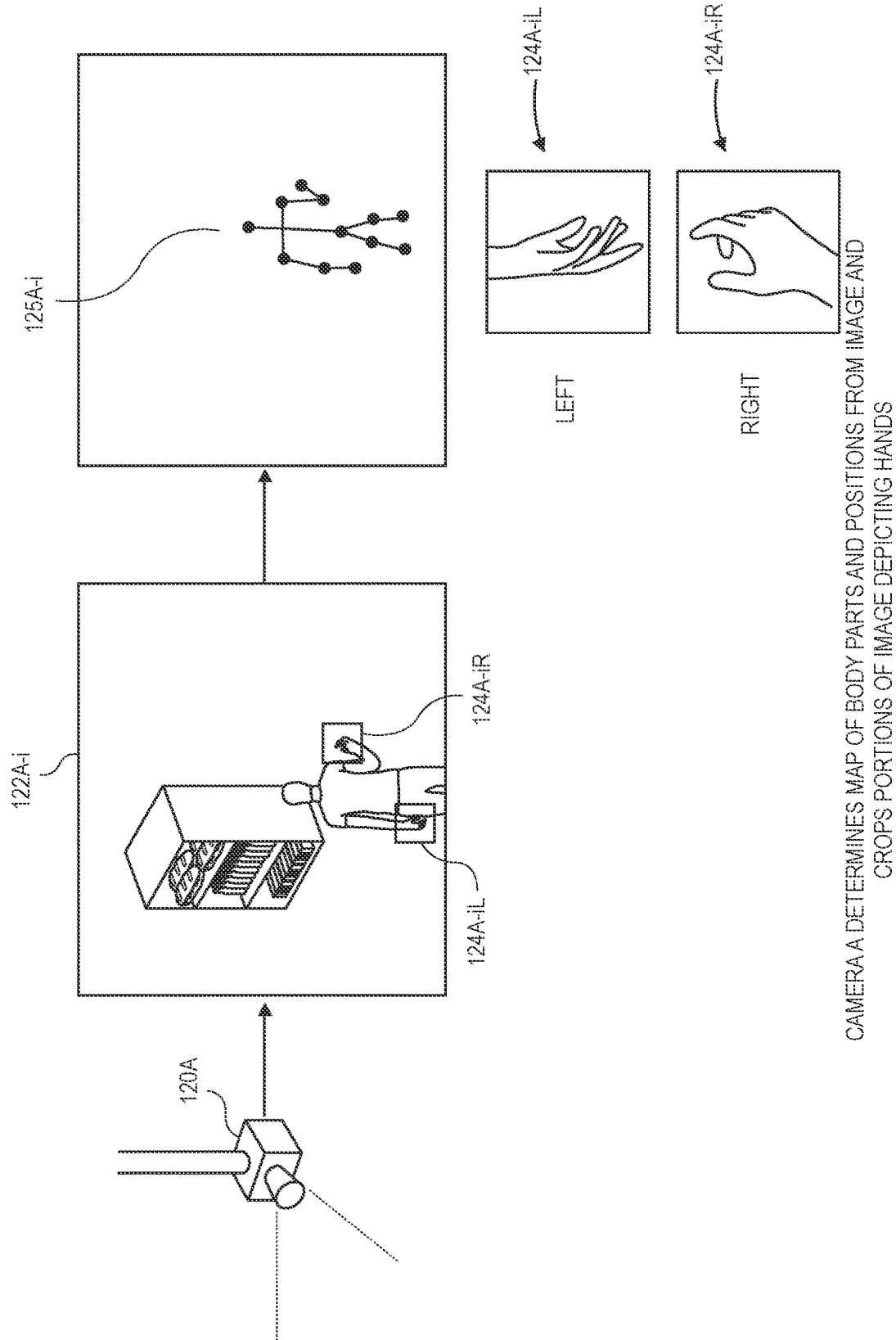
Figure 1G:
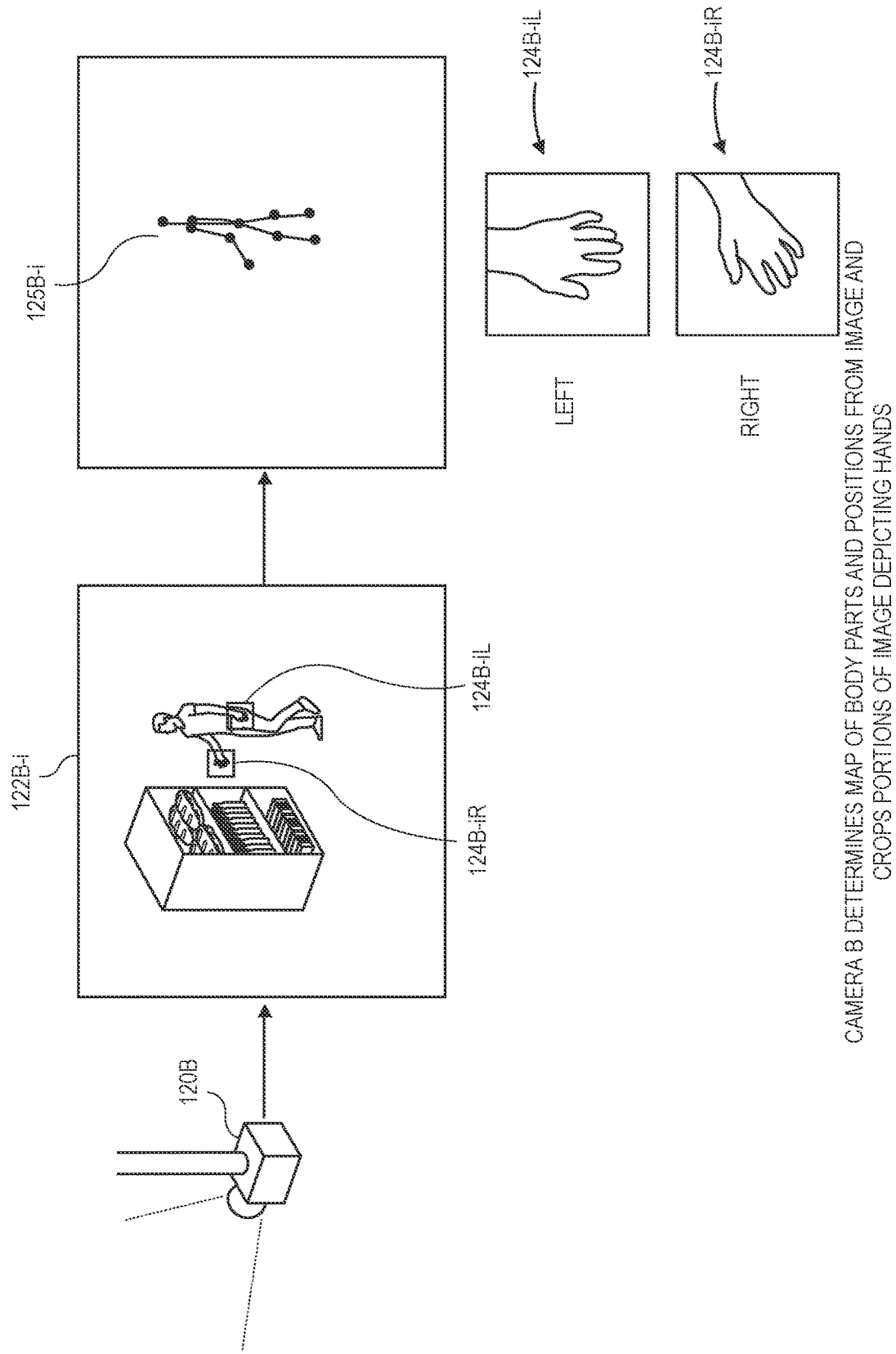
Figure 11:
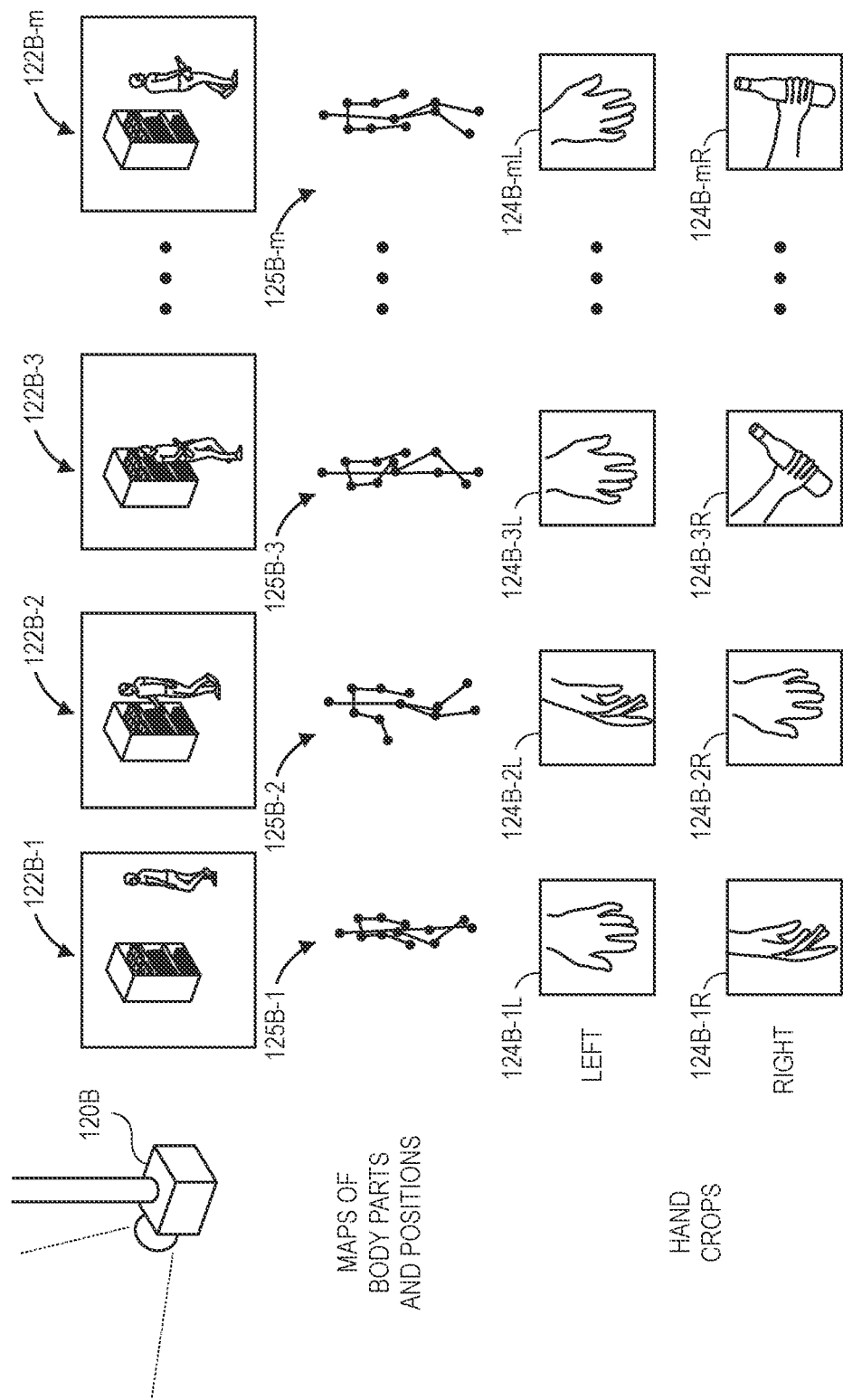
Figure 1J:
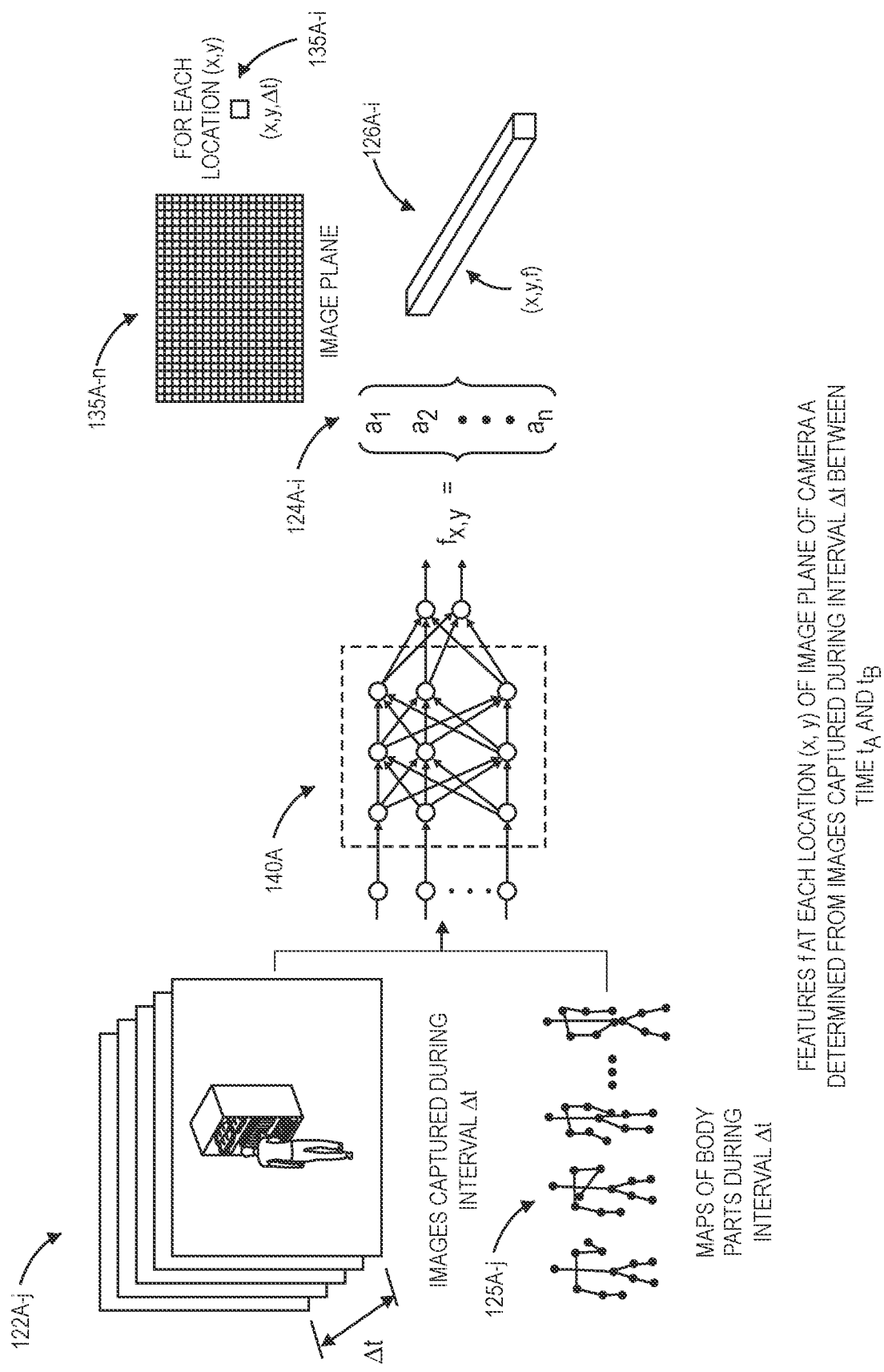
Figure 1K:
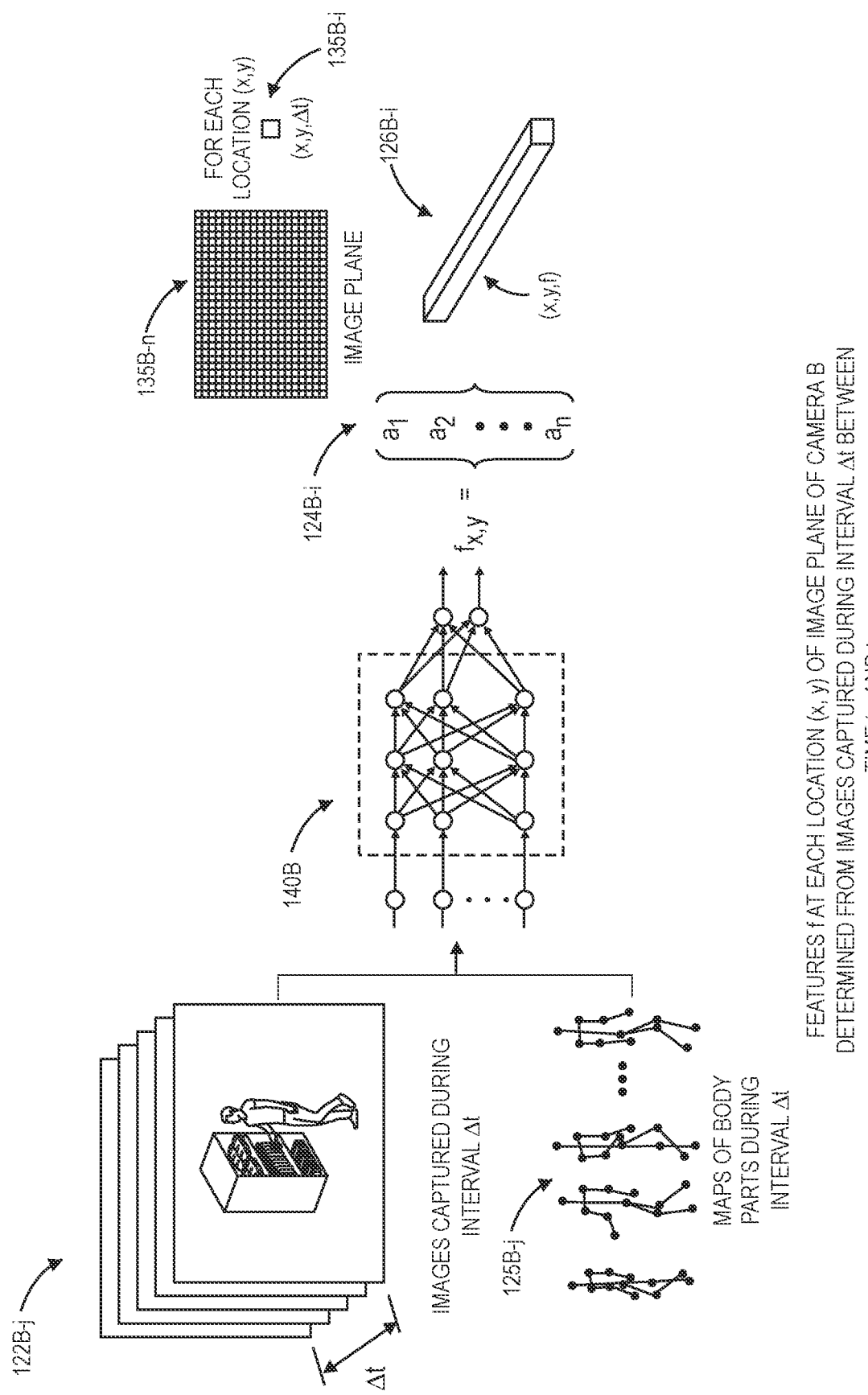
Figure 1L:
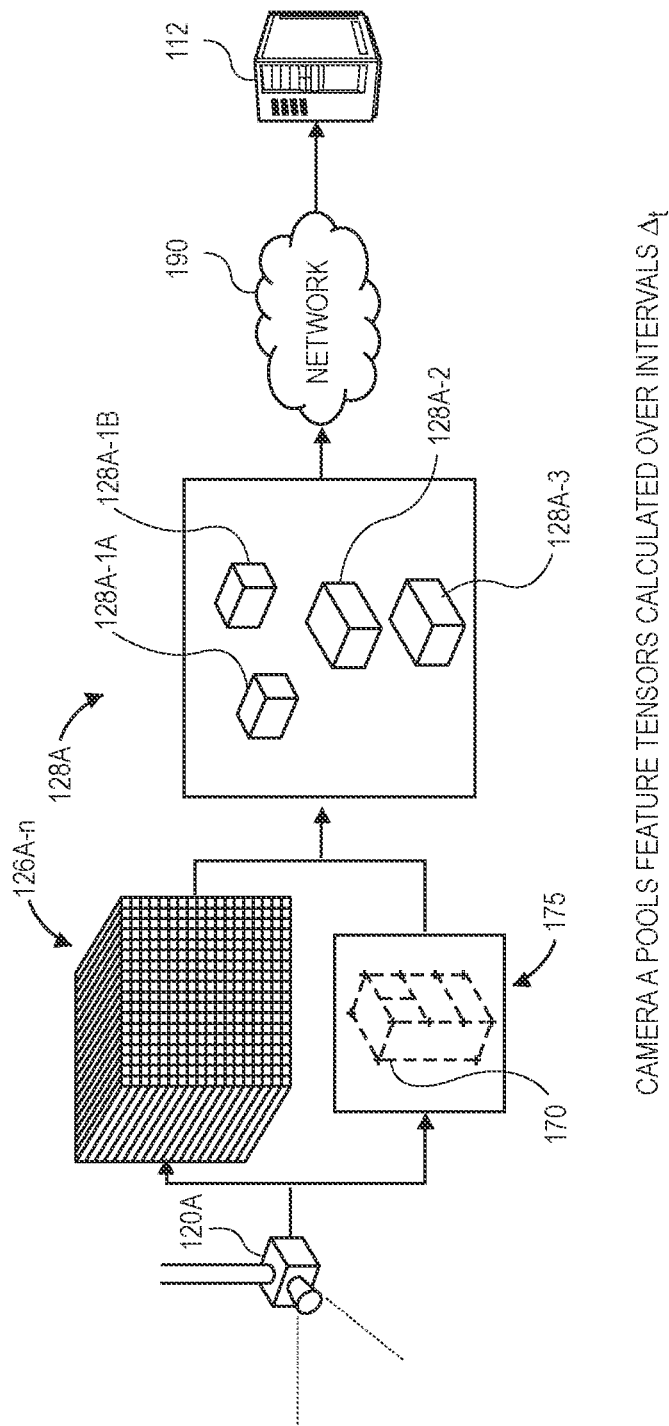
Figure 1M:
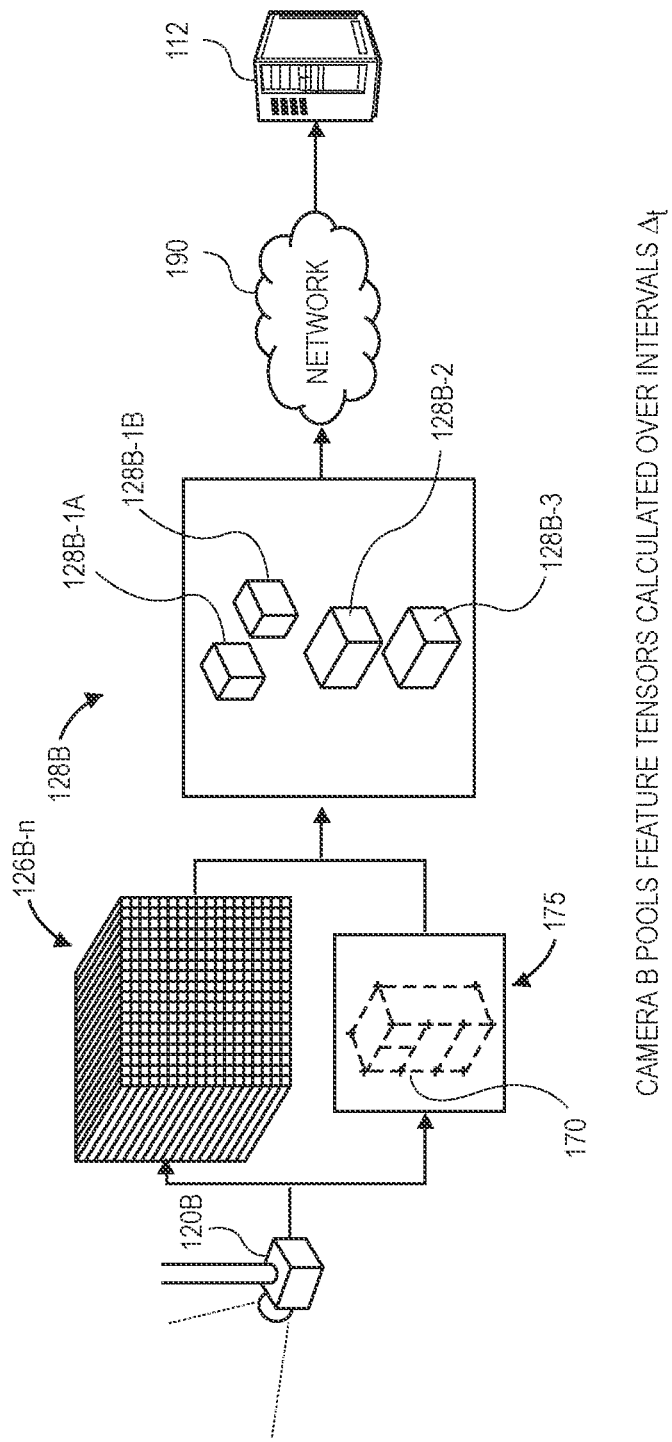
Figure 1N:
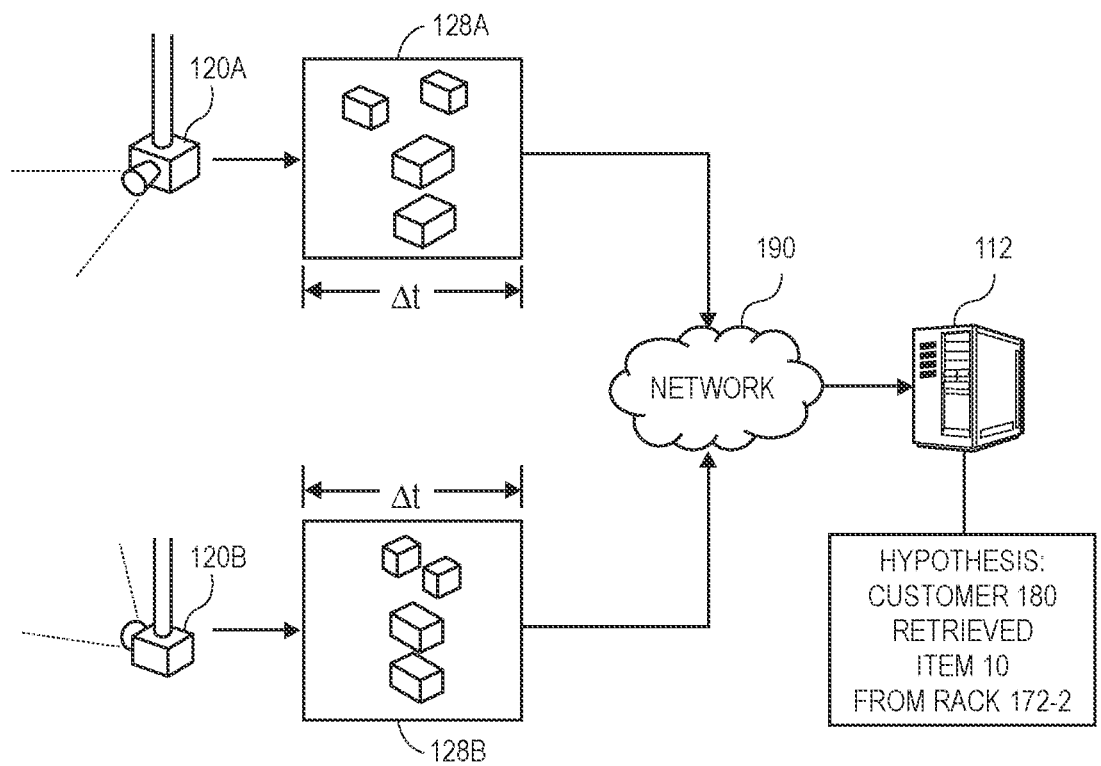

Referring to FIGS. 1A through 1N, views of aspects of one system 100 for detecting events in accordance with implementations of the present disclosure are shown. As is shown in FIG. 1A, the system 100 includes a scene 110 such as a materials handling facility, a fulfillment center, a warehouse, or any other like facility. The scene 110 includes a system 112 (e.g., a server), a plurality of cameras 120A, 120B, and a fixture 170 (e.g., a rack or another set of inventory shelves). The scene 110 may be any open or enclosed environment or space in which any number of actors (e.g., customers, workers or other humans, animals or machines) may execute one or more poses, gestures, movements or other interactions within the fields of view of the cameras 120A, 120B. The fixture 170 includes a plurality of storage units (e.g., portions of or spaces on individual inventory shelves) 172-1A, 172-1B, 172-2, 172-3 of the fixture 170. As is further shown in FIG. 1A, the storage units 172-1A, 172-1B are portions (e.g., lanes or other predefined sections) of a common platform such as a shelf, of the fixture 170 while the storage units 172-2, 172-3 are entireties of their respective platforms, such as shelves, of the fixture 170.

Each of the storage units 172-1A, 172-1B, 172-2, 172-3 includes a set of items 174-1A, 174-1B, 174-2, 174-3 thereon. For example, each of the sets of items 174-1A, 174-1B includes prepared sandwiches or other prepared foods of a common type or form, while the set of items 174-2 includes bottled beverages, and the set of items 174-3 includes boxed meals or other prepared foods.

The cameras 120A, 120B may include any number of lenses, memory or storage components, photosensitive surfaces, filters, chips, electrodes, clocks, boards, timers, power sources, connectors or any other components. In some implementations, the cameras 120A, 120B may have fields of view that overlap at least in part, and are aligned in different locations and at a non-parallel angle or orientation with respect to one another. In some implementations, the cameras 120A, 120B may be calibrated, such that mappings between coordinates of imaging data captured by the cameras 120A, 120B and directions relative to their respective image sensors are known. Additionally, the cameras 120A, 120B may be installed or otherwise operated independently or as components of an imaging device network (or camera network). For example, the cameras 120A, 120B may be in communication with one or more computer devices or systems (not shown), e.g., over one or more computer networks. Such devices or systems may include one or more databases or other data stores having information regarding attributes that are, have been or might be stored on the fixture 170, e.g., the sets of items 174-1A, 174-1B, 174-2, 174-3 on the storage units 172-1A, 172-1B, 172-2, 172-3. In some implementations, the attributes may include, but are not limited to, dimensions and/or masses of items, locations on the fixture 170 or the storage units 172-1A, 172-1B, 172-2, 172-3 where the items are typically placed, or colors or textures of surface elements (e.g., packaging, wrapping, coverings or the like) of items, or any other attributes. Alternatively, in some implementations, the scene 110 may include two or more cameras 120A, 120B provided in a common housing, and having fields of view extending from surfaces provided at a dihedral angle of greater than one hundred eighty degrees, e.g., approximately two hundred twenty-five degrees.

The cameras 120A, 120B may be configured to capture visual images (e.g., color, grayscale, or black-and-white images), or any other type or form of imaging data (e.g., depth images). In some implementations, the cameras 120A, 120B may include one or more sensors that are configured to capture visual imaging data at relatively high levels of resolution, any number of pixels (e.g., eight to nine megapixels) per image, and at relatively high frame rates, e.g., fifteen or more frames per second (fps). Such sensors may include arrays of photodetectors or photosensitive components such as charge coupled devices ("CCD"), complementary metal-oxide sensors ("CMOS"), photodiodes, or the like. The sensors may capture light scattered or reflected from objects and assign one or more quantitative values (e.g., red, green, blue or other color values, or distances or ranges to such objects) to aspects of the scattered or reflected light. Alternatively, or additionally, in some implementations, the cameras 120A, 120B may be configured to capture any other imaging data, such as depth imaging data, or visual imaging data at any levels of resolution or frame rates.

As is shown in FIG. 1A, the cameras 120A, 120B are in communication with the system 112 over the network 190, which may include the Internet in whole or in part. Alternatively, or additionally, either of the cameras 120A, 120B may be in communication with one another, or with any number of other external devices or systems, e.g., by one or more network connections (not shown). Additionally, in some implementations, the cameras 120A, 120B may be self-powered, e.g., by one or more power sources internal to or onboard the cameras 120A, 120B, such as batteries or fuel cells. In some other implementations, however, the cameras 120A, 120B may receive alternating current (or AC) or direct current (or DC) power from one or more external power sources, e.g., by one or more conductors or other connectors. For example, the cameras 120A, 120B may receive power by a dedicated connection to external devices or systems, or power sources, e.g., according to a Power over Ethernet (or "PoE") or a Universal Serial Bus Type-C ("USB-C") standard or system that may also be utilized to transfer information or data to or from the cameras 120A, 120B.

As is shown in FIG. 1B, each of the cameras 120A, 120B is programmed with position data 175 regarding aspects of the fixture 170 and the storage units 172-1A, 172-1B, 172-2, 172-3, which may be stored on or received from the system 112. For example, each of the cameras 120A, 120B may be programmed with coordinates or other position data representing locations of aspects of the fixture 170, or of the individual storage units 172-1A, 172-1B, 172-2, 172-3 thereon, in 3D space. The position data 175 may describe or represent areas or volumes including the fixture 170 as a whole, or the individual storage units 172-1A, 172-1B, 172-2, 172-3. The position data 175 may represent positions of the fixture 170 or each of the storage units 172-1A, 172-1B, 172-2, 172-3 in any manner, and with any level of granularity or specificity. For example, such positions may be represented in 3D space by a set of Cartesian coordinates, or coordinates according to any other system, e.g., a local coordinate system unique to the scene 110.

The position data 175 may be updated from time to time, as necessary, where positions or numbers of the fixture 170 or the storage units 172-1A, 172-1B, 172-2, 172-3, change for any reason. Moreover, although the scene 110 shown in FIG. 1A includes one fixture 170 having four storage units 172-1A, 172-1B, 172-2, 172-3 on three shelves or other platforms, and two cameras 120A, 120B having the fixture 170 and the storage units 172-1A, 172-1B, 172-2, 172-3 within their respective fields of view, the systems and methods of the present disclosure may be utilized in connection with scenes (e.g., portions of materials handling facilities) having any number of fixtures, storage units or cameras.

As is shown in FIG. 1C, an actor 180 (e.g., a customer, a worker or another human) executes one or more poses, gestures or other actions to retrieve an item 10 from the set of items 174-2 on the storage unit 172-2 of the fixture 170. Locating data (or tracking data) 185 regarding the actor 180 is provided to each of the cameras 120A, 120B by the system 112. The locating data 185 may include, but need not be limited to, an identifier of the actor 180, or one or more visual descriptors of pixels depicting the actor 180, including but not limited to appearance features of the actor 180, e.g., sets of information or data identifying colors, textures, shapes or other aspects of features of the actor 180, as well as a record of the positions of an actor at various times beginning at an initial detection and following with subsequent detections by one or more sensors. In some implementations, some or all of the locating data 185 may have been captured, determined or generated by either or both of the cameras 120A, 120B. In some other implementations, the locating data 185 may have been generated by the system 112, or by another computer system in communication with the system 112. For example, in some implementations, actors may be identified upon entering the scene 110, e.g., by scanning or interpreting a virtual credential or a physical credential, such as a sheet of paper, a mobile device having a display bearing a bar code (e.g., a one-dimensional or two-dimensional bar code, such as a QR bar code) or other symbol or marking that may be borne or presented by the actors at an entrance to the scene 110, or at another location associated with the scene 110. Alternatively, or additionally, actors may be identified upon entering the scene 110 by scanning or interpreting one or more body parts of such actors, such as hands of such actors, e.g., palms of such hands, which may be presented to one or more sensors by such actors at an entrance to the scene 110, or at another location associated with the scene 110.

Each of the cameras 120A, 120B is configured to capture images at a constant frame rate, and to process such images to determine whether any of such images depict one or more body parts of an actor, e.g., a customer, a worker or another human. As the actor 180 executes the one or more poses, gestures or other actions within the fields of view of the cameras 120A, 120B, images captured by the cameras 120A, 120B are processed to detect any body parts of the actor 180 that are depicted within such images, and to determine positions of such body parts in 3D space. In some implementations, each of the cameras 120A, 120B may be configured to execute one or more machine learning models, e.g., a deep neural network, a convolutional neural network or a support vector machine operating thereon, to detect body parts or positions thereof.

As is shown in FIG. 1D, the camera 120A processes a plurality of images 122A-1 . . . 122A-n captured between a time $t_A$ and a time $t_B$, and detects the actor 180 depicted within such images. For example, the camera 120A may capture and process the images 122A-1 . . . 122A-n to determine whether any of such images 122A-1 . . . 122A-n depict any body parts such as heads, arms, hands, torsos or portions thereof within any of such images 122A-1 . . . 122A-n. The camera 120A may be configured to execute a body part detection module (e.g., an algorithm, system or technique), which may be an artificial neural network, such as a convolutional neural network, or any other machine learning model, such as a segmentation network, that is trained to identify such body parts depicted within an image. In some implementations, a body part detection module may generate a segmentation record identifying segments of an image depicting body parts and their respective locations within the image. In some implementations, a body part detection module may be configured to detect portions of a body part, including but not limited to multiple portions of the same body part, e.g., an upper arm and a lower arm.

Similarly, as is shown in FIG. 1E, the camera 120B processes a plurality of images 122B-1 . . . 122B-n captured between a time $t_C$ and a time $t_D$, and detects the actor 180 depicted within such images. For example, the camera 120B may capture and process the images 122B-1 . . . 122B-n in the same manner described above with regard to the camera 120A, or in a different manner, to determine whether any of such images 122B-1 . . . 122B-n depict any body parts therein.

Each of the cameras 120A, 120B is also configured to determine locations of any body parts (e.g., heads, arms, hands, torsos or others, or portions thereof) depicted within images captured thereby, or positions of such body parts in 3D space, and to generate maps of such body parts from such images. As is shown in FIG. 1F, the camera 120A may generate a map 125A-i of body parts of the actor 180 from a representative image 122A-i of the images 122A-1 . . . 122A-n captured between the time $t_A$ and the time $t_B$. Locations of the body parts of the actor 180 may be detected within images 122A-i in any manner, such as based on local or maximum peak values within score maps generated for each of a plurality of body parts from outputs generated by one or more machine learning models operating thereon. In some implementations, the camera 120A may also process the images 122A-i to determine positions of body parts depicted therein based on one or more monocular cues within the field of view of the camera 120A, or in any other manner.

Upon detecting one or more body parts within the images 122A-i, the camera 120A may identify one or more attributes of portions or segments of such images 122A-i depicting such body parts, e.g., by image segmentation, image filtering, image smoothing and/or image localization, and may determine and store attributes of such sets of pixels, or the sets of pixels themselves, in one or more data stores. A camera 120A may further associate two or more of the body parts detected within the images 122A-i with one another. For example, the camera 120A may generate vectors of regression identifying pairs of body parts that are associated with one another, and assign probabilities that the pairs of body parts belong to a common actor, e.g., based on any number of physiological parameters or constraints, as well as any metrics of compatibility or incompatibility.

A camera may be programmed or configured to represent body parts of actors, or associations between such body parts, in any manner in accordance with implementations of the present disclosure. For example, the camera 120A may represent body parts in the form of a map, such as the map 125A-i shown in FIG. 1F, as well as a skeleton or any other representation, e.g., a parametric representation, which may be expressed within a two-dimensional image plane, or in 3D space, or according to any other standard.

Additionally, the camera 120A may further identify portions of the images 122A-i that depict hands, and crop and further process such portions to determine a number of items within such hands, or to identify any of such items. For example, as is also shown in FIG. 1F, portions of the images 122A-i depicting hands, viz., a portion 124A-iL of the image 122A-i depicting a left hand of the actor 180 and a portion 124A-iR of the image 122A-i depicting a right hand of the actor 180, may be identified and cropped or otherwise isolated and subsequently analyzed to determine whether such portions depict items within the hands, or to identify any items within the hands.

Similarly, as is shown in FIG. 1G, the camera 120B may generate a map 125B-i of body parts of the actor 180 from a representative image 122B-i of the images 122B-1 . . . 122B-n captured between the time $t_C$ and the time $t_D$. Locations of the body parts of the actor 180 may be detected within images 122B-i in any manner, and positions of body parts depicted therein in 3D space may also be determined in any other manner. Additionally, the camera 120B identifies and crops portions of the images 122B-i depicting hands, viz., portions 124B-iL of the images 122B-i depicting the left hand of the actor 180 and portions 124B-iR of the images 122B-i depicting the right hand of the actor 180, for subsequent analysis to determine whether such portions depict items within the hands.

Each of the cameras 120A, 120B may capture streams of images and process such images in a manner consistent with or similar to the processing of the representative images 122A-i, 122B-i shown in FIGS. 1F and 1G. For example, as is shown in FIG. 1H, the camera 120A captures a plurality of images 122A-1, 122A-2, 122A-3 . . . 122A-n over a period of time as the actor 180 performs various poses, gestures or other actions on the scene 110, including one or more interactions with the fixture 170 or the storage units 172-1A, 172-1B, 172-2, 172-3, within a field of view of the camera 120A. Additionally, as is shown in FIG. 1H, the camera 120A processes the images 122A-1, 122A-2, 122A-3 . . . 122A-n to generate maps 125A-1, 125A-2, 125A-3 . . . 125A-n of body parts of the actor 180 and determine positions of such body parts in 3D space. Additionally, portions of the images 122A-1, 122A-2, 122A-3 . . . 122A-n depicting hands may be isolated and identified, including but not limited to portions 124A-1L, 124A-2L, 124A-3L. 124A-nL depicting the left hand of the actor 180 and portions 124A-1R, 124A-2R, 124A-3R . . . 124A-nR depicting the right hand of the actor 180.

Similarly, as is shown in FIG. 1I, the camera 120B captures a plurality of images 122B-1, 122B-2, 122B-3 . . . 122B-m over the same period of time. The camera 120B processes the images 122B-1, 122B-2, 122B-3 . . . 122B-m to generate maps 125B-1, 125B-2, 125B-3 . . . 125B-m of body parts of the actor 180 and determine positions of such body parts in 3D space. Additionally, portions of the images 122B-1, 122B-2, 122B-3 . . . 122B-m depicting hands may be isolated and identified, including but not limited to portions 124B-1L, 124B-2L, 124B-3L 124B-mL depicting the left hand of the actor 180 and portions 124B-1R, 124B-2R, 124B-3R. 124B-mR depicting the right hand of the actor 180.

Where a camera determines positions of the hands of the actor 180 from images captured thereby, the camera may compare such positions to the position data 175 regarding the fixture 170 and the storage units 172-1A, 172-1B, 172-2, 172-3, to determine whether the actor 180 may be interacting with the fixture 170 or any of the storage units 172-1A, 172-1B, 172-2, 172-3. For example, in some implementations, where a camera is fixed in its position, and positions of the fixture 170 and the storage units 172-1A, 172-1B, 172-2, 172-3 in 3D space are known, locations of the fixture 170 and the storage units 172-1A, 172-1B, 172-2, 172-3 depicted within images captured by the camera may be determined by backprojecting such positions into an image plane of the camera.

In some implementations, a camera may generate a map of body parts from each of the images captured thereby with an actor (e.g., the actor 180) within a field of view, or crop or otherwise isolate portions of each of such images that depict hands of the actor. In some other implementations, however, a camera may generate a map of body parts from, or crop or isolate portions of, fewer than all of the images captured thereby with an actor within a field of view. For example, in some implementations, a camera may process images captured thereby at regular intervals, e.g., an interval of n images, or every nth image captured by the camera, where n is a predetermined number, such that the camera skips over one or more images, or otherwise processes fewer than all of the images captured thereby, to generate maps or crop or isolate portions thereof.

In accordance with implementations of the present disclosure, a camera may derive a set of features for each of a plurality of locations within images captured by the camera, or within an image plane of the camera, over an interval of time and stream the features to an external device or system while an actor remains present. Location features streamed by one or more cameras may be processed to derive a hypothesis as to whether an event occurred at each of such locations. As is shown in FIG. 1J, the camera 120A may process a plurality of images 122A-j captured during an interval of time $\Delta t$ between the time $t_A$ and the time $t_B$ and one or more of the maps 125A-j of body parts produced from such images 122A-j to determine sets of features 124A-i, or $f_{x,y}=\{a_1, a_2 \ldots a_n\}$, for each of a plurality of locations (x, y) of an image plane 135A-n of the camera 120A during the interval of time $\Delta t$. Each of the sets of features 124A-i may include values generated for a single location (x, y), or 135A-i, within the image plane 135A-n based on the images 122A-j captured by the camera 120A during the interval of time $\Delta t$, which may have any duration, e.g., one second, two seconds, five seconds or others, and the maps 125A-j generated based on detections of the actor 180 within one or more of the images 122A-j.

The sets of features 124A-i may be generated by providing the images 122A-j and the maps 125A-j as inputs to a machine learning model 140A, which may be an algorithm, a system or a technique such as an artificial neural network, e.g., a convolutional neural network, that is trained to generate outputs from which a set of features 124A-i, or $f_{x,y}=\{a_1, a_2 \ldots an\}$ may be derived for the one of the locations (x, y), or 135A-i, or for the image plane 135A-n as a whole, in response to the inputs.

The locations (x, y) of the image plane 135A-n for which the sets of features 124A-i are calculated may be of any size.

In some implementations, where the images 122A-j are high-resolution images having a substantially large number of image pixels arranged in an array of known dimensions, each of the locations (x, y) may be larger than one of the pixels of the images 122A-j by a predetermined factor, or may correspond to a predetermined number of such pixels of the images 122A-j. For example, in some implementations, the images 122A-j may have dimensions of 640 pixels by 480 pixels, and each of the locations (x, y) of the image plane 135A-n may represent a 3D volume of numbers having a number of cells that are reduced by a factor of eight with respect to the number of pixels of the images 122A-j, or 80×40.

Additionally, as is also shown in FIG. 1J, a feature tensor 126A-i is formed from the set of features 124A-i derived for each of such locations (x, y). Each of the set of features 124A-i may represent one or more attributes of a location (x, y) within each of the images 122A-j captured during the interval of time Δt, and may be processed to ultimately determine a probability as to whether an interaction with one or more items occurred at that location (x, y) prior to, during or after the interval of time Δt. The feature tensors 126A-i may have any length or number of digits or values in accordance with implementations of the present disclosure, and such values may but need not be readily interpreted as representing any semantic attributes. For example, in some implementations, the images 122A-j may have dimensions of 640 pixels by 480 pixels, and each of the locations (x, y) of the images 122A-j may represent a number of cells that are reduced by a factor of eight with respect to the number of pixels of the images 122A-j, or 80×60. Each of such feature tensors 126A-i may further represent a vector having any number of values (e.g., 512).

The images 122A-j from which the feature tensors 126A-i are derived may include a subset of the images 122A-n captured by the camera 120A during the interval of time Δt between the time $t_A$ and the time $t_B$. The images 122A-j may include any number of images, which may be determined as a product of a frame rate of the camera 120A and the interval of time Δt. For example, in some implementations, where the camera 120A has a frame rate of fifteen frames per second (or 15 fps, or 15 Hz), and the interval of time Δt is one second in duration, the images 122A-j may include fifteen images.

Similarly, as is shown in FIG. 1K, the camera 120B may process a plurality of images 122B-j captured during an interval of time Δt between the time $t_C$ and the time $t_D$ and one or more of the maps 125B-j of body parts produced from such images 122B-j to determine sets of features 124B-i, or $f_{x,y}=\{a_1, a_2 \ldots a_n\}$, for each of a plurality of locations (x, y) of an image plane 135B-n of the camera 120B during the interval of time Δt. Each of the sets of features 124B-i may include values generated for a single location (x, y), or 135B-i, within the image plane 135B-n based on the images 122B-j captured by the camera 120B during the interval of time Δt, and the maps 125B-j generated based on detections of the actor 180 within one or more of the images 122B-j. The sets of features 124B-i may be generated by providing the images 122B-j and the maps 125B-j as inputs to a machine learning model 140B (e.g., an algorithm, a system or a technique such as an artificial neural network), and a set of features 124B-i, or $f_{x,y}=\{a_1, a_2 \ldots a_n\}$ may be derived for the one of the locations (x, y), or 135B-i, based on an output received from the machine learning model 140B in response to the inputs.

As is discussed above with regard to FIG. 1J, the locations (x, y) of the image plane 135B-n for which the sets of features 124B-i are calculated may be of any size, and may be larger than one of the pixels of the images 122B-j by a predetermined factor, or may correspond to a predetermined number of such pixels of the images 122B-j.

Additionally, as is also shown in FIG. 1K, a feature tensor 126B-i is formed from the set of features 124B-i derived for each of such locations (x, y). Each of the set of features 124B-i may represent one or more attributes of a location (x, y) within each of the images 122B-j captured during the interval of time Δt, and may be processed to ultimately determine a probability as to whether an interaction with one or more items occurred at that location (x, y) prior to, during or after the interval of time Δt. The feature tensors 126B-i may have any length or number of digits or values in accordance with implementations of the present disclosure, and such values may but need not be readily interpreted as representing any semantic attributes.

The images 122B-j from which the feature tensors 126B-i are derived may include a subset of the images 122B-n captured by the camera 120B during the interval of time Δt between the time $t_C$ and the time tp. The images 122B-j may include any number of images, which may be determined as a product of a frame rate of the camera 120B and the interval of time Δt.

As is shown in FIG. 1L, the camera 120A pools the feature tensors 126A-n calculated for the images 122A-j captured over the interval of time Δt between the time $t_A$ and the time $t_B$, as shown in FIG. 1J, and transmits a set of the pooled feature tensors 128A to the system 112 over the one or more networks 190. The set of pooled feature tensors 128A includes a pool (or a set) 128A-1A of all of the feature tensors 126A-n corresponding to the storage unit 172-1A depicted within images captured by the camera 120A, a pool (or a set) 128A-1B of all of the feature tensors 126A-n corresponding to the storage unit 172-1B depicted within images captured by the camera 120A, a pool (or a set) 128A-2 of all of the feature tensors 126A-n corresponding to the storage unit 172-2 depicted within images captured by the camera 120A, and a pool (or a set) 128A-3 of all of the feature tensors 126A-n corresponding to the storage unit 172-3 depicted within images captured by the camera 120A. The predetermined interval of time Δt may have any duration, e.g., one second, two seconds, five seconds or others. The set of pooled feature tensors 128A represent probabilities or likelihoods that an interaction with one of the storage units 172-1A, 172-1B, 172-2, 172-3 by the actor 180 occurred within the predetermined interval of time Δt.

Similarly, as is shown in FIG. 1M, the camera 120B pools feature tensors 126B-n calculated for the images 122B-j captured over the interval of time Δt between the time $t_C$ and the time $t_D$, as shown in FIG. 1K, and transmits a set of pooled feature tensors 128B to the system 112 over the one or more networks 190. The set of pooled feature tensors 128B includes a pool (or a set) 128B-1A of all of the feature tensors 126B-n corresponding to the storage unit 172-1A depicted within images captured by the camera 120B, a pool (or a set) 128B-1B of all of the feature tensors 126B-n corresponding to the storage unit 172-1B depicted within images captured by the camera 120B, a pool (or a set) 128B-2 of all of the feature tensors 126B-n corresponding to the storage unit 172-2 depicted within images captured by the camera 120B, and a pool (or a set) 128B-3 of all of the feature tensors 126B-n corresponding to the storage unit 172-3 depicted within images captured by the camera 120B.

In some implementations, a camera, e.g., either or both of the cameras 120A, 120B, may calculate image features and generate a feature tensor based on every image captured by the camera, or fewer than all of such images, as long as one or more actors is depicted within such images, or detected within a field of view of the camera. Likewise, in some implementations, a camera may pool feature tensors for a storage fixture or any storage units as long as one or more actors is depicted within such images, or detected within a field of view of the camera. Further, in some implementations, cameras may transmit pooled image features to a system as long as one or more actors is depicted within such images, or detected within a field of view of the camera.

As is shown in FIG. 1N, the camera 120A streams sets of pooled features 128A calculated at the intervals Δt between the time $t_A$ and the time $t_B$, and the camera 120B streams sets of pooled features 128B calculated at the intervals Δt between the time $t_C$ and the time to $t_D$ the system 112 over the one or more networks 190. The system 112 then processes the respective sets of pooled features 128A, 128B to determine a hypothesis as to whether an interaction with any of the storage units 172-1A, 172-1B, 172-2, 172-3 occurred during any of the intervals of time, as well as a level of confidence (e.g., a confidence score) in the hypothesis. For example, as is shown in FIG. 1N, based on the sets of pooled features 128A, 128B received from the cameras 120A, 120B, the system 112 determines a hypothesis that the actor 180 executed an interaction that resulted in the retrieval of an item 10 of the items 174-2 on the storage unit 172-2. Moreover, in some implementations, the cameras 120A, 120B may further determine information or data regarding items identified within hands of the actor 180 during such intervals, including identifiers or numbers of any of such items, and transmit such information or data to the system 112, which may process such information or data to identify any items associated with such interactions. To the extent that a level of confidence in the hypothesis determined based on the sets of pooled features 128A, 128B, is sufficiently high, the system 112 may update one or more records of items associated with the actor 180 accordingly. In some implementations, where a level of confidence in the hypothesis is sufficiently low, however, the system 112 may provide information or data regarding the actor 180 and/or the sets of pooled features 128A, 128B to one or more humans for their review.

Alternatively, or additionally, a hypothesis generated by the system 112 based on the sets of pooled features 128A, 128B may indicate that the actor 180 executed any number of retrievals or placements (e.g., returns) of any number of other items while the actor 180 was within either or both of the fields of view of the cameras 120A, 120B. Furthermore, the system 112 may modify, revise or update a hypothesis over time as multiple sets of pooled features 128A, 128B are subsequently received.

Accordingly, the systems and methods of the present disclosure are directed to detecting events by pooling features that are determined by cameras over intervals of time and streaming the pooled features to a system such as a central server in communication with each of such cameras. More specifically, some implementations of the present disclosure are directed to cameras that process images to detect features depicted therein, and to generate tensors representing such features for various locations within the image. The cameras may pool features corresponding to locations of fixtures having one or more storage units that are depicted within such images and transmit pooled features for locations of each of such storage units to a system that is configured to interpret the pooled features received from one or more of such cameras and determine whether any interactions with such storage units occurred based on such pooled features.

Each of the cameras may operate one or more machine learning systems to detect and locate body parts or other objects within images, and generate maps, positions or other representations of such body parts in 3D space from such images. Each of the cameras may be further configured to crop or otherwise isolate portions of such images depicting hands, and to determine whether the hands depicted therein contain any items (e.g., whether the hands are empty or full), or to identify any items within the hands.

Furthermore, images captured by cameras may be continuously processed, in order to determine a time at which an actor is detected within a field of view of a camera, or a time at which a hand or another body part has departed from the field of view of the camera. In some implementations, a detection of an actor within images captured by a camera may act as a trigger for the camera to calculate tensors of features for locations of images captured thereby, to pool such features based on locations of the storage fixture or the storage unit, or to transmit such pooled features to a system over one or more networks, as long as the actor is detected within such images and remains within the predetermined distance. In some implementations, the calculation of tensors of features for locations may be triggered by a determination that a hand or another body part is within a predetermined distance of a fixture or one or more storage units of the fixture.

In some implementations, one or more processors or processor units provided on cameras or other computer devices or systems may execute machine learning models (algorithms, systems or techniques such as artificial neural networks, e.g., convolutional neural networks) that are trained to receive images captured by the cameras as inputs and to generate one or more outputs associated with tasks relating to the images. Such tasks may include the detection of body parts (e.g., hands, heads, shoulders or others) within images, the identification of portions of images depicting such body parts or the analysis of such portions to determine whether any of such body parts includes an item, or the calculation of distances between body parts and locations of items. The models may have any number of layers associated with the performance of such tasks, or others.

In some implementations, cameras or other computer devices or systems may be configured to operate machine learning models that are trained to perform multiple tasks based on a single input. For example, in some implementations, a camera may execute a model that performs body part detection, cropping or isolation, object recognition, or other tasks based on each visual images captured thereby. The model may be constructed with a common, shared backbone and with one or more separate decoding layers, task layers, middle layers, or others. In some implementations, a model may be a convolutional neural network having one or more layers dedicated to the performance of each of a plurality of tasks, e.g., in a common architecture.

Those of ordinary skill in the pertinent arts will recognize that imaging data, e.g., visual imaging data, depth imaging data, infrared imaging data, or imaging data of any other type or form, may be captured using one or more imaging devices such as digital cameras, depth sensors, range cameras, infrared cameras or radiographic cameras. Such devices generally operate by capturing light that is scattered or reflected from objects, and by subsequently calculating or assigning one or more quantitative values to aspects of the scattered or reflected light, e.g., image pixels, then generating an output based on such values, and storing such values in one or more data stores. For example, a camera may include one or more image sensors (e.g., a photosensitive surface with a plurality of pixel sensors provided thereon), having one or more filters associated therewith. Such sensors may detect information regarding aspects of any number of image pixels of the scattered or reflected light corresponding to one or more base colors (e.g., red, green or blue), or distances to objects from which the light was scattered or reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network such as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBD or RGBz imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Scattered or reflected light may be captured or detected by an imaging device if the light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is scattered or reflected off objects of any kind to a sufficiently high degree of resolution using one or more sensors thereof, and store information regarding the scattered or reflected light in one or more data files.

Many imaging devices also include manual or automatic features for modifying their respective fields of view or orientations. For example, a camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a camera may virtually stretch or condense the pixels of an image in order to focus or broaden the field of view of the camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures, outlines or other aspects of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more machine learning models (e.g., algorithms, systems or techniques). The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which locating actors or other target objects or detecting events involving the actors or the target objects is desired, including but not limited to locating humans and/or machines within a materials handling facility, locating any other objects within a materials handling facility, or detecting events involving the humans or machines and such other objects. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to locate body parts of human operators (e.g., customers, workers or other personnel) and/or component parts of machines (e.g., autonomous mobile robots) and to recognize interactions involving such humans or machines within a materials handling facility, including but not limited to interactions with one or more items (e.g., consumer goods) or other inanimate objects within the materials handling facility. Such systems and methods may also be utilized to locate objects within transportation centers, financial institutions or like structures in which diverse collections of people, objects or machines enter and exit from such environments at regular or irregular times or on predictable or unpredictable schedules. By relying on multiple imaging devices, motion of an object may be located even when the object is occluded in one or more of the fields of view of the imaging devices. Moreover, as used herein, the term "machine learning model" or like terms may include, but is not limited to, any type or form of machine learning algorithm, system, technique, method, operations, or tool, in a physical or a virtual form, and need not be limited to discrete hardware systems provided for such purposes.

Figure 2A:
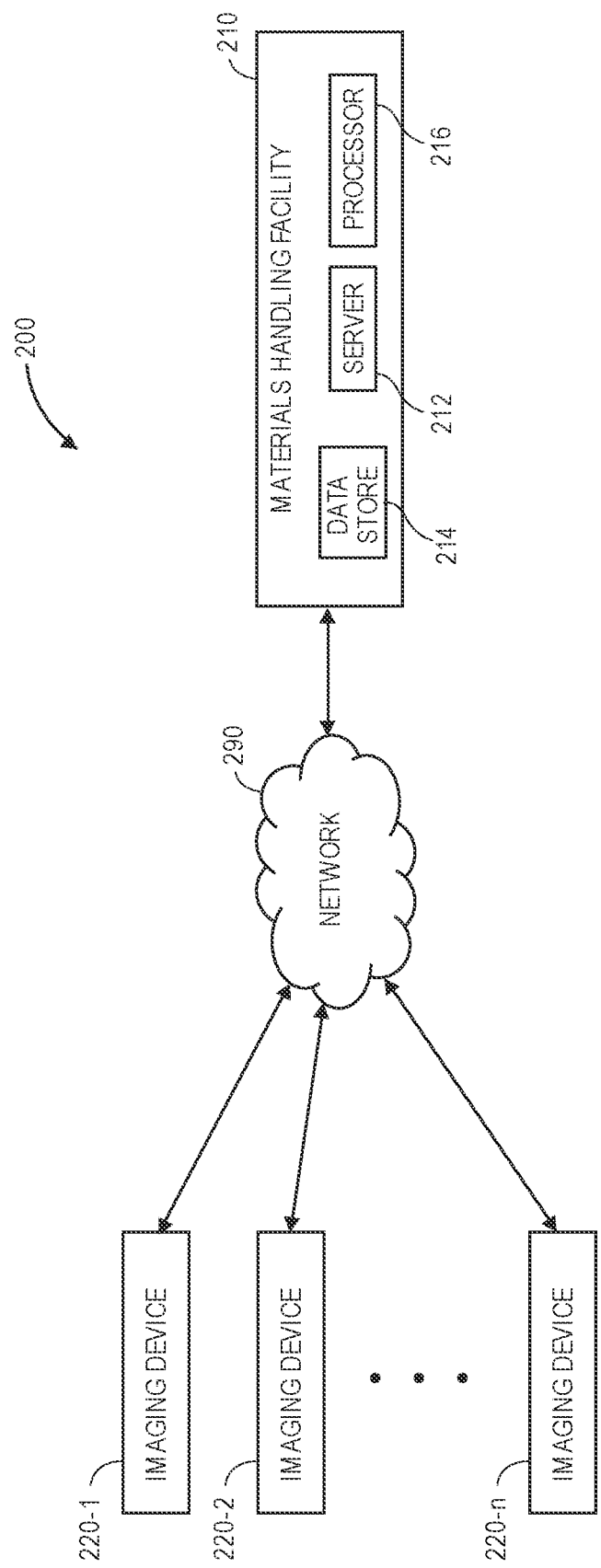
FIGS. 2A and 2B are block diagrams of components of one system for detecting events in accordance with implementations of the present disclosure.
Figure 2B:
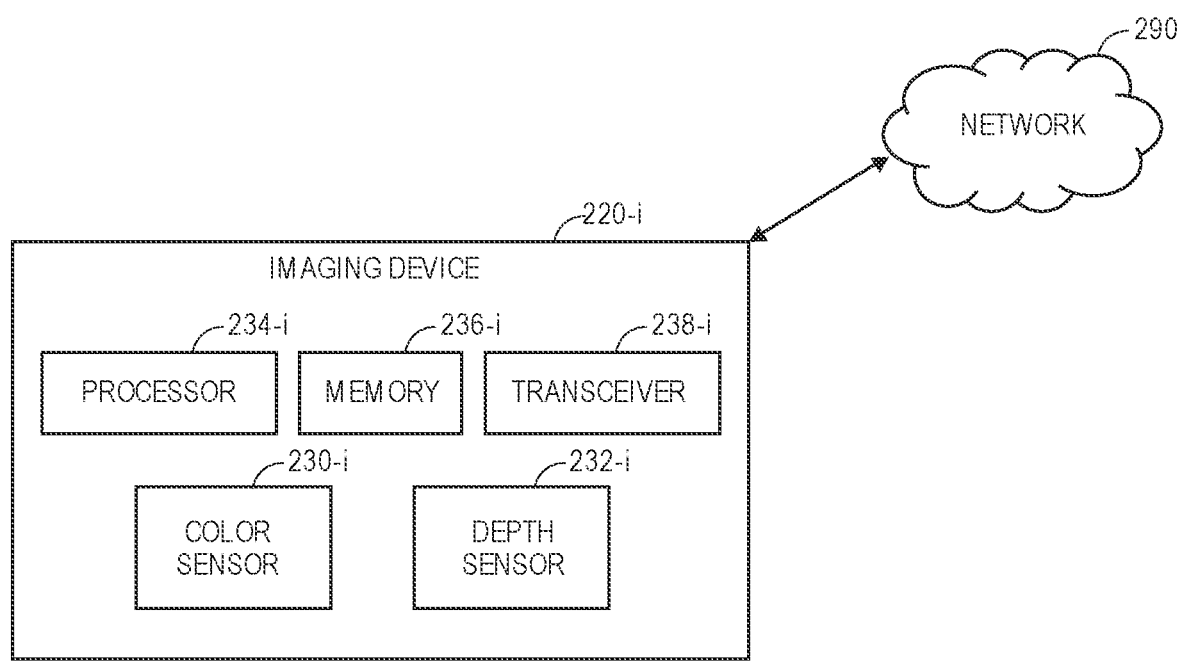

Referring to FIGS. 2A and 2B, a block diagram of components of one system 200 for detecting events in accordance with implementations of the present disclosure is shown.

The system 200 includes a materials handling facility 210 and a plurality of imaging devices 220-1, 220-2 . . . 220-*n* that are connected to one another across a network 290, which may include the Internet in whole or in part. Except where otherwise noted, reference numerals preceded by the number "2" shown in FIG. 2A or 2B indicate components or features that are similar to components or features having reference numerals preceded by the number "1" shown in FIGS. 1A through 1N.

The materials handling facility 210 may be any facility that is adapted to receive, store, process and/or distribute items from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 210, inventory items that are listed in the request or order, or are desired by the user, may be selected or "picked" from an inventory area at the materials handling facility 210. For example, in one implementation, a customer or other user may travel through the materials handling facility 210 with a list (e.g., a paper list, or a handheld mobile device displaying or including such a list) and may pick one or more of the inventory items from an inventory area at the materials handling facility 210. In other implementations, an employee of the materials handling facility 210 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage unit) in an inventory area, moved a distance, and placed at a second location (e.g., a second inventory shelf or other storage unit) in the inventory area.

As is shown in FIG. 2A, the materials handling facility 210 includes a networked computer infrastructure for performing various computer-related functions associated with the receipt, storage, processing and distribution of such items, including one or more physical computer servers 212, data stores (e.g., databases) 214 and/or processors 216, that may be provided in the same physical location as the materials handling facility 210, or in one or more alternate or virtual locations, e.g., in a "cloud"-based environment. In some implementations, the servers 212, the data stores 214 and/or the processors 216 or any number of other computing devices or resources may further execute any type of computer-based function or compute any type or form of calculation, including but not limited to any formulas, equations, algorithms or techniques for determining one or more probabilities or performing any number of statistical tests.

In some implementations, the servers 212, the data stores 214 and/or the processors 216 may be configured to execute one or more machine learning systems or techniques. For example, in some implementations, the servers 212 may be configured to execute an artificial neural network, such a convolutional neural network, to process imaging data received from one or more of the imaging devices 220-1, 220-2 . . . 220-n over the network 290.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 210 may include one or more inventory areas having predefined two-dimensional or 3D storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2A or FIG. 2B). The materials handling facility 210 may operate one or more order processing and/or communication systems using computer devices or resources in communication with one or more of the servers 212, the data stores 214 and/or the processors 216, or through one or more other computing devices or resources that may be connected to the network 290, in order to transmit or receive information in the form of digital or analog data, or for any other purpose.

The materials handling facility 210 may be associated with a plurality of imaging devices 220-1, 220-2 . . . 220-n (or other sensors), which may be any form of optical recording device that may be used to photograph or otherwise record imaging data of structures, facilities or items within the materials handling facility 210, or for any other purpose. The imaging devices 220-1, 220-2 . . . 220-n have diverse fields of view of the materials handling facility 210, or other scenes, that are configured to capture imaging data that may be processed to recognize and locate motion, locations and/or orientations of various actors within the materials handling facility 210. The imaging devices 220-1, 220-2 . . . 220-n may be mounted in any specific location or orientation within the materials handling facility 210, e.g., above, below or alongside one or more inventory areas or stations for receiving or distributing items. Alternatively, the imaging devices 220-1, 220-2 . . . 220-n may be provided in any open or enclosed environment or space in which any number of actors (e.g., humans, other animals or machines) may execute one or more poses, gestures or other actions within one or more of their fields of view.

Each of the imaging devices 220-1, 220-2 . . . 220-n shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative one of the imaging devices 220-1, 220-2 . . . 220-n, viz., an imaging device 220-i, includes one or more optical sensors, including color sensors (or grayscale sensors or black-and-white sensors) 230-i and/or depth sensors 232-i configured to capture visual imaging data (e.g., textures) or depth imaging data (e.g., ranges) to objects within one or more fields of view of the imaging device 220-i. The imaging device 220-i further includes one or more processors 234-i, one or more memory components 236-i and one or more transceivers 238-i, and any other components (not shown) that may be required in order to capture, analyze and/or store imaging data from within the materials handling facility 210 environment in which the imaging device 220-i is provided. For example, the imaging device 220-i may capture one or more still or moving images (e.g., streams of visual and/or depth images or image frames), along with any relevant audio signals or other information (e.g., position data), and may also connect to or otherwise communicate with the servers 212, or any other computer devices within the materials handling facility 210 (not shown), or with one or more external computer devices over the network 290, through the sending and receiving of digital data. In some implementations, the transceiver 238-$i$ may be configured to enable the imaging device 220-$i$ to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 212 or over the network 290 directly.

The processors 234-$i$ may be configured to execute an artificial neural network, such as a convolutional neural network, to process imaging data captured by one or more of the color sensors 230-$i$ or the depth sensors 232-$i$. For example, the artificial neural networks executed by the processors 234-$i$ may perform tasks in one or more core areas, including but not limited to person detection, feature extraction, person linking and unlinking. In some implementations, one such neural network may be a neural network backbone (e.g., a residual neural network backbone) that is configured to perform one or more tasks for locating actors based on images captured by the imaging device 220-$i$, including but not limited to one or more of person detection (e.g., head detection), person bounding box generation, instance segmentation, and person locating in 3D space based on visual images (e.g., RGB images). The processors 234-$i$ may be configured to execute multi-task networks having shared backbones and one or more decoding layers.

For example, in some implementations, the processors 234-$i$ may operate an artificial neural network or other classifier that receives an image (e.g., a visual image, or an RGB image) as an input, and processes the image for one or more person detection (e.g., head detection, bounding box generation, instance segmentation, and line segment estimation) for any number of actors depicted within the image. Based on such detections, visual descriptors of pixels depicting the actors, including but not limited to appearance features of such actors, e.g., sets of information or data identifying colors, textures, shapes or other aspects of features of such actors, may be determined. The processors 234-$i$ may also define a trajectory or "tracklet," e.g., a record of the positions of an actor at various times beginning at an initial detection and following with subsequent detections. Trajectories or tracklets and visual descriptors generated by the processors 234-$i$ may be used to link detections of actors in consecutively captured frames to one another, or to reidentify a previously detected actor if the actor is not detected for a brief period of time.

In some implementations, the processors 234-$i$ may predict a 3D location of an actor by detecting a head within an image and determining or estimating a height of the actor, or a line segment extending between the detected head of the actor and a corresponding location of a floor or other ground surface, within the image (e.g., a 2D line segment), which is aligned along a line extending from the detected head of the actor to a vertical vanishing point to which all vertical lines shown within the image converge. A line segment determined for an actor may be used to determine a 3D position of the actor based on intrinsic properties of the camera and a pose of the actor. The length of the line segment may be predicted upon a detection of a head within the image. In some implementations, the processors 234-$i$ may predict a length of the line segment corresponding to an actor based on an output received from an artificial neural network that also detected a head of the actor, and utilize the line segment to determine a 3D location of the actor.

In some implementations, the processors 234-$i$ may execute one or more tracking or matching algorithms, e.g., a tracking-by-detection algorithm, or a bipartite matching algorithm, that generates a tracklet-to-detection assignment or a visual descriptors-to-detection assignment over consecutive frames given an edge cost matrix. If a trajectory or tracklet, or visual descriptors of a set of pixels, are not matched to a head detection, the processors 234-$i$ may execute one or more optical flow algorithms on successive frames to extend a trajectory or tracklet location into a successively captured frame. Additionally, a confidence classifier may generate a confidence score in a given assignment. Moreover, the processors 234-$i$ may change a manner or technique by which a given actor is located from frame to frame. For example, processors 234-$i$ may locate actors based on body part detections (e.g., head detections) when such body parts are visible within an image frame, or may alternatively switch to locating via a set of visual descriptors of pixels corresponding to an actor (e.g., a bounding box or instance segmentation), to the extent that the visual descriptors of pixels are consistent from image frame to image frame.

In some implementations, nodes corresponding to body parts detected by the imaging devices 220-1, 220-2 . . . 220-$n$ may be represented in space by a set of Cartesian coordinates, or coordinates according to any other system, and an articulated model in the form of a record or vector may include one or more of such sets of coordinates. In some implementations, edges extending between a pair of nodes may be established by reference to each of the nodes of the pair, as well as a linear formula, a linear equation or other representation of points extending between the respective nodes of the pair, and an articulated model in the form of a record or a vector may identify edges by reference to their respective nodes, or include one or more of such formulas, equations or other representations for such edges. For example, detections of body parts may be matched across multiple views in two-dimensional images and converted to 3D rays that begin at optical elements of the respective imaging devices and terminate at surfaces of objects at a given pixel, based on the intrinsic properties of such imaging devices and extrinsic properties of a scene, and merged into one, e.g., by triangulating the rays corresponding to such detections, thereby enabling a body part to be detected and re-detected in the multiple views even if the body part is temporarily occluded in one of the views. The trajectories may be models of smoothed three-dimensional tracks that best fit a plurality of two-dimensional observations of a body part within multiple images. In some implementations, trajectories may be defined by minimizing differences between ray projections extending from optical elements of imaging devices to pixels depicting specific body parts detected within images captured by such imaging devices and splines or other curves defined from such frames, e.g., according to a least squares problem. Any method or technique for defining a 3D track or trajectory of a body part or an actor from two-dimensional observations of the body part or the actor in images may be utilized in accordance with the present disclosure.

Moreover, in some implementations, the processors 234-$i$ may combine trajectories or tracklets when corresponding positions are sufficiently proximate to one another and one of the trajectories or tracklets has a sufficiently low level of confidence, or on any other basis.

The imaging devices 220-1, 220-2 . . . 220-n may be homogenous or heterogeneous in nature, in accordance with the present disclosure. For example, one or more of the imaging devices 220-1, 220-2 . . . 220-n may have both the color sensor 230-i and the depth sensor 232-i. Alternatively, one or more of the imaging devices 220-1, 220-2 . . . 220-n may have just a color sensor 230-i (or grayscale sensor or black-and-white sensor) or just a depth sensor 232-i. For example, in some implementations, one or more of the imaging devices 220-1, 220-2 . . . 220-n may be configured to capture depth imaging data, e.g., distances or ranges to objects within their respective fields of view. In some implementations, one or more of the imaging devices 220-1, 220-2 . . . 220-n may be configured to capture visual imaging data, e.g., visual images or images in color, grayscale or black-and-white.

For example, one or more of the imaging devices 220-1, 220-2 . . . 220-n may be an RGB color camera, a still camera, a motion capture/video camera or any other type or form of camera. In other implementations, one or more of the imaging devices 220-1, 220-2 . . . 220-n may be depth-sensing cameras, such as an RGBz or RGBD camera. In still other implementations, one or more of the imaging devices 220-1, 220-2 . . . 220-n may be a thermographic or infrared (IR) camera. Additionally, in some implementations, the imaging devices 220-1, 220-2 . . . 220-n may simply be camera modules that include a lens and an image sensor configured to convert an optical image obtained using the lens of the camera into a digital signal or digital representation of the image (generally referred to herein as imaging data). In one implementation, the image sensor may be an RGB sensor capable of supporting an image resolution of at least 860×480 in an image, and capturing images at a frame rate of at least six frames per second, that may likewise be configured to provide image data to other components (e.g., a graphics processing unit) for processing. In some implementations, the imaging devices 220-1, 220-2 . . . 220-n may be paired to provide stereo imagery and depth information, and may include a pair of camera modules. Additionally, imaging data may be stored in any variety of formats, including but not limited to YUYV, RGB, RAW, .bmp, .jpeg, gif, or the like.

The imaging devices 220-1, 220-2 . . . 220-n may also include manual or automatic features for modifying their respective fields of view or orientations. For example, one or more of the imaging devices 220-1, 220-2 . . . 220-n may be configured in a fixed position, or with a fixed focal length (e.g., fixed-focus lenses) or angular orientation. Alternatively, one or more of the imaging devices 220-1, 220-2 . . . 220-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 220-1, 220-2 . . . 220-n, or changes in one or more of the angles defining the angular orientation.

For example, one or more of the imaging devices 220-1, 220-2 . . . 220-n may be hard-mounted to a support or mounting that maintains the device in a fixed configuration or angle with respect to one, two or three axes. Alternatively, however, one or more of the imaging devices 220-1, 220-2 . . . 220-n may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device. In some implementations, two or more of the imaging devices 220-1, 220-2 . . . 220-n may be provided within a common housing, e.g., a dual camera module housing.

Some of the imaging devices 220-1, 220-2 . . . 220-n may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of the imaging devices 220-1, 220-2 . . . 220-n, e.g., digital cameras, may be affected based on the lighting conditions and characteristics of the scenes in which the imaging devices 220-1, 220-2 . . . 220-n are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the system 200 of FIG. 2A includes boxes corresponding to three imaging devices 220-1, 220-2 . . . 220-n, those of ordinary skill in the pertinent arts will recognize that any number or type of imaging devices may be provided within the materials handling facility 210 in accordance with the present disclosure, including but not limited to digital cameras, depth sensors or range cameras, infrared cameras, radiographic cameras or other devices having one or more optical sensors. In some implementations, the system 200 (e.g., the materials handling facility 210) may include dozens or even hundreds of imaging devices of any type or form. Moreover, the system 200 (e.g., the materials handling facility 210) may also include any other type of sensing systems for detecting actors and recognizing their motion, locations and/or orientations within the materials handling facility 210. Such sensors may include, but are not limited to, one or more load or weight sensors provided on walking or traveling surfaces within the materials handling facility 210, one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. The type or form of sensors that may gather information or data regarding actors and their motion, locations and/or orientations at the materials handling facility 210 are not limited.

The materials handling facility 210 may also include any number of other sensors, components or other features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as one or more workers, who may be any designated personnel tasked with performing one or more tasks within the materials handling facility 210 in general, or within one or more inventory areas, receiving stations, distribution stations or other locations of the materials handling facility 210 in particular. Such workers may handle or transport items (e.g., any type or form of good, product, media or other tangible consumer article) within the materials handling facility 210, or operate one or more pieces of equipment therein (not shown). Such workers may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the servers 212, with one or more of the imaging devices 220-1, 220-2 . . . 220-n, or with one or more computer devices or resources, such as the servers 212, over the network 290, as well as a display (e.g., a touchscreen display) to facilitate the visible presentation to and interaction with a human operator.

The servers 212 or any other computer devices associated with the materials handling facility 210 or connected to the network 290 may execute one or more multi-camera tracking algorithms or techniques. For example, in some implementations, the imaging devices 220-1, 220-2 . . . 220-n may provide their respectively determined trajectories or tracklets of actors and visual descriptors of pixels of images (e.g., appearance features, motion properties and geometry) depicting the actors to the server 212. Additionally, the server 212 may map single-camera trajectories or tracklets to positions in 3D space based on their respective predicted 3D line segments and their corresponding appearance features, motion properties and geometry in 3D space for the respective trajectories or tracklets. The server 212 may then correlate or merge trajectories or tracklets received from multiple ones of the imaging devices 220-1, 220-2 . . . 220-n into multi-camera trajectories or tracklets, and assign identifiers to the respectively correlated or merged trajectories or tracklets.

The servers 212 may further associate any multi-camera trajectories or tracklets with identifiers of actors within the materials handling facility 210 in any manner. For example, a unique identifier may be assigned to each multi-camera trajectory or tracklet, e.g., and such multi-camera trajectories or tracklets may be tracked based on single-camera trajectories or tracklets, and visual descriptors, received from the respective imaging devices 220-1, 220-2 . . . 220-n.

In some implementations, the system 200 may further include one or more event generator systems comprising sensors that are provided in one or more select locations within the materials handling facility 210. Each of such sensors may be configured to detect information or data from which a location at which an event has occurred, or a time (or duration) of the event, e.g., an interval of time that includes the time of the event. In some implementations, an item associated with an event may be identified based on the location and/or the time (or duration) of the event based on planogram data, which may indicate the placement of one or more items in inventory areas or storage units within the materials handling facility 210.

For example, one or more of such sensors may be an imaging device configured to capture imaging data regarding an inventory area and/or storage unit, e.g., one or more of the imaging devices 220-1, 220-2 . . . 220-n, and whether an event has occurred, and a time of such an event, may be determined based on such imaging data. One or more of such sensors may include load or weight sensors provided in association with an inventory area or storage unit, and whether an event has occurred, and a time of such an event, may be determined based on load signals received from such load or weight sensors or, alternatively, changes in load signals indicating increases or decreases in loading applied to the inventory area or storage unit. An item associated with such an event may be determined based on one or more magnitudes of such changes. For example, when an actor is determined to have accessed an inventory area or shelving unit to retrieve an item therefrom at a specific location, and a number of items are located within a vicinity of the specific location, a change in the mass of all of the items present on the shelf may be determined, and one of the items within the vicinity of the specific location having a mass consistent with the determined change in the mass of all of the items present on the shelf may be presumed to have been retrieved by the actor.

Alternatively, one or more of such sensors may include RFID components (e.g., antennas or tags) for transmitting and/or receiving RFID signals associated with items or inventory areas and/or storage units, and whether an event has occurred, and a time of such an event, may be determined based on the receipt of such signals, or the loss of such signals. An item associated with such an event may be determined based on the respective RFID signals that are transmitted or received, or are no longer received. As another alternative, one or more of such sensors may include one or more LIDAR components for transmitting and/or receiving one or more light signals in association with inventory areas and/or storage units, and whether an event has occurred, and a time of such an event, may be determined based on the light signals that are transmitted or received.

The type or form of such sensors provided in association with an event generator system are not limited. Moreover, one of the sensors may be in communication with a central processor or server of an event generator system that may receive information or data from such sensors, and provide such information or data (e.g., digital and/or analog data) to one or more other computing devices or resources that may be connected to the network 290, or for any other purpose. Alternatively, one or more of such sensors may be outfitted with processors and/or transceivers for independently transmitting or receiving information or data (e.g., digital and/or analog data) to or from one or more other computing devices or resources that may be connected to the network 290, or for any other purpose.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "materials handling facility," a "camera," a "system," an "actor" (or "customer," or "user," or "worker," or "human operator") or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," a "camera," a "system," an "actor" (or "customer," or "user," or "worker," or "human operator") may be typically performed by a human, but could, alternatively, be performed by an automated agent.

The materials handling facility 210 (or any actors associated therewith) and/or the imaging devices 220-1, 220-2 . . . 220-n may use any web-enabled or Internet applications or features, any other client-server applications or features, or other messaging techniques, to connect to the network 290 or to communicate with one another. For example, the servers 212 may be adapted to transmit or receive information or data in the form of synchronous or asynchronous messages to or from the imaging devices 220-1, 220-2 . . . 220-n, or any other computer device (e.g., any device having any number of other servers, data stores, processors or the like) in real time or in near-real time, or in one or more offline processes, via the network 290. Those of ordinary skill in the pertinent art would recognize that the materials handling facility 210 (or any actors associated therewith) or the imaging devices 220-1, 220-2 . . . 220-n may include or operate any of a number of computing devices or resources that are capable of communicating over the network 290, including but not limited to set-top boxes, personal digital assistants, digital media players, mobile devices (e.g., smartphones), tablet computers, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a transitory and/or non-transitory computer-readable medium that is within or accessible by computers or computer components such as the servers 212, the data stores 214, the processor 216, the imaging devices 220-1, 220-2 . . . 220-n, the processor 234-i, or any other computers or control systems having sequences of instructions which, when executed by a processor (e.g., a central processing unit, or "CPU," or a graphics processing unit, or "GPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Referring to FIG. 3, a flow chart 300 of one process for detecting events in accordance with implementations of the present disclosure is shown. At box 310, positions of a plurality of storage units of a fixture within a materials handling facility are determined, e.g., in 3D space. For example, the fixture may be a physical structure for storing one or more items, or sets of items, thereon or therein. In some implementations, the fixture may include any number of storage units, e.g., sets or racks of shelves or platforms having items of various types or kinds provided in specific locations thereon, such as one or more lanes or other portions or sections of such shelves or other platforms. The fixture may be provided in a discrete location of the materials handling facility, such as along or adjacent to one or more walls, or independently within or near walking or traveling areas or spaces of the materials handling facility, such as on a table or another structure, or in a free-standing manner. The positions of each of the storage units may be identified or represented in data in any manner, and with any level of granularity or specificity. For example, positions of one or more of the storage units may be represented in 3D space by a set of Cartesian coordinates, or coordinates according to any other system, e.g., a local coordinate system unique to the materials handling facility.

In some implementations, positions of one or more storage units in a single fixture may be determined at box 310. In some other implementations, however, positions of any number of storage units in any number of fixtures may be determined.

At box 315, locating data regarding positions and identities of actors within a vicinity of the fixture is identified. For example, the locating data (or tracking data) may be determined by or received from a tracking system or service operating within the materials handling facility, and may include approximate positions of any number of actors, as well as visual descriptors or other identifiers of such actors, or any other information or data regarding the actors. In some implementations, the tracking system or service may execute one or more tracking or matching algorithms, e.g., a tracking-by-detection algorithm, or a bipartite matching algorithm, that generates a tracklet-to-detection assignment or a visual descriptors-to-detection assignment over consecutively captured data (e.g., consecutive visual images) in any manner. For example, if a trajectory or visual descriptors of a set of pixels identified in one image frame are not matched to a detection of a body part (e.g., a head), the trajectory or visual descriptors may be extended into a successively captured frame. In some implementations, the locating data may relate to a detection of a body part in one image, and a set of visual descriptors of pixels corresponding to the actor in a subsequent image frame. Moreover, in some implementations, the locating data may further include or reference images of one or more portions of each of such actors (e.g., images of body parts such as heads), as well as approximate positions of such portions of the actors, which may have been captured by one or more imaging devices or other sensors provided within the materials handling facility or from any other source. The locating data may also identify approximate positions of each of the actors, which may be represented in 3D space by a set of Cartesian coordinates, or coordinates according to any other system.

At box 320, a camera including one or more of the storage units of the fixture within a field of view captures visual images. For example, the camera may be mounted to one or more systems or structures within the materials handling facility, e.g., a ceiling, a wall, a fixture, or any other systems or structures. The camera may be aligned to capture imaging data regarding portions of the fixture, and of any number of the storage units, as well as imaging data regarding movements of one or more actors, machines, items or any other objects within a vicinity of the fixture.

The camera may be configured to capture visual images at any frame rate. In some implementations, the camera may be configured to capture visual images at fifteen frames (or images) per second. Alternatively, the camera may be configured to capture visual images at frame rates of five, ten, twenty, thirty, sixty or any other number of frames (or images) per second. Additionally, the camera may also be configured to capture visual images at any level of resolution or pixel density. For example, in some implementations, the camera may be configured to capture high resolution images, such as images having resolutions or pixel densities of at least 300 pixels per inch (or ppi), or any other number of pixels per inch. Moreover, in some implementations, the camera may be configured to capture images of any size or dimensions.

In some implementations, the camera may be the same sensor by which some or all of the locating data regarding the positions of the actors within the materials handling facility identified at box 315 was captured. In some other implementations, however, the camera need not be the same sensor by which any of the locating data was captured.

At box 325, the camera determines whether one or more body parts of the actors are depicted within the visual images. For example, in some implementations, one or more body parts such as heads, arms, hands, torsos or portions thereof may be detected within the visual images using a body part detection module (e.g., an algorithm, system or technique), which may be an artificial neural network, such as a convolutional neural network, or any other machine learning model that is trained to identify such body parts depicted within an image, such as a segmentation network. In some implementations, the body part detection module may generate, as an output in response to each image received as an input, a segmentation record identifying such segments of that image depicting body parts and their respective locations within the image. In some implementations, the body part detection module may be configured to detect portions of a body part, including but not limited to multiple portions of the same body part, e.g., an upper arm and a lower arm.

If no body parts of actors are detected within visual images captured by the camera at box 320, the process returns to box 315, where locating data including positions and identities of actors within a vicinity of the fixture are identified. If any body parts are detected within visual images captured by the camera, however, then the process advances to boxes 330 and 340.

At box 330, the camera generates maps of body parts of each of the actors within the field of view from the visual images. In some implementations, one or more processor units provided on or within the camera may generate a map of body parts for each visual image captured thereby, e.g., using an artificial neural network, such as a deep neural network or a convolutional neural network, that maps pixels of images to body parts detected at box 325.

At box 335, the camera determines positions of the body parts of each of the actors depicted within each of the visual images, e.g., in 3D space. In some implementations, one or more processor units provided on or within the camera may determine positions of such body parts based on a position of the camera, as well as any monocular cues or other attributes of the visual images or the body parts depicted therein. For example, the positions of the body parts in 3D space may be determined based on absolute or relative sizes of the body parts depicted within the visual images, or apparent elevations of the body parts within the visual images, e.g., with respect to floors or traveling surfaces, as well as any colors or textures of the body parts (or gradients of such colors or textures), relative motion of the body parts, or any other attributes of the body parts or the visual images.

In some implementations, the maps of the body parts of the actors may be generated at box 330 and the positions of the body parts may be determined at box 335 by different processes, e.g., according to two or more discrete algorithms, systems or techniques. Alternatively, in some implementations, the maps of the body parts may be generated concurrently or together with the determination of the positions of such body parts in 3D space, e.g., by the same algorithms, systems or techniques.

In parallel, at box 340, the camera generates crops or otherwise identifies the portions of the visual images depicting hands. For example, in some implementations, where a hand is one of the body parts detected within visual images captured at box 320, one or more processor units provided on or within the camera may generate or identify a bounding box or another portion of the visual image representing sets of pixels depicting the hand, or otherwise provide a point of reference for a location of the hand within the visual image. The portions of the visual images depicting hands may include a predetermined number of image pixels, or a variable number of image pixels, and may be identified by a bounding box or in any other manner.

At box 345, the camera determines a number of items and identities of items within hands depicted within the visual images. For example, a portion of a visual image represented within a bounding box or otherwise identified as including a hand may be processed by one or more processor units provided on or within the camera to determine whether the portion of the visual image depicts any items within the hand, or to identify any items within the hand, as well as a number of such items within the hand.

At box 350, the camera determines product-in-hand annotations from the visual images. For example, for each of the portions of visual images that are determined to depict a hand, one or more processor units provided on or within the camera may annotate or otherwise label such portions to indicate whether the portions also depict any items within such hands, as well as to include identifiers of the items within such hands.

At box 355, the camera generates image feature tensors for each of the actors depicted within the field of view over a predetermined interval of time based on the visual images, the fixture positions and the product-in-hand annotations. For example, values representative of portions of the visual images captured during a predetermined interval of time may be calculated and provided to an artificial neural network, e.g., a deep neural network, or a convolutional neural network, along with the maps of the body parts generated for each of the visual images captured during the predetermined interval at box 330, and the positions of such body parts calculated for each of the visual images captured during the predetermined interval at box 335. An image feature tensor may be generated for each actor that appears within the visual images, and is present within a vicinity of the fixture, based on one or more outputs received from the artificial neural network, or in any other manner. An image feature tensor may represent features corresponding to portions of the fixture that appear within the visual images. In some implementations, image feature tensors may be calculated based on any number of the visual images, or based on visual images captured within a predetermined interval of time, during a period when an actor is detected within a field of view of the camera.

Moreover, an image feature tensor may include a set of features determined for an image plane in its entirety, or for any portion of the image plane that depicts the fixture or any of the storage units. For example, where each of the visual images is a high-resolution image having a predetermined number of image pixels arranged in an array, an image feature tensor may represent or be calculated based on multiple image pixels of the visual images, or calculated with sets of features corresponding to subsets of the image pixels. For example, in some implementations, each of the visual images may have dimensions of 640 pixels by 480 pixels, and the image feature tensors may represent a 3D volume of numbers having cells that are reduced by a factor of eight with respect to the visual images, or 80×60, and each of the cells having a vector having any number of values (e.g., 512) at each of such cells, such that the image feature tensor has dimensions of 80×60×512.

Furthermore, the image feature tensors may be calculated at a rate that is less than a frame rate of the camera. For example, in some implementations, where a camera has a frame rate of fifteen frames per second (or 15 fps, or 15 Hz), image feature tensors may be calculated at a rate of one tensor every second (or 1 Hz), or one-fifteenth of the frame rate. Moreover, an image feature tensor may be calculated based on features of the fixture or the storage units represented in any number of visual images. For example, where an image feature tensor is generated based on visual images captured over a two-second interval of time, and where the camera is configured to capture visual images at a frame rate of fifteen frames per second, each of the image feature tensors may be calculated based on features generated from thirty images in a rolling sequence.

At box 360, the camera pools image feature tensors into sets of fixture location features, e.g., with each of the sets of fixture location features corresponding to one of the storage units of the fixture.

At box 365, the pooled fixture location features are provided to a multi-camera system at a predetermined interval, e.g., over one or more networks, before the process returns to box 315, where locating data regarding the positions of actors within the materials handling facility is identified, and to box 320, where the camera continues to capture visual images. The multi-camera system may process the pooled feature tensors received from the camera, or from any other cameras, to generate a hypothesis to determine or predict whether any interactions with the fixture by any of the actors have occurred, or for any other purpose.

Figure 4:
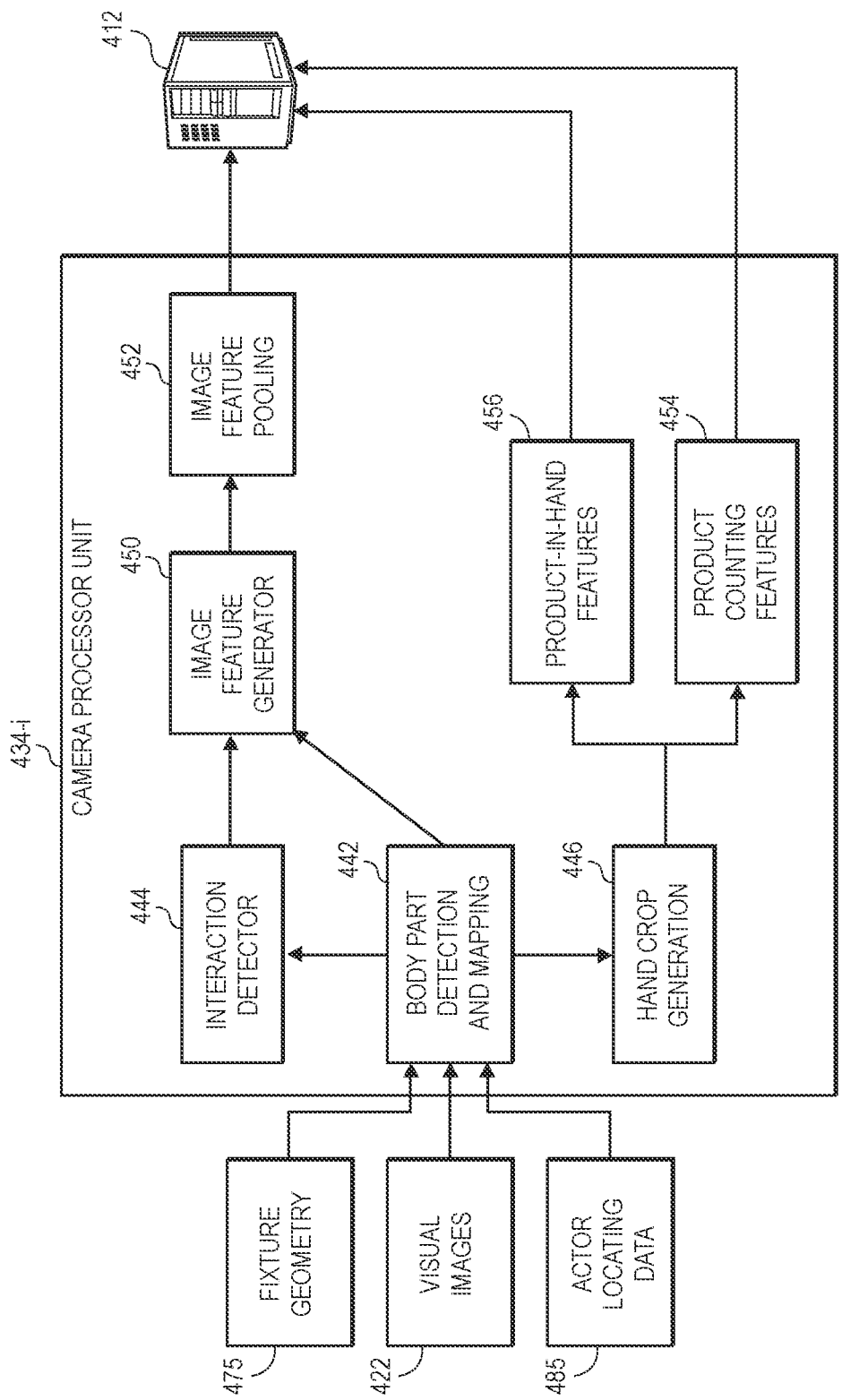
FIG. 4 is a flow diagram of components of one system for detecting events in accordance with implementations of the present disclosure.

As is discussed above, imaging devices of the present disclosure may be programmed to capture images, and to process such images to generate features corresponding to locations depicted within such images, to pool such features, and to transmit such pooled features to a system for further processing and analysis, e.g., to generate a hypothesis as to whether an actor has executed any interactions at one or more of the locations during one or more periods of time. Referring to FIG. 4, a flow diagram of one system for detecting events in accordance with implementations of the present disclosure are shown. Except where otherwise noted, reference numerals preceded by the number "4" shown in FIG. 4 indicate components or features that are similar to components or features having reference numerals preceded by the number "2" shown in FIG. 2A or 2B or by the number "1" shown in FIGS. 1A through 1N.

As is shown in FIG. 4, a processor unit 434-*i* of one camera is configured to execute a number of processes, algorithms or functions, and is in communication with an external system 412 (e.g., a server) over one or more networks (not shown). Although FIG. 4 shows only a single processor unit 434-*i* of one camera, any number of cameras having the processor unit 434-*i*, or a like processor unit or other component, may be connected to the external system 412 over one or more networks in accordance with implementations of the present disclosure.

In some implementations, the processor unit 434-*i* (or an associated memory component of the camera) may be programmed with data regarding a fixture geometry 475, e.g., positions of aspects of a storage fixture or any storage units associated with the storage fixture in 3D space. The positions may be represented in 3D space by sets of Cartesian coordinates, or coordinates according to any other system, e.g., a local coordinate system. Additionally, the processor unit 434-*i* may receive actor locating data 485, e.g., identifiers of any actors on a scene where the camera is located, as well as visual descriptors of any pixels depicting the actors, e.g., appearance features of the actors, and a record of positions of the actors at various times. Alternatively, in some implementations, some or all of the fixture geometry 475 or the actor locating data 485 may be determined by the processor unit 434-*i* based on the visual images 422 or in any other manner.

The processor unit 434-*i* may be further configured to cause the camera to capture any number of visual images 422, e.g., at any frame rate or frequency. In some implementations, the visual images 422 may be high-resolution images captured at a frame rate of fifteen frames per second (fps), or at any other frame rate. The processor unit 434-*i* may control the operation of one or more sensors having arrays of photodetectors or photosensitive components such as CCD, CMOS, photodiodes, or the like, which may capture light scattered or reflected from objects and assign one or more quantitative values (e.g., red, green, blue or other color values, or distances or ranges to such objects) to aspects of the scattered or reflected light.

In some implementations, the processor unit 434-*i* may operate or execute a body part detection and mapping module 442 on one or more of the images 422-*n*, either individually or collectively, e.g., in one or more batch processes. For example, the body part detection and mapping module 442 may be a machine learning system, e.g., an artificial neural network, such as a convolutional neural network, that is trained to identify body part image segments (e.g., hands, heads, shoulders, upper arms, elbows, lower arms, wrists, feet or other body parts) depicted within the visual images 422, such as a segmentation network. In some implementations, the body part detection and mapping module 442 may generate, as an output in response to each of the visual images 422 as an input, a segmentation record identifying segments of the visual images 422 depicting body parts and their respective locations within the image. In some implementations, the body part detection and mapping module 442 may further generate one or more sets of regression vectors or other associations between locations of pairs of body parts, such as heads and hands, detected within the image.

The body part detection and mapping module 442 may further determine 3D positions of each of the body parts detected within the visual images 422.

The processor unit 434-*i* may also operate or execute an interaction detection module 444 that is configured to determine whether an actor has executed an interaction with a storage fixture or a storage unit of the storage fixture based on the fixture geometry 475 and a map and/or positions of body parts of the actor generated by the body part detection and mapping module 442.

The processor unit 434-*i* may also operate or execute a hand crop generation module 446. Where hands are detected within any of the visual images 422, the hand crop generation module 446 identifies portions of such visual images 422 depicting such hands, and crops or otherwise isolates such portions from the visual images 422. The processor unit 434-*i* may further generate any number of product counting features 454 and any number of product-in-hand features 456 based on the portions of the visual images 422 identified by the hand crop generation module 446.

The processor unit 434-*i* may further operate or execute an image feature generator 450 that identifies features corresponding to locations depicted within each of the visual images 422, and generates sets of such features, e.g., tensors of such features, for one or more of the visual images 422 captured during a predetermined interval of time. Where the visual images 422 are high-resolution images having a substantially large number of image pixels arranged in an array, each of the locations for which features are determined is larger than one of the pixels of the visual images 422 by a predetermined factor, or corresponds to a predetermined number of pixels of the visual images 422, such that a tensor generated for a location based on such features is downsampled with respect to pixels of the visual images 422. For example, in some implementations, the visual images 422 may have dimensions of 640 pixels by 480 pixels, and a tensor of features determined for locations of the visual images 422 may represent a 3D volume of numbers having a number of cells that are reduced by a factor of eight with respect to the number of pixels of the visual images 422, or 80×60. Each of such cells may further represent a vector having any number of values (e.g., 512), such that a tensor of features calculated for one or more of the visual images 422 has dimensions of 80×60×512.

In some implementations, the operation of the image feature generator 450 may be triggered by the processor unit 434-*i* upon a determination by the interaction detection module 444 that an interaction with a storage fixture or one or more storage units of the storage fixture has occurred. Moreover, in some implementations, the image feature generator 450 may generate features for images at a rate or frequency that is less than a frame rate or frequency at which the visual images 422 are captured. For example, in some implementations, the visual images 422 may be captured at a frame rate of fifteen frames per second (fps), or a frequency of fifteen Hertz (Hz), and features may be calculated at a rate of one set of features per second, or a frequency of one Hertz (Hz).

The processor unit 434-*i* may also operate or execute an image feature pooling module 452 that pools features generated for locations of the visual images 422 depicting the storage fixture or individual storage units thereof, and for each of the actors. For example, where the fixture geometry 475 identifies positions of a storage fixture or storage units thereof in 3D space, the image feature pooling module 452 may determine which of the features generated by the image feature generator 450 corresponds to such positions, and interactions with the storage fixture or any of the storage units thereof by a particular actor.

The processor unit 434-*i* may transmit pooled features identified by the image feature pooling module 452 for various locations of a storage unit and for a particular actor, as well as any product counting features 454 or any product-in-hand features 456 to the system 412 over one or more networks 490. The pooled features identified by the image feature pooling module 452 may be transmitted to the system 412 at any rate or frequency.

Any number of cameras may have one or more of the processor units 434-*i* and be configured to operate or execute one or more of the body part detection and mapping module 442, the interaction detector module 444, the hand crop generation module 446, the image feature generator module 450 or the image feature pooling module 452 in accordance with the present disclosure. One or more of the processes, algorithms or functions executed by the body part detection and mapping module 442, the interaction detector module 444, the hand crop generation module 446, the image feature generator module 450 or the image feature pooling module 452, as described above, may be performed by two or more of such modules separately or in combination with one another. Alternatively, one or more of the processes, algorithms or functions executed by the body part detection and mapping module 442, the interaction detector module 444, the hand crop generation module 446, the image feature generator module 450 or the image feature pooling module 452, as described above, may be performed by any computer devices or systems that are external to a camera having the processor unit 434-$i$.

Upon receiving the pooled features, product counting features and product-in-hand features from one or more processor units 434-$i$, the system 412 may determine whether any of the actors detected on a scene executed any interactions with any storage fixtures or storage units thereof.

Referring to FIGS. 5A through 5F, views of aspects of one system for detecting events in accordance with implementations of the present disclosure are shown. Except where otherwise noted, reference numerals preceded by the number "5" shown in FIGS. 5A through 5F indicate components or features that are similar to components or features having reference numerals preceded by the number "4" shown in FIG. 4, by the number "2" shown in FIG. 2A or 2B or by the number "1" shown in FIGS. 1A through 1N.

Figure 5A:
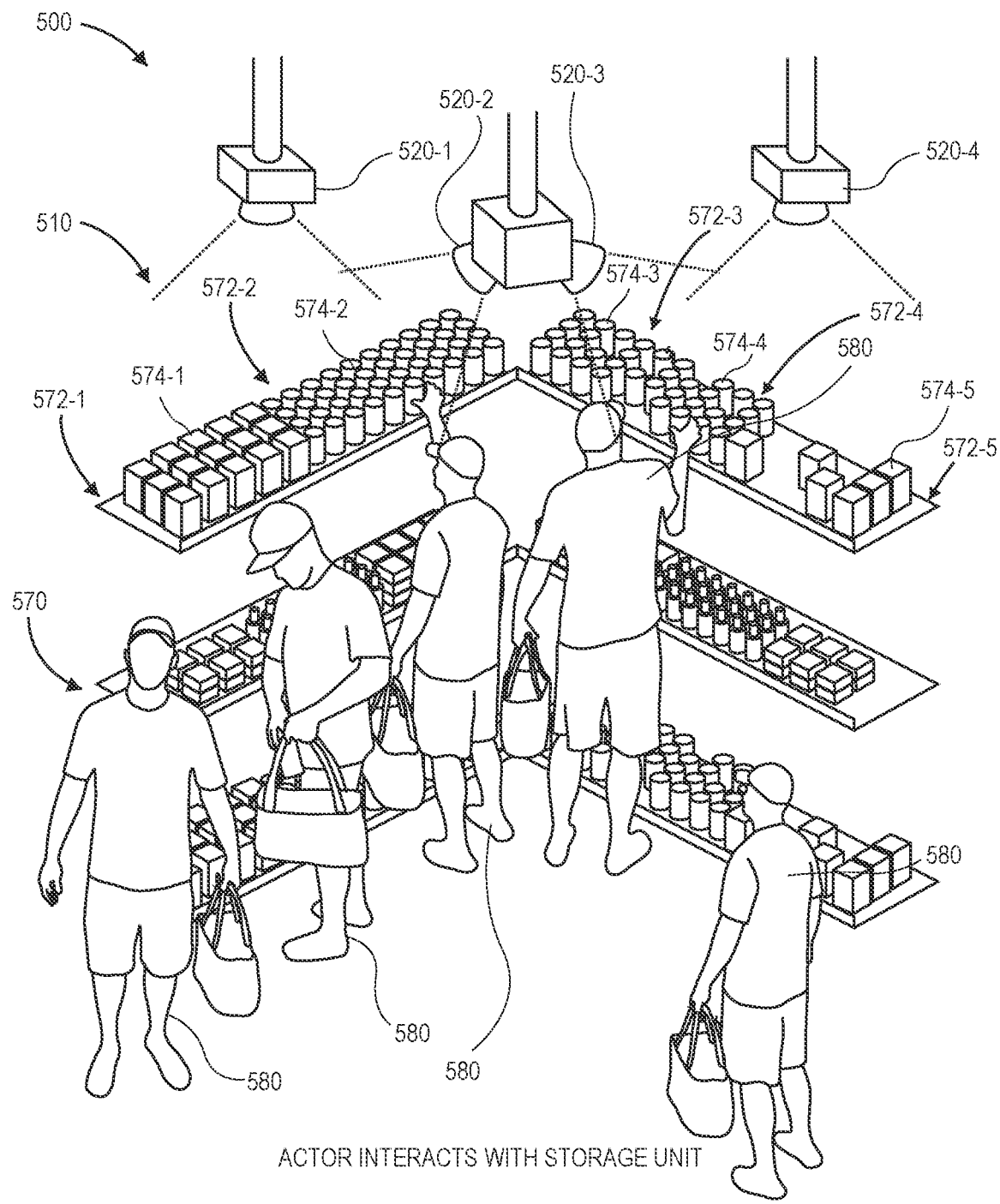
FIGS. 5A through 5F are views of aspects of one system for detecting events in accordance with implementations of the present disclosure.

As is shown in FIG. 5A, a system 500 includes a plurality of cameras 520-1, 520-2, 520-3, 520-4 (e.g., RGB cameras) mounted above a facility 510 (e.g., a materials handling facility) having one or more storage fixtures 570, which may include a plurality of sets of shelves or other storage units having items 574-1, 574-2, 574-3, 574-4, 574-5 of various types or kinds provided in specific locations thereon. The cameras 520-1, 520-2, 520-3, 520-4 are configured to capture imaging data (e.g., visual images) from fields of view that include the storage fixture 570, and the various sets of items 574-1, 574-2, 574-3, 574-4, 574-5 thereon.

Figure 5B:
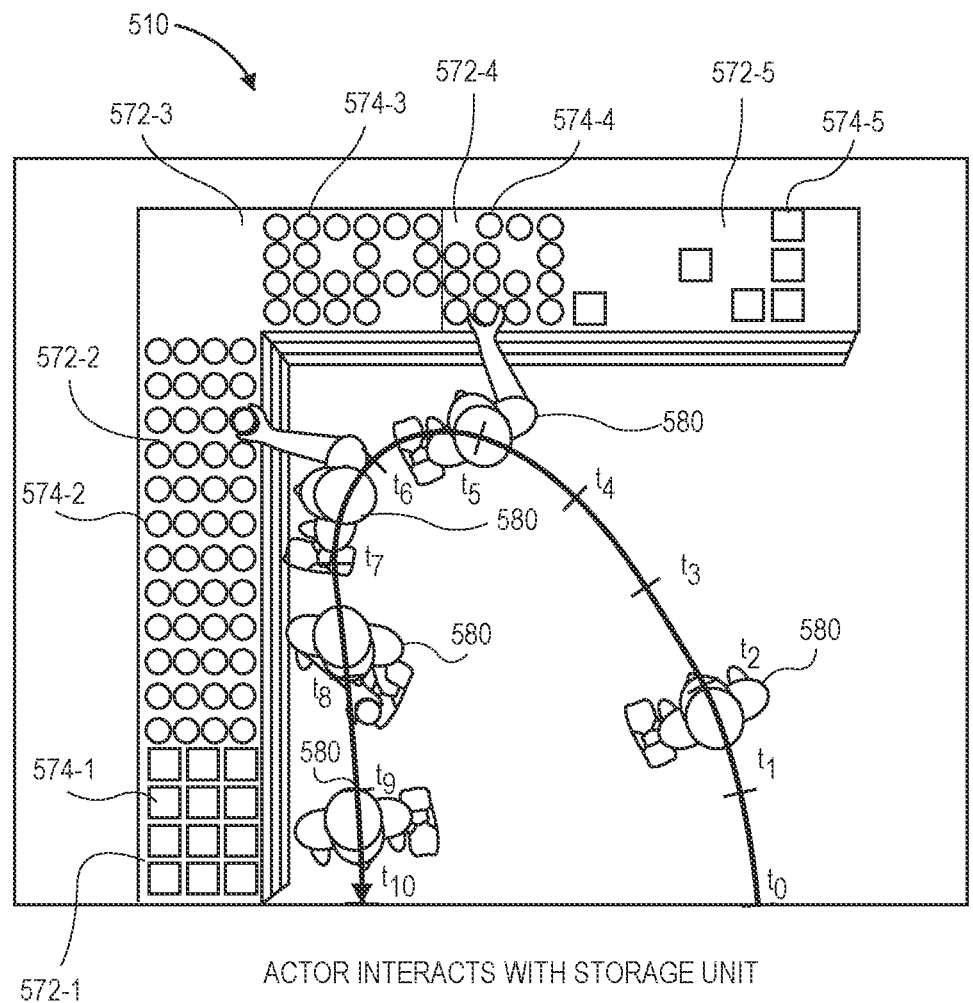

As is also shown in FIGS. 5A and 5B, an actor 580 performs one or more poses, gestures, movements or other interactions within the facility 510 while removing one or more items from the storage fixture 570, during a window or finite duration from time to $t_0$ time $t_{10}$. For example, as is shown in FIGS. 5A and 5B, the actor 580 travels toward a portion of the storage fixture 570, and extends a hand toward the storage unit 572-4 of the storage fixture 570 in a first instance, before extending the hand toward the storage unit 572-2 of the storage fixture 570 in a second instance, and turning away from the storage fixture 570 to place one or more items into a bag or other container, and walking away from the storage fixture 570.

The cameras 520-1, 520-2, 520-3, 520-4 may be configured to capture images, process the images to determine whether such images depict any actors. For example, when the cameras 520-1, 520-2, 520-3, 520-4 capture images, the cameras 520-1, 520-2, 520-3, 520-4 may process the images to detect any body parts of actors, e.g., the actor 580, and to determine positions of the body parts in 3D space. The cameras 520-1, 520-2, 520-3, 520-4 may further determine distances between the positions of the body parts and positions of the various storage units 572-1, 572-2, 572-3, 572-4, 572-5, or any other information or data.

Figure 5C:
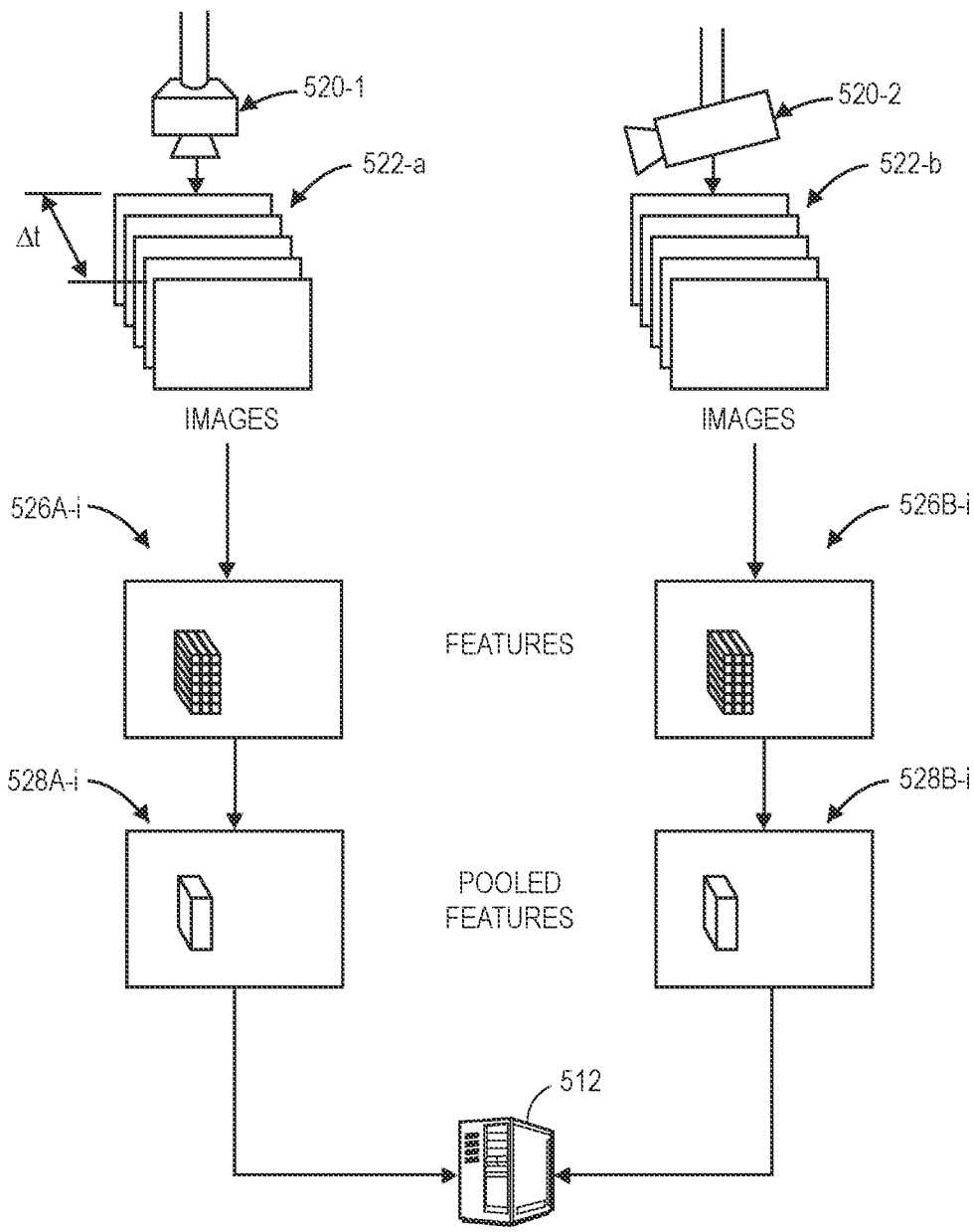

As is shown in FIG. 5C, where the actor 580 is detected within fields of view of the cameras 520-1, 520-2, the camera 520-1 may process images 522-$a$ captured over intervals of time $\Delta t$ with the actor 580 within the field of view to determine features (e.g., feature tensors) 526A-$i$ regarding the actor 580 and the locations of the images 522-$a$ depicting the storage unit 572-4 with which the actor 580 interacted in the first instance, for each interval of time $\Delta t$. The camera 520-2 may also process the images 522-$b$ captured over intervals of time $\Delta t$ with the actor 580 within the fields of view to determine features (e.g., feature tensors) 526B-$i$ regarding the actor 580 and the locations of the images 522-$b$ depicting the storage unit 572-4 with which the actor 580 interacted in the first instance. Alternatively, or additionally, features (e.g., feature tensors) may be calculated for each of the storage units 572-1, 572-2, 572-3, 572-4, 572-5, for as long as the actor 580 is detected within the field of view of the camera 520-1 or the camera 520-2. In some implementations, the calculation of features or feature tensors may be triggered upon determining that the actor 580 is within a predetermined distance of the storage unit 572-4, or any of the other storage units 572-1, 572-2, 572-3, 572-5.

As is further shown in FIG. 5C, features 526A-$i$, 526B-$i$ calculated by the cameras 520-1, 520-2 over the intervals of time $\Delta t$ may be pooled into sets of pooled features 528A-$i$, 528B-$i$, and transmitted to a system 512 (e.g., a computer server or any other device or system in communication with at least the camera 520). The system 512 may process sets of pooled features 528A-$i$, 528B-$i$ received from the cameras 520-1, 520-2 over the intervals of time $\Delta t$ to generate a hypothesis for interactions executed by the actor 580 with the storage unit 572-4 for as long as the actor 580 is within the field of view of either of the camera 520-1 or the camera 520-2.

Figure 5D:
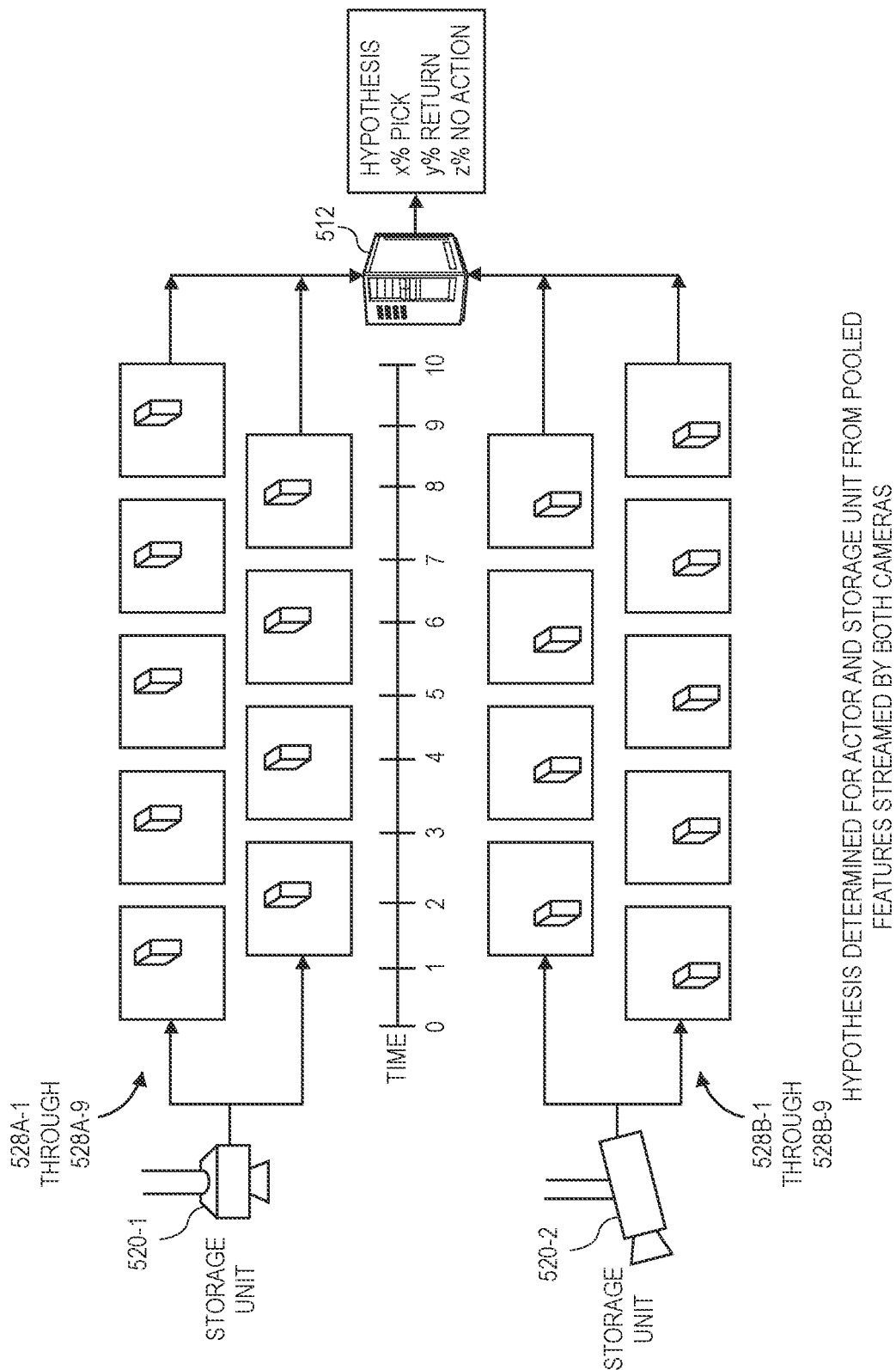

Moreover, the cameras 520-1, 520-2 may generate and transmit sets of pooled features 528A-$i$, 528B-$i$ at intervals of time $\Delta t$ that overlap one another. For example, where the intervals of time are approximate two seconds in duration, sets of pooled features may be generated by the cameras 520-1, 520-2 and transmitted to the system 512 for storage units and actors over a first two-second interval. One second later, sets of pooled features may be generated and transmitted to the system 512 for storage units and actors over a second two-second interval, with a second half of the first two-second interval overlapping a first half of the second two-second interval. As is shown in FIG. 5D, the cameras 520-1, 520-2 generate sets of pooled features 528A-1, 528B-1 for the storage unit 572-4 from images captured between time to and time $t_2$, and generate sets of pooled features 528A-2, 528B-2 from images captured between time $t_1$ and time $t_3$, sets of pooled features 528A-3, 528B-3 from images captured between time $t_2$ and time $t_4$, sets of pooled features 528A-4, 528B-4 from images captured between time $t_3$ and time $t_5$, sets of pooled features 528A-5, 528B-5 from images captured between time $t_4$ and time to, sets of pooled features 528A-6, 528B-6 from images captured between time $t_5$ and time $t_7$, sets of pooled features 528A-7, 528B-7 from images captured between time to and time to, sets of pooled features 528A-8, 528B-8 from images captured between time $t_7$ and time to, and sets of pooled features 528A-9, 528B-9 from images captured between time $t_8$ and time $t_{10}$. The system 512 may generate or update a hypothesis as to interactions by the actor 580 after receiving each of the sets of pooled features 528A-1 through 528A-9, 528B-1 through 528B-9 from the cameras 520-1, 520-2 following the respective intervals.

As is further shown in FIG. 5D, the hypothesis generated by the system 512 includes likelihoods or probabilities that the actor 580 engaged in any number of interaction events or shopping events with the storage unit 572-4 while present within the fields of view of the cameras 520-1, 520-2. Such interaction events or shopping events may include a pick (or a take), a return (or a deposit) or no action. Alternatively, likelihoods or probabilities that the actor 580 engaged in any number of other interaction events or shopping events with the storage unit 572-4 may be calculated.

Figure 5E:
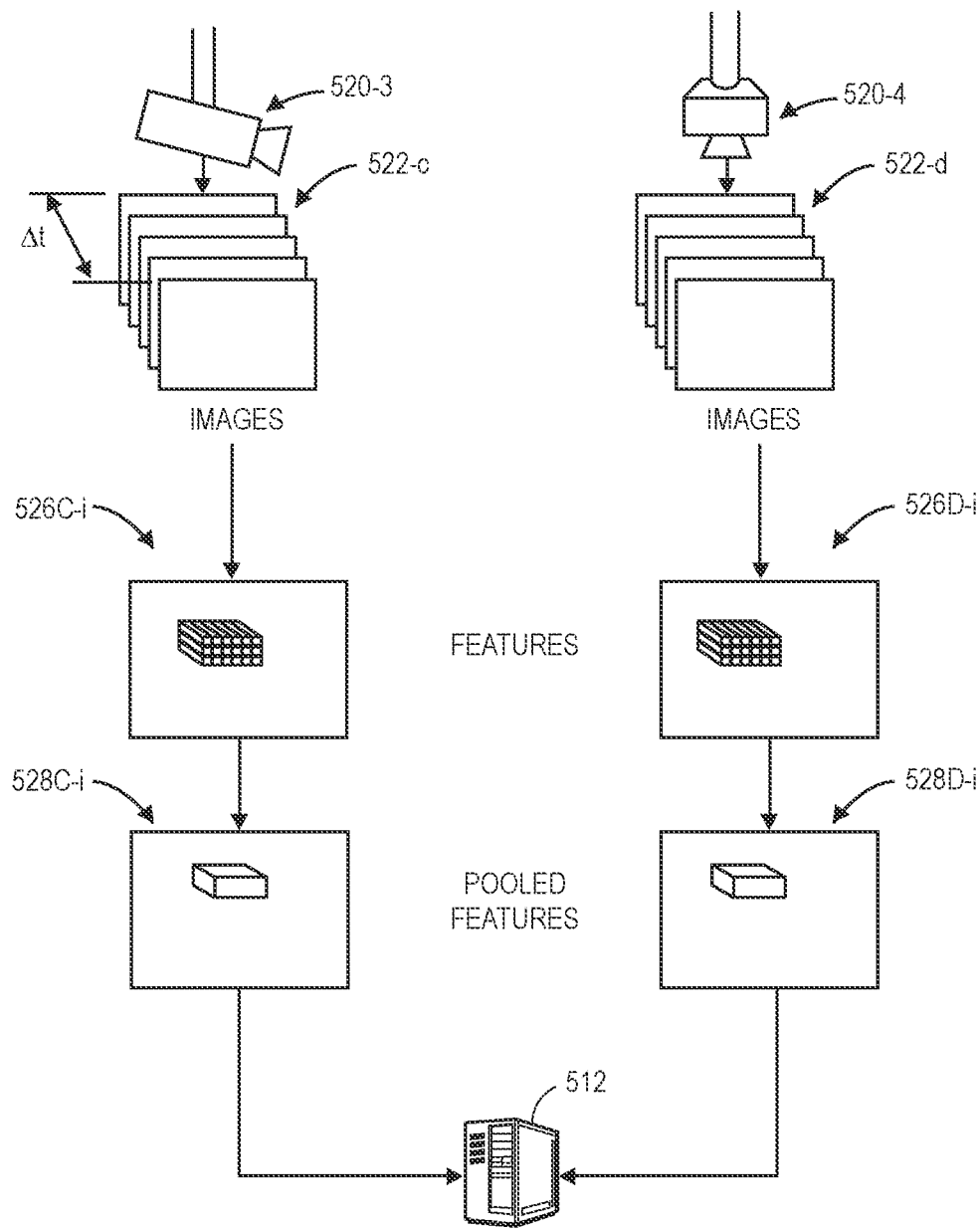

Similarly, as is shown in FIG. 5E, where the actor 580 is detected within fields of view of the cameras 520-3, 520-4, the camera 520-3 may process images 522-c captured over intervals of time Δt with the actor 580 within the field of view to determine features (e.g., feature tensors) 526C-i regarding the actor 580 and the locations of the images 522-c depicting the storage unit 572-2 with which the actor 580 interacted in the second instance, for each interval of time Δt. The camera 520-4 may also process the images 522-d captured over intervals of time Δt with the actor 580 within the fields of view to determine features (e.g., feature tensors) 526D-i regarding the actor 580 and the locations of the images 522-d depicting the storage unit 572-2 with which the actor 580 interacted in the second instance. Alternatively, or additionally, features (e.g., feature tensors) may be calculated for each of the storage units 572-1, 572-2, 572-3, 572-4, 572-5, for as long as the actor 580 is detected within the field of view of the camera 520-3 or the camera 520-4. In some implementations, the calculation of features or feature tensors may be triggered upon determining that the actor 580 is within a predetermined distance of the storage unit 572-2, or any of the other storage units 572-1, 572-3, 572-4, 572-5.

As is further shown in FIG. 5E, features 526C-i, 526D-i calculated by the cameras 520-3, 520-4 over the intervals of time Δt may be pooled into sets of pooled features 528C-i, 528D-i, and transmitted to the system 512, e.g., over one or more networks. The system 512 may process sets of pooled features 528C-i, 528D-i received from the cameras 520-3, 520-4 over the intervals of time Δt to generate a hypothesis for interactions executed by the actor 580 with the storage unit 572-2 for as long as the actor 580 is within the field of view of either of the camera 520-3 or the camera 520-4. Additionally, the cameras 520-3, 520-4 may generate and transmit sets of pooled features 528C-i, 528D-i at intervals of time Δt that overlap one another.

Figure 5F:
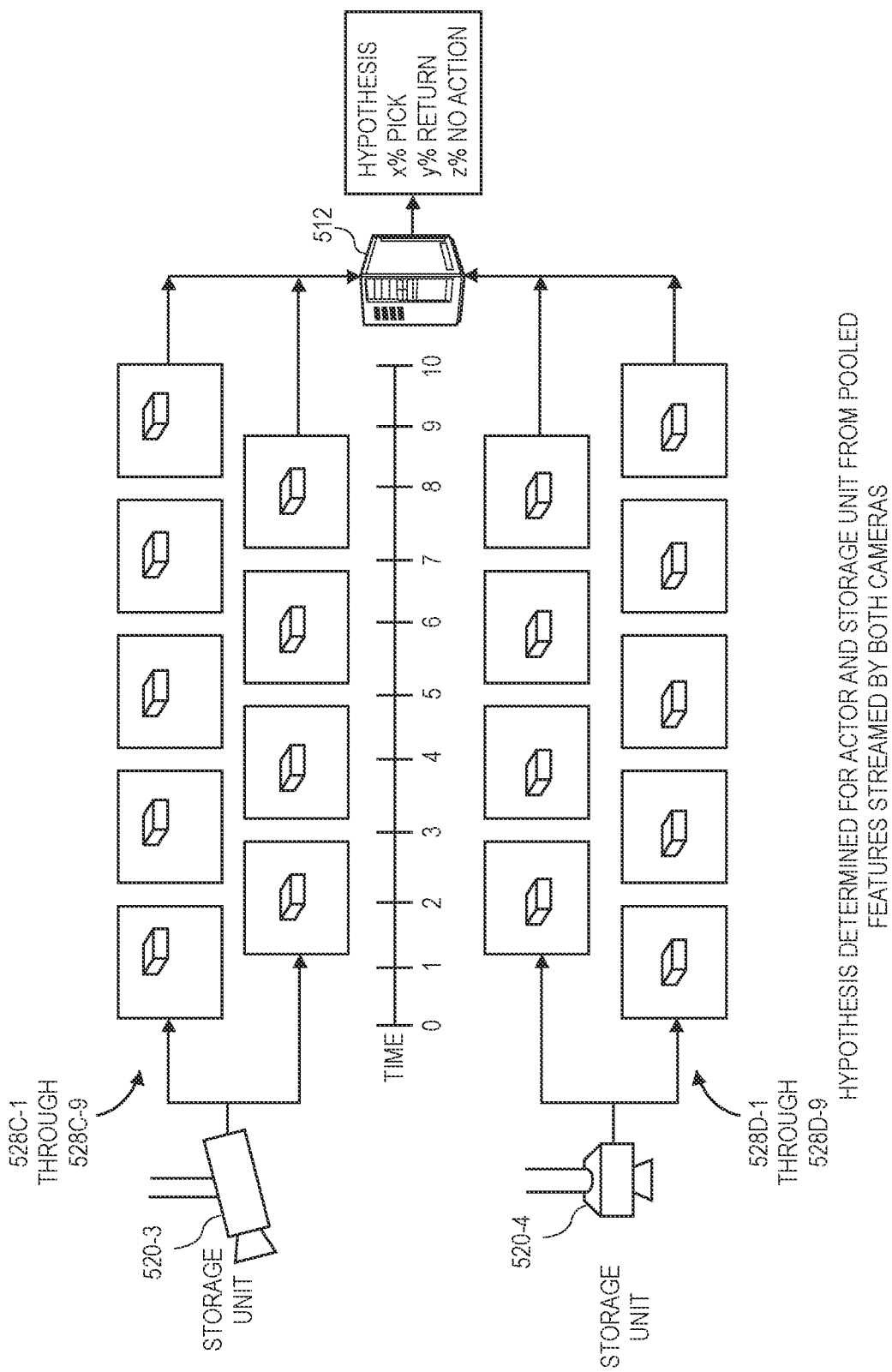

As is shown in FIG. 5F, the cameras 520-3, 520-4 generate sets of pooled features 528C-1, 528D-1 for the storage unit 572-2 from images captured between time to and time $t_2$, and generate sets of pooled features 528C-2, 528D-2 from images captured between time $t_1$ and time $t_3$, sets of pooled features 528C-3, 528D-3 from images captured between time $t_2$ and time $t_4$, sets of pooled features 528C-4, 528D-4 from images captured between time $t_3$ and time $t_5$, sets of pooled features 528C-5, 528D-5 from images captured between time $t_4$ and time $t_6$, sets of pooled features 528C-6, 528D-6 from images captured between time $t_5$ and time $t_7$, sets of pooled features 528C-7, 528D-7 from images captured between time $t_6$ and time $t_8$, sets of pooled features 528C-8, 528D-8 from images captured between time $t_7$ and time to, and sets of pooled features 528C-9, 528D-9 from images captured between time $t_8$ and time $t_{10}$. The system 512 may generate or update a hypothesis as to interactions by the actor 580 after receiving each of the sets of pooled features 528C-1 through 528C-9, 528D-1 through 528D-9 from the cameras 520-3, 520-4 following the respective intervals.

As is further shown in FIG. 5F, the hypothesis generated by the system 512 includes likelihoods or probabilities that the actor 580 engaged in any number of interaction events or shopping events with the storage unit 572-2 while present within the fields of view of the cameras 520-3, 520-4.

Although FIG. 5A shows only four cameras 520-1, 520-2, 520-3, 520-4, a single storage fixture 570 and a single actor 580, any number of cameras may capture any number of images and at any rate, and process such images in accordance with implementations of the present disclosure. Likewise, although FIGS. 5C and 5E show the generation and pooling of image features for a single actor 580 and for individual storage units 572-2, 572-4, any number of cameras may generate image features for any number of actors, and with respect to any number of storage units, for as long as each of the actors is depicted within images captured by the respective cameras. Furthermore, although FIGS. 5D and 5F show the generation of hypotheses of interactions by a single actor 580 with single storage units 572-2, 572-4 based on pooled features received from pairs of cameras 520-1, 520-2 and cameras 520-3, 520-4 at predetermined intervals over periods of time, any number of cameras may provide any number of image features pooled for any number of locations, and such pooled features may be processed separately or in parallel and in any number in accordance with implementations of the present disclosure.

Accordingly, pooled features and information or data regarding identities or numbers of items depicted within hands may be streamed to the system 512 for any number of such actors, for any number of interactions by such actors, and for any number of storage units, interactions or items.

Additionally, in accordance with implementations of the present disclosure, image features may be pooled for a location depicted within an image on any basis. Referring to FIGS. 6A through 6D, views of aspects of one system for detecting events in accordance with implementations of the present disclosure are shown. Except where otherwise noted, reference numerals preceded by the number "6" shown in FIGS. 6A through 6D indicate components or features that are similar to components or features having reference numerals preceded by the number "5" shown in FIGS. 5A through 5F, by the number "4" shown in FIG. 4, by the number "2" shown in FIG. 2A or 2B or by the number "1" shown in FIGS. 1A through 1N.

Figure 6A:
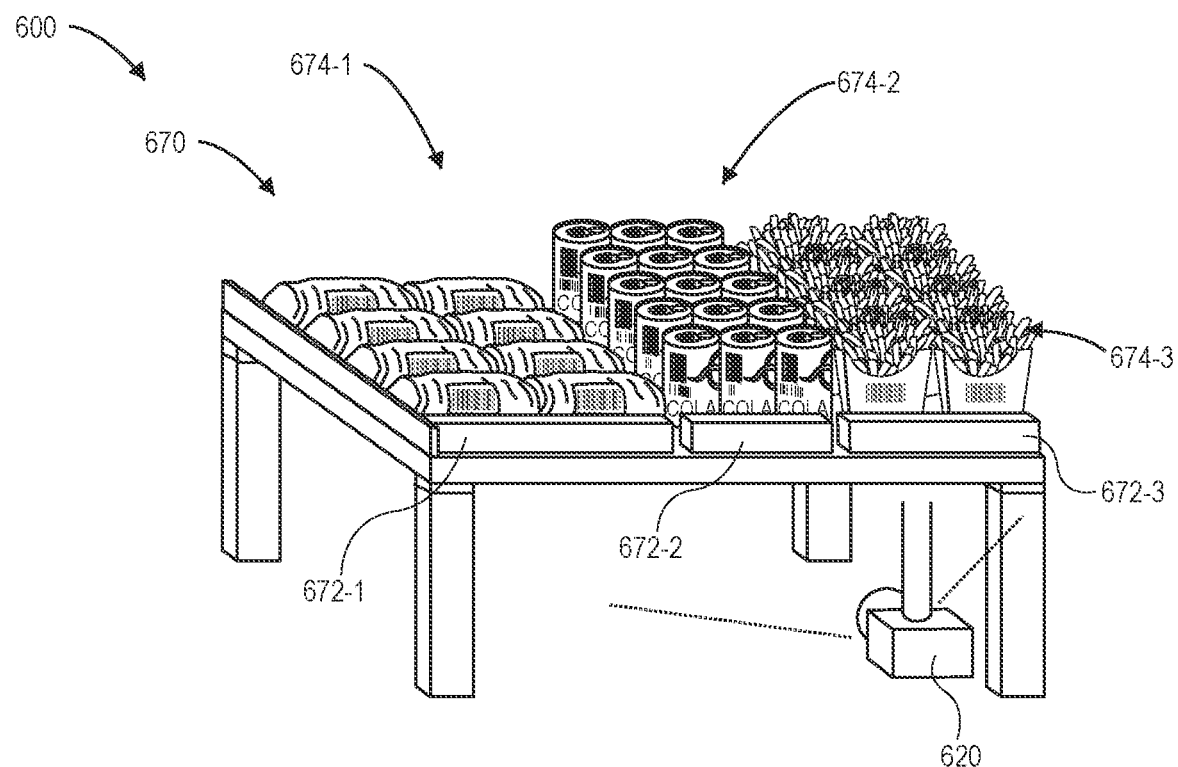
FIGS. 6A through 6D are views of aspects of one system for detecting events in accordance with implementations of the present disclosure.

As is shown in FIG. 6A, a system 600 includes an imaging device 620 (e.g., a camera) and a storage fixture 670 that is provided at least partially within a field of view of the imaging device 620. The storage fixture 670 includes a plurality of predetermined storage surfaces 672-1, 672-2, 672-3, each having a set of items 674-1, 674-2, 674-3 provided thereon. Each of the sets of items 674-1, 674-2, 674-3 generally includes one kind or type of product, e.g., sandwiches, beverages, and accompaniments, respectively.

Figure 6B:
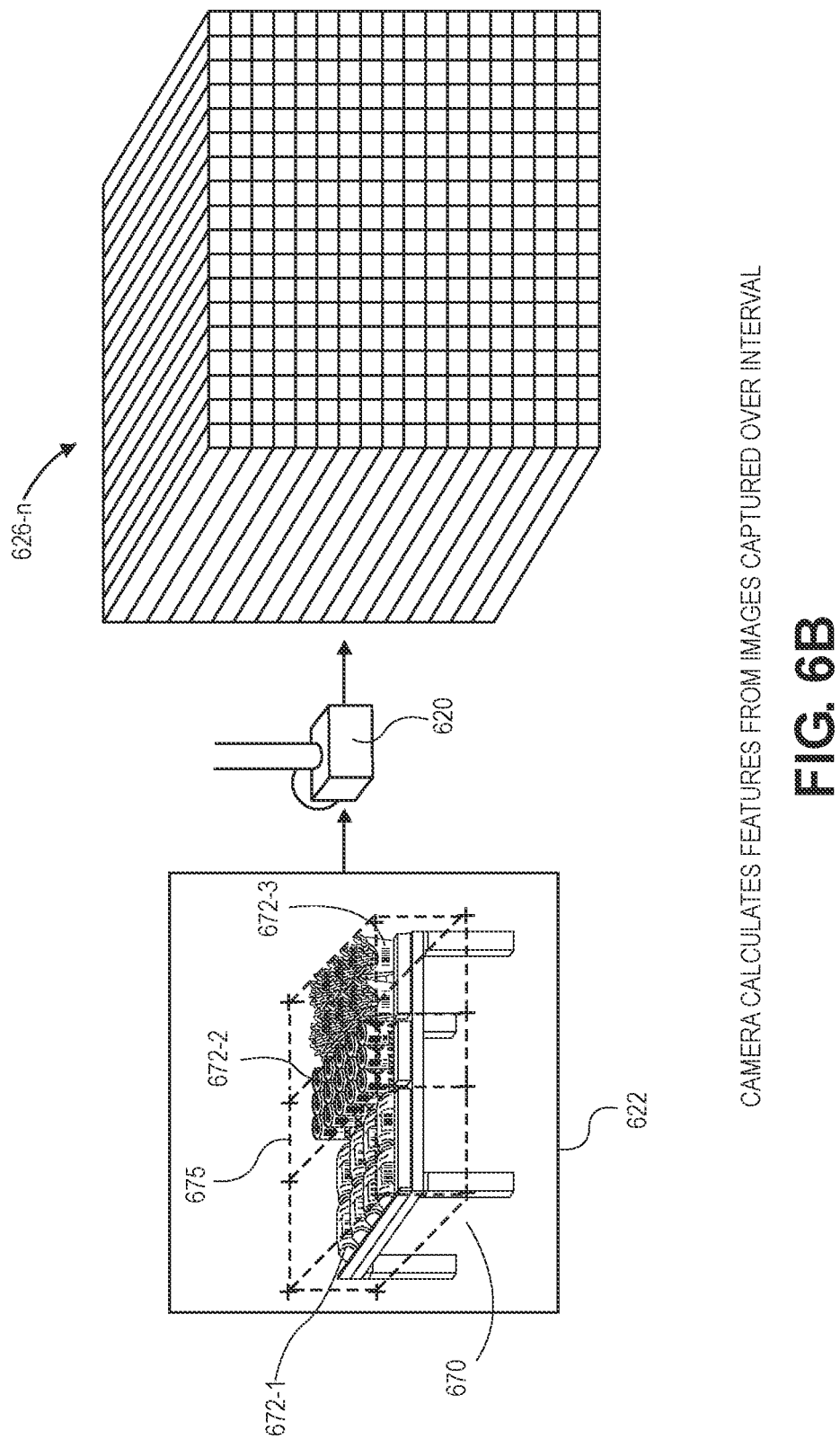

As is shown in FIG. 6B, the imaging device 620 is programmed with position data 675 regarding the storage fixture 670 and the storage surfaces 672-1, 672-2, 672-3. The position data 675 may identify or define areas or volumes in 3D space corresponding to each of such surfaces 672-1, 672-2, 672-3. The imaging device 620 processes an image 622 captured by the imaging device 620 to calculate a feature tensor 626-n, including image features over various locations of the images, each of which may be larger than pixels of the image 622 by a predetermined factor, or may include a predetermined number of pixels of the image 622.

Figure 6C:
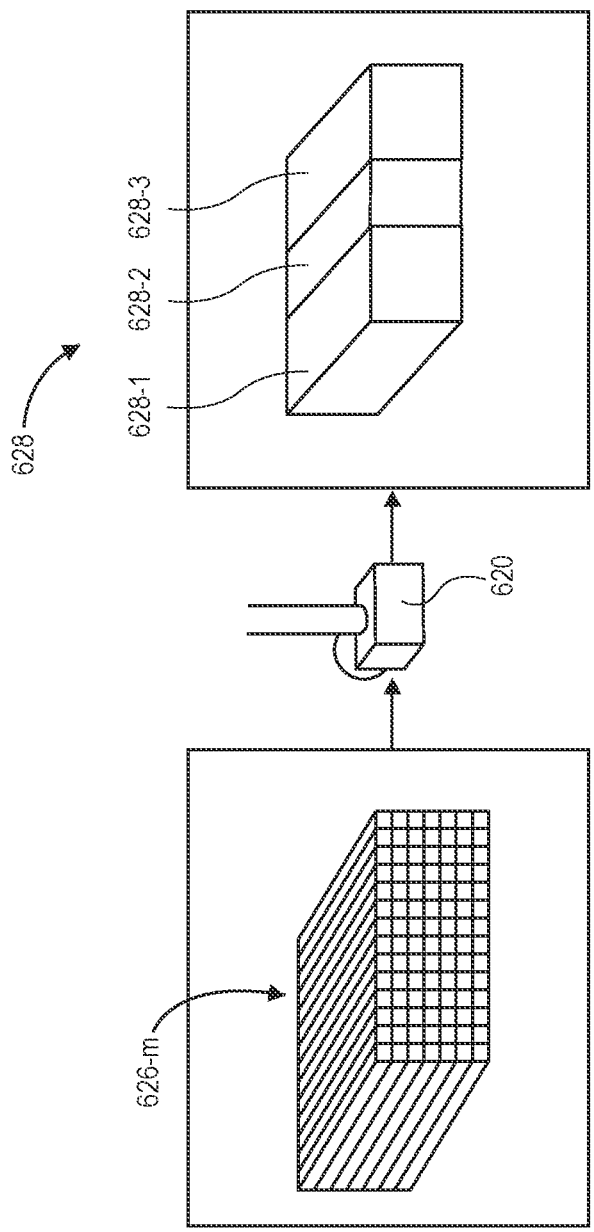

In some implementations, a camera may pool each of the image features corresponding to locations of a storage unit depicted within images captured by the camera to determine a set of pooled features for the storage unit that are to be transmitted to a system for further processing, e.g., to determine whether any interactions with the storage unit have been observed. As is shown in FIG. 6C, a set of image features 626-*m*, which is a subset of the feature tensors 626-*n*, and includes feature tensors corresponding to locations of the storage surfaces 672-1, 672-2, 672-3 depicted within the image 622, and depicted within any images subsequently captured by the camera 620. A set of pooled features 628 including pooled features 628-1, 628-2, 628-3 each corresponding to locations of the respective storage surfaces 672-1, 672-2, 672-3 may be formed from the set of image features 626-*m*.

Figure 6D:
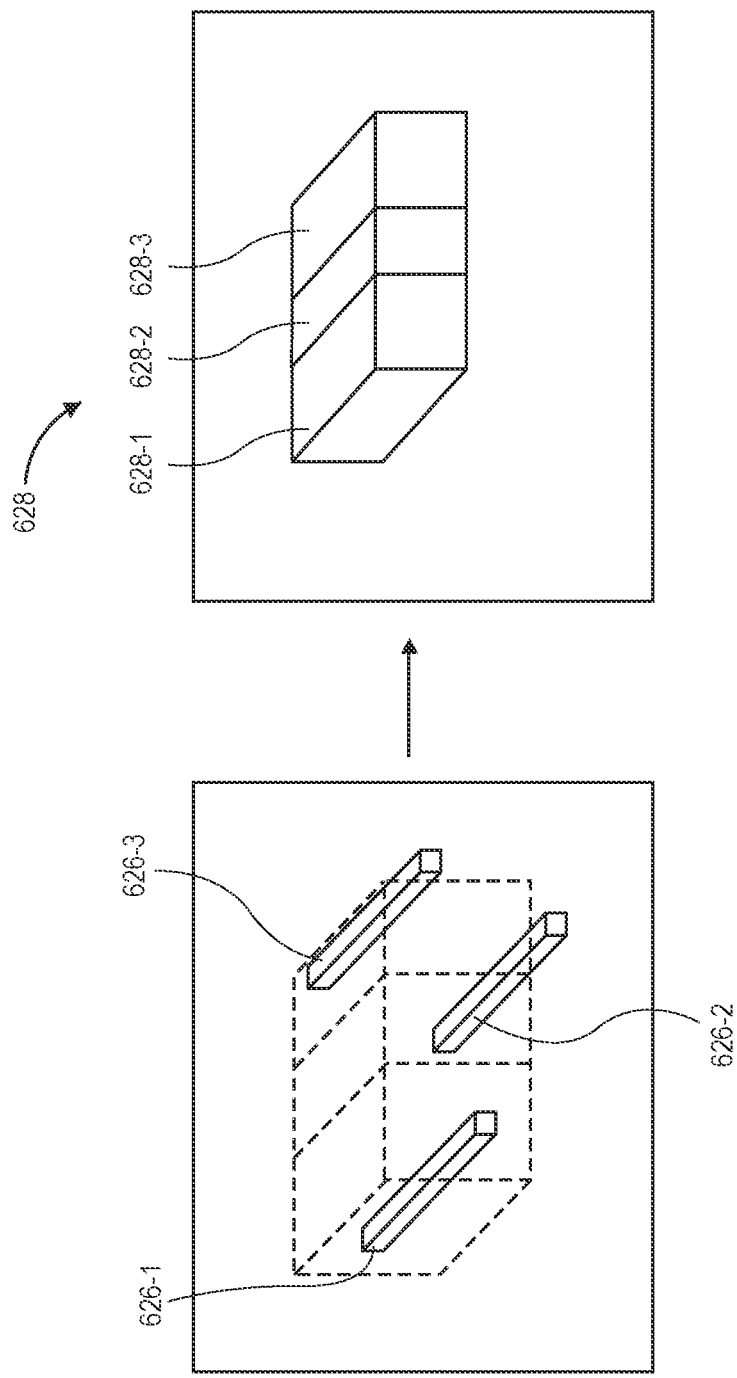

Alternatively, a camera may pool features for a storage unit using fewer than all of the image features that correspond to locations of the storage unit. As is shown in FIG. 6D, a representative image feature 626-1 corresponding to a location of the storage surface 672-1, a representative image feature 626-2 corresponding to a location of the storage surface 672-2, and a representative image feature 626-3 corresponding to a location of the storage surface 672-3 are identified and used to define a set of pooled features 628 including pooled features 628-1, 628-2, 628-3 each corresponding to each of such locations. The representative image features 626-1, 626-2, 626-3 may be selected on any basis, e.g., at random.

Figure 7:
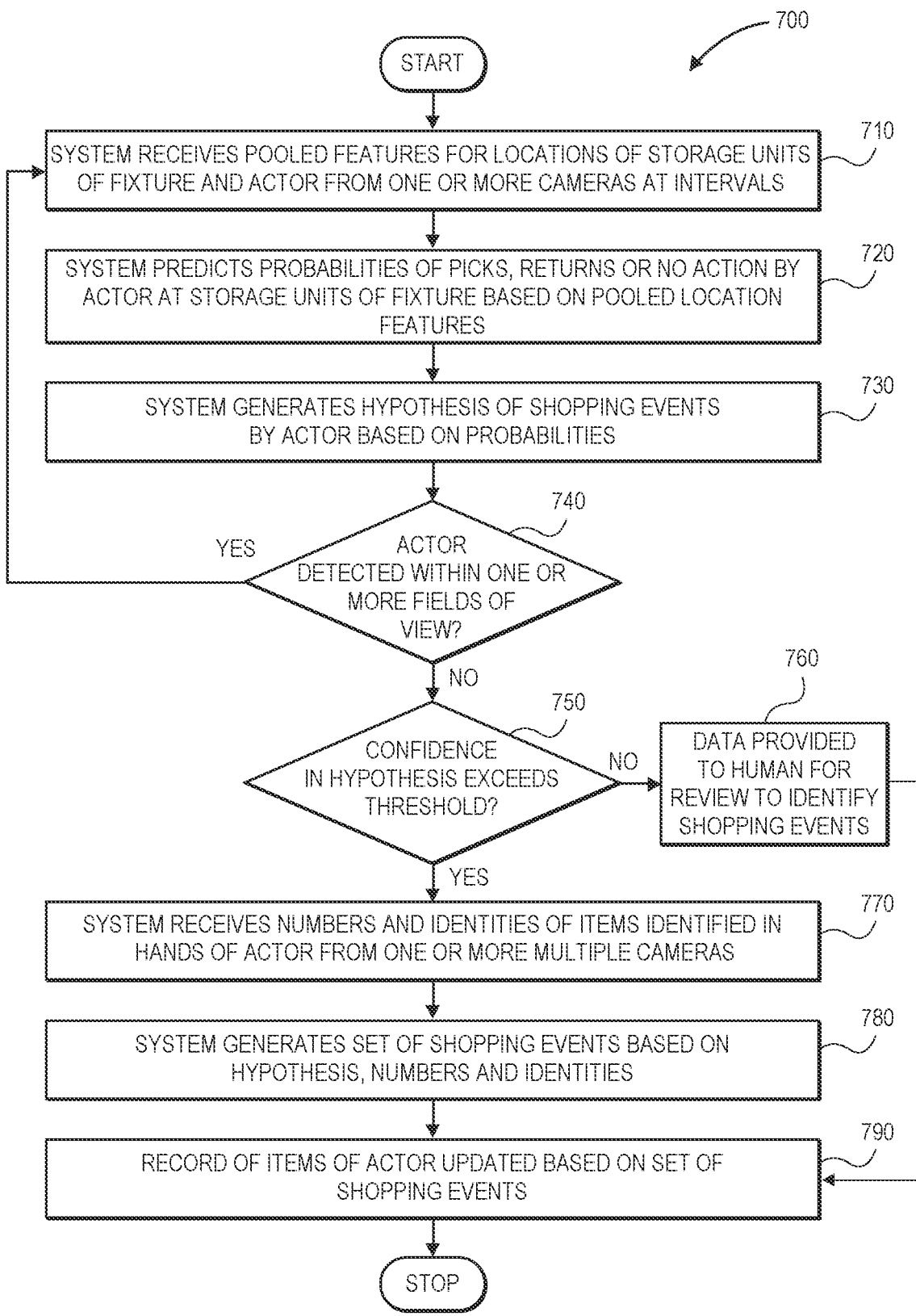
FIG. 7 is a flow chart of one process for detecting events in accordance with implementations of the present disclosure.

Referring to FIG. 7, a flow chart 700 of one process for detecting events in accordance with implementations of the present disclosure is shown.

At box 710, a system receives pooled features for locations of storage units of fixtures and for actors present on a scene from multiple cameras over one or more intervals of time, which may but need not overlap with one another. Each of the pooled features may have been determined from images captured by such cameras, and may represent one or more attributes of locations of storage units of one or more fixtures that are depicted within the images. The cameras may be mounted in any manner above, below or around a materials handling facility or another scene, and may hold any number of storage fixtures or storage units, e.g., sets or racks of shelves having items of various types or kinds provided in specific locations thereon, within their respective fields of view, along with one or more floors or traveling surfaces within the materials handling facility. The cameras may capture streams of images at any frame rate as actors execute any number of poses, gestures, movements or other interactions within the fields of view of the cameras.

The pooled features may be received from the multiple cameras at any rate or frequency, which may be defined with respect to or independent of frame rates of the cameras that captured the images. For example, in some implementations, where the cameras are configured to capture images at a frame rate or frequency of fifteen frames per second (fps) or fifteen Hertz (Hz), the cameras may generate image features at a rate of one set of image features (e.g., one tensor) per second, or a frequency of one Hertz (Hz). Furthermore, the image features may be pooled and transmitted over any a predetermined interval, e.g., one second, two seconds, or any other intervals. In some implementations, each of the cameras may be configured to transmit pooled location features for each of the locations of storage units that are present within the fields of view of the respective cameras, and for each of the actors that are present within the respective fields of views.

At box 720, the system predicts probabilities of picks, returns, or no actions by actors at storage units of a fixture based on the pooled features. For example, where multiple cameras transmit pooled features for a common storage unit, the system may consider the pooled features received from each of the cameras in determining whether a predetermined shopping event (e.g., a taking event, a return event or no action or event) occurred at any of such locations, or calculating probabilities or levels of confidence that such shopping events occurred.

At box 730, the system generates a hypothesis of shopping events by the actor based on the probabilities predicted at box 720. The hypothesis may indicate that a single shopping event occurred during the interval of time, that multiple shopping events occurred during the interval of time, or that no shopping events occurred during the interval of time, as well as levels of confidence in any of such events.

At box 740, whether the actor remains within one or more fields of view of the one or more cameras is determined. If the actor is within the one or more fields of view, then the process returns to box 710, where the system receives pooled features for the locations of the storage units and the actor from the one or more cameras at intervals.

If the actor is no longer present within the field of view at box 740, however, the process advances to box 750, where whether a level of confidence in the hypothesis exceeds a threshold is determined. If the level of confidence does not exceed a threshold, then the process advances to box 760, where data is provided to one or more human evaluators to determine whether any shopping events occurred. Such data may include, but need not be limited to, the pooled features, any imaging data captured by the cameras, or any other information or data. Alternatively, where the level of confidence does not exceed the threshold, such data may be evaluated by one or more other computer devices or systems to determine whether any shopping events occurred when the actor was within fields of view of one or more of the cameras.

If the level of confidence exceeds the threshold, then the process advances to box 770, where the system receives numbers and identities of items identified by the multiple cameras. For example, in some implementations, where a camera processes images to detect body parts of actors depicted therein, and to generate a map of such body parts and determine positions of such body parts, the camera may further crop or otherwise isolate portions of such images that depict hands. The camera may also process such portions to determine whether any of such hands includes any items therein, to identify any such items, and to determine a number of such items contained within such hands. Information regarding contents of hands, e.g., numbers and identities of the items, may be transmitted to the system in parallel with the pooled features at box 710 or separately. Alternatively, the numbers and identities of items depicted within the images may be received from any system other than cameras that captured the images, or otherwise determined in any other manner.

At box 780, the system generates a set of shopping events based on the hypothesis determined at box 730 and the numbers or the identities. For example, where the hypothesis indicates that a given actor executed an event with one of the storage units, and an item is identified within a hand of the actor prior to or following the event, the actor may be determined to have taken the item from the storage unit where an item is present in a hand of the actor following the event, or returned the item to the storage unit where the item is present in a hand of the actor prior to the event.

At box 790, a record of items for the actor is updated based on the set of shopping events, and the process ends. For example, the record may be updated to indicate that the actor has retrieved any items from or returned any items to any number of storage units that are present within fields of view of the cameras, as determined by the system. Alternatively, the record may be updated to indicate any shopping events identified by a human evaluator or another system at box 760. Such records may include, but need not be limited to, identifiers of actors, start and end times of the interactions, and identifiers of the items, or any other information or data.

Although some of the implementations disclosed herein reference the detection of events, or the association of events with one or more actors based on images captured using one or more cameras, the systems and methods of the present disclosure are not so limited. Furthermore, although some of the implementations disclosed herein reference detecting events in a commercial setting, e.g., within a materials handling facility such as a fulfillment center or a retail establishment, the systems and methods of the present disclosure are likewise not so limited. Rather, the systems and methods disclosed herein may be utilized to detect events of any type or kind. Additionally, although some of the implementations described herein or shown in the accompanying figures refer to the processing of visual imaging data that is in color, e.g., according to an RGB color model, the systems and methods disclosed herein are not so limited, and may be used to process any type of information or data that is provided in color according to any color model, or in black-and-white or grayscale.

Moreover, any of the systems or methods disclosed herein may be utilized as a primary technique or means, or as an exclusive technique or means, for detecting events, or associating the events with actors based on imaging data captured using one or more cameras or other imaging devices. Alternatively, any of the systems and methods disclosed herein may be utilized as a secondary technique or means, or as an alternate or backup technique or means, for detecting events, or associating the events with actors. For example, those of ordinary skill in the pertinent arts will recognize that any of the systems and methods disclosed herein may be utilized in connection with, or in support of, any other technique or means for detecting events, or associating events with actors.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIGS. 3 and 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately,"

"generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A materials handling facility comprising:
a storage fixture, wherein the storage fixture comprises a first storage unit and a second storage unit, wherein a plurality of items of a first type is provided on the first storage unit and a plurality of items of a second type is provided on the second storage unit;
a first camera having a first field of view, wherein the first field of view includes at least a portion of the first storage unit and at least a portion of the second storage unit, and wherein the first camera comprises a first processor unit and a first optical sensor;
a second camera having a second field of view, wherein the second field of view includes at least the portion of the first storage unit and at least the portion of the second storage unit, and wherein the second camera comprises a second processor unit and a second optical sensor; and
a computer system in communication with at least the first camera and the second camera,
wherein the first camera is programmed with one or more sets of instructions that, when executed by the first processor unit, cause the first camera to perform a first method comprising:
receiving position data from the computer system, wherein the position data identifies a position of at least the portion of the first storage unit in three-dimensional space and at least the portion of the second storage unit in three-dimensional space;
capturing a first plurality of images over a period of time, wherein each of the first plurality of images is captured at a first rate;
determining that an actor is within a predetermined distance of the storage fixture for at least a first subset of the period of time based at least in part on the position data and at least some of the first plurality of images;
generating a first plurality of feature tensors, wherein each of the first plurality of feature tensors corresponds to a portion of one of the first plurality of images;
selecting at least one of the first plurality of feature tensors, wherein the at least one of the first plurality of feature tensors corresponds to a portion of one of the first plurality of images depicting at least one of the first storage unit or the second storage unit; and
transmitting the at least one of the first plurality of tensors to the computer system at a first predetermined interval over one or more networks,
wherein the second camera is programmed with one or more sets of instructions that, when executed by the second processor unit, cause the second camera to perform a second method comprising:
receiving the position data from the computer system;
capturing a second plurality of images over the period of time, wherein each of the second plurality of images is captured at the first rate;
determining that the actor is within the predetermined distance of the storage fixture for at least a second subset of the period of time based at least in part on the position data and at least some of the second plurality of images;
generating a second plurality of feature tensors, wherein each of the second plurality of feature tensors corresponds to a portion of one of the second plurality of images;
selecting at least one of the second plurality of feature tensors, wherein the at least one of the second plurality of feature tensors corresponds to a portion of one of the second plurality of images depicting at least one of the first storage unit or the second storage unit; and
transmitting the at least one of the second plurality of tensors to the computer system at a second predetermined interval over the one or more networks,
wherein the computer system is programmed with one or more sets of instructions that, when executed, cause the computer system to perform a third method comprising:
determining that the actor executed at least one interaction with one of the first storage unit or the second storage unit during the first period of time based at least in part on the first plurality of tensors or the second plurality of tensors; and
storing information regarding the at least one interaction in association with the actor in at least one data store.

2. The materials handling facility of claim 1, wherein the first method further comprises:
identifying portions of at least some of the first plurality of images depicting at least a first hand of the actor;
determining at least one of:
a first number of items depicted within the first hand in at least one of the first plurality of images; or
a first identity of at least one item depicted within the first hand in at least one of the first plurality of images,
transmitting the first number or the first identity to the computer system over the one or more networks,
wherein the second method further comprises:
identifying portions of at least some of the second plurality of images depicting the first hand;
determining at least one of:
a second number of items depicted within the first hand in at least one of the second plurality of images; or
a second identity of at least one item depicted within the first hand in at least one of the second plurality of images,
transmitting the second number or the second identity to the computer system over the one or more networks, and
wherein the third method further comprises:
determining a number of items or an identity of at least one item associated with the interaction based at least in part on the first number, the second number, the first identity or the second identity,
wherein the information regarding the at least one interaction comprises at least one of the number of items or the identity of the at least one item determined by the computer system.

3. A method comprising:
capturing a first plurality of images by a first camera having a first field of view, wherein at least a portion of a fixture having a plurality of storage units is within the first field of view, and wherein each of the first plurality of images is captured over a first period of time;

detecting, by the first camera, at least one body part of a first actor within at least some of the first plurality of images;

calculating, by the first camera for each of the first plurality of images, a first plurality of sets of image features, wherein each of the first plurality of sets of image features is calculated for the first actor and one of a plurality of locations of at least one of the plurality of storage units within the first field of view;

pooling, by the first camera, a first set of the image features calculated by the first camera, wherein each of the first set of the image features corresponds to a first storage unit of the plurality of storage units, wherein each of the first set of image features is pooled for the first actor and the first storage unit, and wherein the first set of the image features corresponds to a second period of time that is a subset of the first period of time;

transmitting, by the first camera, the pooled first set of the image features to a system over one or more networks;

determining, by the system, that the first actor executed at least a first interaction with the first storage unit during the first period of time based at least in part on the pooled first set of the image features; and in response to determining that the first actor executed at least the first interaction with the first storage unit during the first period of time,
updating, by the system, a first record associated with the first actor based at least in part on the first interaction.

4. The method of claim 3, further comprising:
pooling, by the first camera, a second set of the image features calculated by the first camera, wherein each of the second set of image features corresponds to the first storage unit, wherein each of the second set of image features is pooled for the first actor and the first storage unit, wherein the second set of the image features correspond to a third period of time that is a subset of the first period of time; and transmitting, by the first camera, the pooled second set of the image features to the system over the one or more networks, wherein that the first actor executed at least the first interaction with the first storage unit is determined based at least in part on the pooled first set of the image features and the pooled second set of the image features.

5. The method of claim 3, wherein each of the plurality of sets of image features indicates one or more attributes of one of a plurality of locations depicted within at least one of the second plurality of images at a time during the second period of time, and
wherein the pooled first set of the image features indicates one or more attributes of the first storage unit during the third period of time.

6. The method of claim 3, wherein each of the first plurality of images has a predetermined number of image pixels, and
wherein each of the plurality of locations is larger than one of the image pixels by a predetermined factor.

7. The method of claim 6, wherein each of the second plurality of images has dimensions of six hundred forty image pixels by four hundred eighty image pixels, and
wherein each of the plurality of locations comprises eight image pixels.

8. The method of claim 3, further comprising:
capturing a second plurality of images by a second camera having a second field of view, wherein at least a portion of the fixture is within the second field of view, and wherein each of the second plurality of images is captured over a third period of time;

detecting, by the second camera, at least one body part of the first actor within at least some of the third plurality of images;

calculating, by the second camera for each of the second plurality of images, a second plurality of sets of image features, wherein each of the second plurality of sets of image features is calculated for the first actor and one of a plurality of locations of at least one of the second plurality of images;

pooling, by the second camera, a second set of the image features calculated by the second camera, wherein each of the second set of the image features corresponds to the first storage unit, wherein each of the second set of image features is pooled for the first actor and the first storage unit, and wherein the second set of the image features correspond to a fourth period of time that is a subset of the third period of time; and transmitting, by the second camera, the pooled second set of the image features to the system over the one or more networks, wherein that the first actor executed at least the first interaction with the first storage unit is determined based at least in part on the pooled first set of the image features and the pooled second set of the image features.

9. The method of claim 3, further comprising:
detecting, by the first camera, at least one body part of a second actor within at least some of the first plurality of images;

pooling, by the first camera, a second set of the image features calculated by the first camera, wherein each of the second set of the image features corresponds to one of the first storage unit or a second storage unit of the plurality of storage units, wherein each of the second set of image features is pooled for the second actor and the one of the first storage unit or the second storage unit, and wherein the second set of the image features corresponds to a third period of time that is a subset of the first period of time;

transmitting, by the first camera, the pooled second set of the image features to the system over the one or more networks;

determining, by the system, that the second actor executed at least a second interaction with the one of the first storage unit or the second storage unit during the first period of time based at least in part on the pooled second set of the image features; and in response to determining that the second actor executed at least the second interaction with the one of the first storage unit or the second storage unit during the first period of time,
updating, by the system, a second record associated with the second actor based at least in part on the second interaction.

10. The method of claim 3, further comprising:
identifying, by the first camera, the image features corresponding to locations of the at least one of the first plurality of images depicting at least a portion of the first storage unit; and selecting, by the first camera, at least one of the first plurality of sets of image features corresponding to the locations of the at least one of the first plurality of images depicting at least the portion of the first storage unit, wherein the pooled first set of image features comprises the selected at least one of the sets of image features.

11. The method of claim 3, further comprising:

providing, by the first camera, at least some of the first plurality of images as inputs to a machine learning model executed by the first camera;

generating, by the first camera, maps of a plurality of body parts of the first actor depicted within the at least some of the first plurality of images based at least in part on outputs received from the machine learning model; and determining, by the first camera, positions of at least some of the plurality of body parts in three-dimensional space during the first period of time based at least in part on the maps, wherein at least the first set of the image features is calculated based at least in part on at least one of the maps.

12. The method of claim 11, further comprising:

receiving, by the first camera, locating data associated with the first actor, wherein the locating data comprises:
    an identifier of the first actor;
    visual descriptors of pixels depicting at least a portion of the first actor; and
    at least one position of the first actor during the first period of time, wherein at least one of the maps is generated based at least in part on the locating data.

13. The method of claim 3, wherein each of the first plurality of images is captured by the first camera at a first rate, wherein each of the first plurality of sets of image features is calculated by the first camera at a second rate, and wherein the first rate is greater than the second rate.

14. The method of claim 13, wherein the first rate is not less than fifteen frames per second, and wherein the second rate is one set of image features per second.

15. The method of claim 3, further comprising:

programming, by the system, at least the first camera with position data regarding at least the first storage unit, wherein the position data comprises a set of positions in three-dimensional space corresponding to the first storage unit, and wherein the set of positions defines a volume in three-dimensional space associated with at least the first storage unit.

16. The method of claim 3, wherein the at least one body part comprises a first hand of the actor, and wherein the method further comprises:

identifying, by the first camera, portions of at least some of the second plurality of images depicting the first hand; and determining, by the first camera, at least one of:
    a number of items depicted within the first hand in at least one of the second plurality of images; or
    an identity of at least one item depicted within the first hand in at least one of the second plurality of images.

17. The method of claim 16, further comprising:

transmitting, by the first camera, the number of items or the identity of the at least one item to the system over the one or more networks; and updating, by the system, the first record based at least in part on the number of items or the identity of the at least one item.

18. A camera comprising:

a processor unit;

a memory component;

a transceiver; and a color sensor, wherein the camera has a field of view including at least a portion of a fixture having a plurality of storage units, and wherein the processor unit is programmed with one or more sets of instructions that, when executed, cause the camera to at least:

receive position data regarding the fixture, wherein the position data comprises a plurality of sets of positions in three-dimensional ("3D") space, and wherein each of the sets of positions corresponds to one of the plurality of storage units;

capture images at a first rate;

detect at least one body part of a first actor within at least some of the images;

determine positions in 3D space of the at least one body part;

determine that at least a portion of the first actor is within a predetermined distance of at least one of the set of positions corresponding to a first storage unit of the plurality of storage units over at least a first period of time;

calculate sets of image features for images captured during the first period of time, wherein each of the sets of image features is calculated for the first actor and one of a plurality of locations of each of the images captured during intervals of the first period of time at a second rate, wherein the first rate is greater than the second rate;

pool sets of the image features calculated for the first actor and locations of each of the images depicting at least a portion of the first storage unit, wherein the sets of the image features are pooled at the second rate;

transmit the pooled sets of the image features to a system over one or more networks at the second rate; and determine that the first actor execute at least one shopping event with the first storage unit during the first period of time based at least in part on the pooled sets.

19. The camera of claim 18, wherein the one or more sets of instructions, when executed, further cause the camera to at least:

identify portions of at least the images captured during the first period of time depicting the at least one body part;

determine at least one of:
    a number of items depicted within the at least one body part in at least one of the images captured during the first period of time; or
    an identity of at least one item depicted within the at least one body part in at least one of the images captured during the first period of time; and transmit the number of items or the identity of the at least one item to the system over the one or more networks.

20. The camera of claim 18, wherein the first rate is not less than fifteen frames per second, and
wherein the second rate is one set of image features per second.

* * * * *